(12) United States Patent
Haddock et al.

(10) Patent No.: US 8,317,321 B2
(45) Date of Patent: Nov. 27, 2012

(54) MULTIFOCAL LENS WITH A DIFFRACTIVE OPTICAL POWER REGION

(75) Inventors: Joshua N. Haddock, Roanoke, VA (US); William Kokonaski, Gig Harbor, WA (US); Roger Clarke, Cambridge (GB); Mark Mattison-Shupnick, Petaluma, CA (US); Ronald D. Blum, Roanoke, VA (US)

(73) Assignee: PixelOptics, Inc., Roanoke, VA (US)

( * ) Notice: Subject to any disclaimer, the term of this patent is extended or adjusted under 35 U.S.C. 154(b) by 1152 days.

(21) Appl. No.: 12/166,526

(22) Filed: Jul. 2, 2008

(65) Prior Publication Data
US 2009/0046349 A1 Feb. 19, 2009

Related U.S. Application Data

(60) Provisional application No. 60/929,570, filed on Jul. 3, 2007, provisional application No. 60/982,182, filed on Oct. 24, 2007, provisional application No. 60/987,556, filed on Nov. 13, 2007, provisional application No. 60/991,899, filed on Dec. 3, 2007, provisional application No. 61/039,079, filed on Mar. 24, 2008, provisional application No. 61/039,081, filed on Mar. 24, 2008.

(51) Int. Cl.
*G02C 7/02* (2006.01)
(52) U.S. Cl. ......... 351/159.01; 351/159.11; 351/159.15; 351/159.35; 351/159.44; 351/159.75
(58) Field of Classification Search .................. 351/159, 351/168, 169, 177, 159.11, 159.01, 159.12, 351/159.15, 159.35, 159.44, 159.75; 359/642
See application file for complete search history.

(56) References Cited

U.S. PATENT DOCUMENTS

| | | |
|---|---|---|
| 2,437,642 A | 3/1948 | Henroleau |
| 2,576,581 A | 11/1951 | Edwards |
| 3,161,718 A | 12/1964 | De Luca |
| 3,245,315 A | 4/1966 | Marks et al. |
| 3,309,162 A | 3/1967 | Kosanke et al. |
| 3,614,215 A | 10/1971 | Mackta |
| 3,738,734 A | 6/1973 | Tait et al. |
| 3,791,719 A | 2/1974 | Kratzer et al. |
| 4,062,629 A | 12/1977 | Winthrop |
| 4,174,156 A | 11/1979 | Glorieux |
| 4,181,408 A | 1/1980 | Senders |
| 4,190,330 A | 2/1980 | Berreman |

(Continued)

FOREIGN PATENT DOCUMENTS

CN ROC89113088 10/2001

(Continued)

OTHER PUBLICATIONS

Kowel, Stephen T., et. al; Focusing by electrical modulation of refraction in a liquid crystal cell; Applied Optics; Jan. 15, 1984; vol. 23, No. 2.

(Continued)

*Primary Examiner* — James Greece
(74) *Attorney, Agent, or Firm* — Kilpatrick Townsend & Stockton LLP

(57) ABSTRACT

A lens system is presented having a diffractive optical power region. The diffractive optical power region has a plurality of concentric surface relief diffractive structures. A greater portion of light incident on a diffractive structure near the center point contributes to the optical power than light incident on a diffractive structure peripherally spaced therefrom.

16 Claims, 33 Drawing Sheets

U.S. PATENT DOCUMENTS

| | | | |
|---|---|---|---|
| 4,264,154 A | 4/1981 | Petersen | |
| 4,279,474 A | 7/1981 | Belgorod | |
| 4,300,818 A | 11/1981 | Schachar | |
| 4,320,939 A | 3/1982 | Mueller | |
| 4,373,218 A | 2/1983 | Schachar | |
| 4,395,736 A | 7/1983 | Fraleux | |
| 4,418,990 A | 12/1983 | Gerber | |
| 4,423,929 A | 1/1984 | Gomi | |
| 4,457,585 A | 7/1984 | DuCorday | |
| 4,461,550 A | 7/1984 | Legendre | |
| 4,466,703 A | 8/1984 | Nishimoto | |
| 4,466,706 A | 8/1984 | Lamothe, II | |
| 4,529,268 A | 7/1985 | Brown | |
| 4,564,267 A | 1/1986 | Nishimoto | |
| 4,572,616 A | 2/1986 | Kowel et al. | |
| 4,577,928 A | 3/1986 | Brown | |
| 4,601,545 A | 7/1986 | Kern | |
| 4,609,824 A | 9/1986 | Munier et al. | |
| 4,712,870 A | 12/1987 | Robinson et al. | |
| 4,756,605 A | 7/1988 | Okada et al. | |
| 4,772,094 A | 9/1988 | Sheiman | |
| D298,250 S | 10/1988 | Kildall | |
| 4,787,733 A | 11/1988 | Silva | |
| 4,787,903 A | 11/1988 | Grendahl | |
| 4,795,248 A | 1/1989 | Okada et al. | |
| 4,813,777 A | 3/1989 | Rainville et al. | |
| 4,818,095 A | 4/1989 | Takeuchi | |
| 4,836,652 A | 6/1989 | Oishi et al. | |
| 4,842,400 A | 6/1989 | Klein | |
| 4,880,300 A | 11/1989 | Payner et al. | |
| 4,890,903 A | 1/1990 | Treisman et al. | |
| 4,904,063 A | 2/1990 | Okada et al. | |
| 4,907,860 A | 3/1990 | Noble | |
| 4,909,626 A | 3/1990 | Purvis et al. | |
| 4,919,520 A | 4/1990 | Okada et al. | |
| 4,921,728 A | 5/1990 | Takiguchi | |
| 4,927,241 A | 5/1990 | Kuijk | |
| 4,929,865 A | 5/1990 | Blum | |
| 4,930,884 A | 6/1990 | Tichenor et al. | |
| 4,944,584 A | 7/1990 | Maeda et al. | |
| 4,945,242 A | 7/1990 | Berger et al. | |
| 4,952,788 A | 8/1990 | Berger et al. | |
| 4,958,907 A | 9/1990 | Davis | |
| 4,961,639 A | 10/1990 | Lazarus | |
| 4,968,127 A | 11/1990 | Russell et al. | |
| 4,981,342 A | 1/1991 | Fiala | |
| 4,991,951 A | 2/1991 | Mizuno et al. | |
| 5,015,086 A | 5/1991 | Okaue et al. | |
| 5,030,882 A | 7/1991 | Solero | |
| 5,050,981 A | 9/1991 | Roffman | |
| 5,066,301 A | 11/1991 | Wiley | |
| 5,067,795 A | 11/1991 | Senatore | |
| 5,073,021 A | 12/1991 | Marron | |
| 5,076,665 A | 12/1991 | Petersen | |
| 5,089,023 A | 2/1992 | Swanson | |
| 5,091,801 A | 2/1992 | Ebstein | |
| 5,108,169 A | 4/1992 | Mandell | |
| 5,114,628 A | 5/1992 | Hofer et al. | |
| 5,130,856 A | 7/1992 | Tichenor et al. | |
| 5,138,495 A * | 8/1992 | Shiono et al. | 359/742 |
| 5,142,411 A | 8/1992 | Fiala | |
| 5,150,234 A | 9/1992 | Takahashi et al. | |
| 5,171,266 A | 12/1992 | Wiley et al. | |
| 5,182,585 A | 1/1993 | Stoner | |
| 5,184,156 A | 2/1993 | Black et al. | |
| 5,200,859 A | 4/1993 | Payner et al. | |
| 5,208,688 A | 5/1993 | Fergason et al. | |
| 5,229,797 A | 7/1993 | Futhey et al. | |
| 5,229,885 A | 7/1993 | Quaglia | |
| 5,231,430 A | 7/1993 | Kohayakawa | |
| 5,239,412 A | 8/1993 | Naka et al. | |
| D342,063 S | 12/1993 | Howitt et al. | |
| 5,305,028 A | 4/1994 | Okano | |
| 5,306,926 A | 4/1994 | Yonemoto | |
| 5,324,930 A | 6/1994 | Jech, Jr. | |
| D350,342 S | 9/1994 | Sack | |
| 5,352,886 A | 10/1994 | Kane | |
| 5,359,444 A | 10/1994 | Piosenka et al. | |
| 5,375,006 A | 12/1994 | Haas | |
| 5,382,986 A | 1/1995 | Black et al. | |
| 5,386,308 A | 1/1995 | Michel et al. | |
| 5,424,927 A | 6/1995 | Schaller et al. | |
| 5,440,357 A | 8/1995 | Quaglia | |
| 5,443,506 A | 8/1995 | Garabet | |
| 5,451,766 A | 9/1995 | Van Berkel | |
| 5,488,439 A | 1/1996 | Weltmann | |
| 5,522,323 A | 6/1996 | Richard | |
| 5,552,841 A | 9/1996 | Gallorini et al. | |
| 5,608,567 A | 3/1997 | Grupp | |
| 5,615,588 A | 4/1997 | Gottschald | |
| 5,654,786 A | 8/1997 | Bylander | |
| 5,668,620 A | 9/1997 | Kurtin et al. | |
| 5,682,223 A | 10/1997 | Menezes et al. | |
| 5,683,457 A | 11/1997 | Gupta et al. | |
| RE35,691 E | 12/1997 | Theirl et al. | |
| 5,712,721 A | 1/1998 | Large | |
| 5,728,155 A | 3/1998 | Anello et al. | |
| 5,739,959 A | 4/1998 | Quaglia | |
| 5,777,719 A | 7/1998 | Williams et al. | |
| 5,796,514 A * | 8/1998 | Chipper | 359/354 |
| 5,815,233 A | 9/1998 | Morokawa et al. | |
| 5,815,239 A | 9/1998 | Chapman et al. | |
| 5,861,936 A | 1/1999 | Sorensen | |
| 5,877,876 A | 3/1999 | Birdwell | |
| 5,900,720 A | 5/1999 | Kallman et al. | |
| 5,949,521 A | 9/1999 | Williams et al. | |
| 5,953,098 A | 9/1999 | Lieberman et al. | |
| 5,956,183 A | 9/1999 | Epstein et al. | |
| 5,963,300 A | 10/1999 | Horwitz | |
| 5,971,540 A | 10/1999 | Ofner | |
| 5,980,037 A | 11/1999 | Conway | |
| 5,999,328 A | 12/1999 | Kurtin et al. | |
| 6,040,947 A | 3/2000 | Kurtin et al. | |
| 6,050,687 A | 4/2000 | Bille et al. | |
| 6,069,742 A | 5/2000 | Silver | |
| 6,086,203 A | 7/2000 | Blum et al. | |
| 6,086,204 A | 7/2000 | Magnante | |
| 6,095,651 A | 8/2000 | Williams et al. | |
| 6,099,117 A | 8/2000 | Gregory | |
| 6,115,177 A | 9/2000 | Vossler | |
| 6,145,987 A | 11/2000 | Baude et al. | |
| 6,188,525 B1 | 2/2001 | Silver | |
| 6,191,881 B1 | 2/2001 | Tajima | |
| 6,213,602 B1 | 4/2001 | Smarto | |
| 6,270,220 B1 | 8/2001 | Keren | |
| 6,271,915 B1 | 8/2001 | Frey et al. | |
| 6,305,802 B1 | 10/2001 | Roffman et al. | |
| 6,325,508 B1 | 12/2001 | Decreton et al. | |
| 6,350,031 B1 | 2/2002 | Lashkari et al. | |
| 6,396,622 B1 | 5/2002 | Alden | |
| 6,437,762 B1 | 8/2002 | Birdwell | |
| 6,437,925 B1 | 8/2002 | Nishioka | |
| 6,464,363 B1 | 10/2002 | Nishioka et al. | |
| 6,491,394 B1 | 12/2002 | Blum et al. | |
| 6,501,443 B1 | 12/2002 | McMahon | |
| 6,554,425 B1 | 4/2003 | Roffman et al. | |
| 6,609,794 B2 | 8/2003 | Levine | |
| 6,614,408 B1 | 9/2003 | Mann | |
| 6,616,275 B1 | 9/2003 | Dick et al. | |
| 6,616,279 B1 | 9/2003 | Davis et al. | |
| 6,618,208 B1 | 9/2003 | Silver | |
| 6,626,532 B1 | 9/2003 | Nishioka et al. | |
| 6,631,001 B2 | 10/2003 | Kuiseko | |
| 6,682,195 B2 | 1/2004 | Dreher | |
| 6,709,108 B2 | 3/2004 | Levine et al. | |
| 6,738,199 B2 | 5/2004 | Nishioka | |
| 6,768,536 B2 | 7/2004 | Okuwaki et al. | |
| 6,774,871 B2 | 8/2004 | Birdwell | |
| 6,778,246 B2 | 8/2004 | Sun et al. | |
| 6,833,938 B2 | 12/2004 | Nishioka | |
| 6,840,619 B2 | 1/2005 | Dreher | |
| 6,851,805 B2 | 2/2005 | Blum et al. | |
| 6,893,124 B1 | 5/2005 | Kurtin | |
| 6,902,271 B2 | 6/2005 | Perrott et al. | |
| 6,918,670 B2 | 7/2005 | Blum et al. | |
| 6,948,818 B2 | 9/2005 | Williams et al. | |
| 6,951,391 B2 | 10/2005 | Morris et al. | |

| | | |
|---|---|---|
| 6,986,579 B2 | 1/2006 | Blum et al. |
| 7,008,054 B1 | 3/2006 | Kurtin et al. |
| 7,009,757 B2 | 3/2006 | Nishioka et al. |
| 7,019,890 B2 | 3/2006 | Meredith et al. |
| 7,041,133 B1 | 5/2006 | Azar |
| 7,085,065 B2 | 8/2006 | Silver |
| 7,133,172 B2 | 11/2006 | Nishioka |
| 7,206,276 B2 | 4/2007 | Kimura et al. |
| 7,209,097 B2 | 4/2007 | Suyama |
| 2001/0055094 A1 | 12/2001 | Zhang |
| 2002/0018305 A1* | 2/2002 | Kohno .................. 359/736 |
| 2002/0140899 A1 | 10/2002 | Blum et al. |
| 2002/0149739 A1 | 10/2002 | Perrott et al. |
| 2002/0186346 A1 | 12/2002 | Stantz et al. |
| 2003/0018383 A1 | 1/2003 | Azar |
| 2003/0151721 A1 | 8/2003 | Lai et al. |
| 2003/0151830 A1* | 8/2003 | Hosoe .................. 359/719 |
| 2003/0210377 A1 | 11/2003 | Blum et al. |
| 2004/0008319 A1 | 1/2004 | Lai et al. |
| 2004/0108971 A1 | 6/2004 | Waldern et al. |
| 2004/0117011 A1 | 6/2004 | Aharoni et al. |
| 2004/0130677 A1 | 7/2004 | Liang et al. |
| 2004/0179280 A1 | 9/2004 | Nishioka |
| 2004/0196435 A1 | 10/2004 | Dick et al. |
| 2004/0246440 A1 | 12/2004 | Andino et al. |
| 2005/0073739 A1 | 4/2005 | Meredith et al. |
| 2005/0124983 A1 | 6/2005 | Frey et al. |
| 2005/0140924 A1 | 6/2005 | Blum et al. |
| 2006/0044510 A1 | 3/2006 | Williams et al. |
| 2006/0164593 A1 | 7/2006 | Peyghambarian |
| 2007/0097515 A1* | 5/2007 | Jung et al. .................. 359/666 |

FOREIGN PATENT DOCUMENTS

| | | |
|---|---|---|
| DE | 4223395 | 1/1994 |
| EP | 0154962 A2 | 9/1985 |
| EP | 0233104 A1 | 8/1987 |
| EP | 0237365 A1 | 9/1987 |
| EP | 0 578 833 A1 | 1/1994 |
| EP | 0578833 | 1/1994 |
| EP | 0649044 | 4/1995 |
| GB | 2170613 A | 8/1986 |
| GB | 2169417 A | 7/1987 |
| JP | 55-076323 | 6/1980 |
| JP | 61 156227 | 7/1986 |
| JP | 1 237610 | 9/1989 |
| JP | 05-100201 | 4/1993 |
| JP | 7-28002 | 1/1995 |
| JP | 11352445 | 12/1998 |
| JP | 2007-323062 | 12/2007 |
| WO | WO-92/01417 | 2/1992 |
| WO | WO 93/21010 | 10/1993 |
| WO | WO-98/27863 | 7/1998 |
| WO | WO-99/27334 | 6/1999 |
| WO | WO-03/050472 A1 | 8/2003 |
| WO | WO-03/068059 A2 | 8/2003 |
| WO | WO-2004/008189 A1 | 1/2004 |
| WO | WO-2004/015481 A1 | 2/2004 |
| WO | WO-2004/034095 A2 | 4/2004 |
| WO | WO-2004/072687 A2 | 8/2004 |

OTHER PUBLICATIONS

Thibos, Larry N., et. al.; Vision through a liquid-crystal spatial light modulator; Adaptive Optics Conference; 1999; Durham, UK.

Miller, Donald T., et. al.; Requirements for Segmented Spatial Light Modulators for Diffraction-Limited Imaging Through Aberrated Eyes, Adaptive Optics Conference.

Thibos, Larry N., et. al; Use of Liquid-Crystal Adaptive-Optics to Alter the Refractive State of the Eye; Optometry and Vision Science; Jul. 1997; vol. 74, No. 7; American Academy of Optometry.

Thibos, Larry N., et. al.; Electronic Spectacles for the 21$^{st}$ Century, Indian Journal of Optometry, Spring 1999; vol. 2, No. 1.

Bradley, Arthur; Profile: Larry N. Thibos, PhD., and Donald T. Miller, PhD.; Indiana Journal of Optometry; Spring 1999; vol. 2, No. 1.

Naumov, A.F.; Control Optimization of Spherical Modal Liquid Crystal Lenses; Optics Express, Apr. 26, 1999; vol. 4, No. 9; Optical Society of America.

Naumov, A.F.; Liquid Crystal Adaptive Lenses with Modal Control; Optics Letters, Jul. 1, 1998, vol. 23, No. 13; Optical Society of America.

Liquid Lenses Eye Commercial Breakthrough; Opto & Laser Europe, Nov. 2003.

Anderson, M.; Adaptive Optics: Liquid Crystals Lower the Cost of Adaptive Optics; Laser Focus World, Dec. 1999.

Davis, Robert A.; Computer Vision Syndrome—The Eyestrain Epidemic ; Review of Optometry, Sep. 15, 1997.

Lazarus, Stuart M.; The Use of Yoked Base-Up and Base-In Prism for Reducing Eye Strain at the Computer; Journal of the American Optometric Association, Apr. 1996.

Eyecare Business, Oct. 1997.

International Search Report of Application No. PCT/US08/08254 issued Sep. 22, 2008.

* cited by examiner

Surface Profile of Diffractive Structure

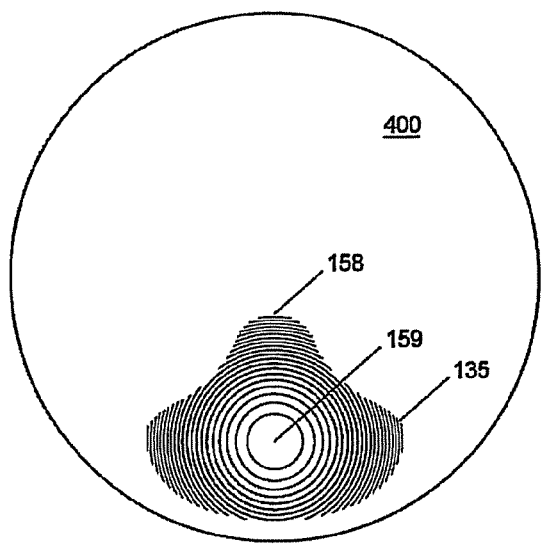
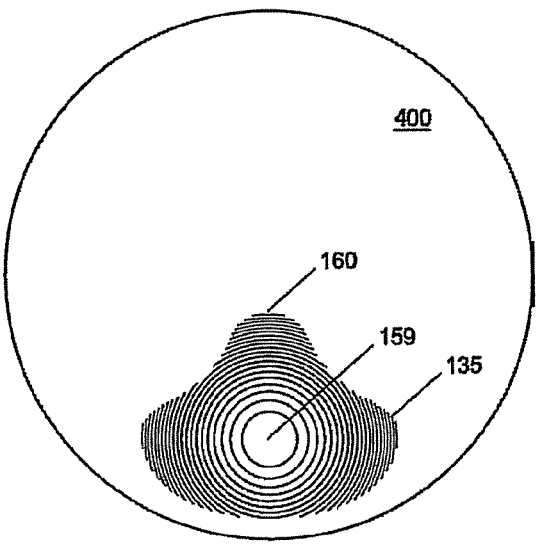
FIG. 21A                FIG. 21B
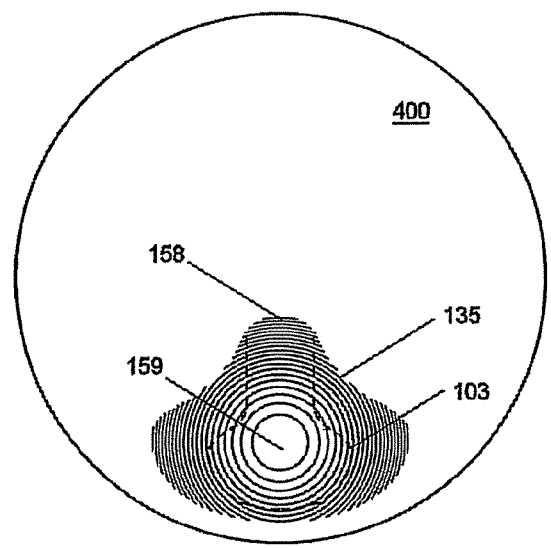
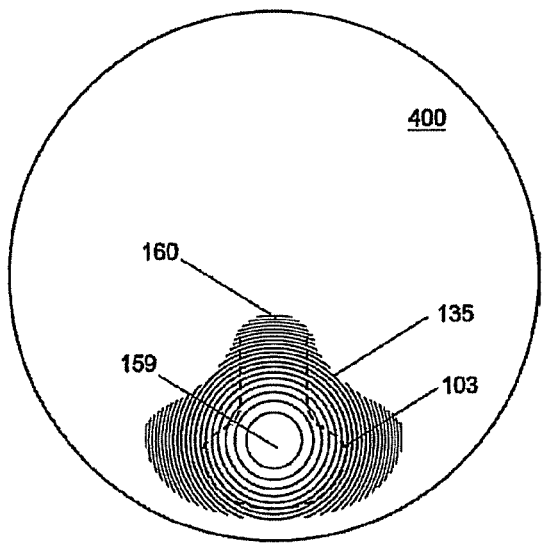
FIG. 22A                FIG. 22B

Add Power Plot: Cropped +1.00D Diffractive PAR

Astigmatism Plot: Cropped +1.00D Diffractive PAR

MULTIFOCAL LENS WITH A DIFFRACTIVE OPTICAL POWER REGION

CROSS REFERENCE TO RELATED APPLICATIONS

This application claims priority from and incorporates by reference in their entirety the following provisional applications:

U.S. Ser. No. 60/929,570 filed on Jul. 3, 2007 and entitled "Blending of Diffraction Efficiency for Enhancing Cosmetics of Ophthalmic Lenses Incorporating Diffractive Optical Elements";

U.S. Ser. No. 60/982,182 filed on Oct. 24, 2007 and entitled "Multifocal Spectacle Lens With Non-Rotationally Symmetric Diffractive Optical Power Region and Method For Making Same";

U.S. Ser. No. 60/987,556 filed on Nov. 13, 2007 and entitled "Non-Rotationally Symmetric Diffractive Optical Elements and Method for Making the Same";

U.S. Ser. No. 60/991,899 filed on Dec. 3, 2007 and entitled "Diffractive Progressive Addition Optics";

U.S. Ser. No. 61/039,079 filed on Mar. 24, 2008 and entitled "Multi-Focal Opthahnic Lenses With Non-Rotationally Symmetric Diffractive Optical Power Region and Method For Making Same"; and U.S. Ser. No. 61/039,081 filed on Mar. 24, 2008 and entitled "Multi-Focal Opthalmic Lenses With Non-Rotationally Symmetric Diffractive Optical Power Region and Method For Making Same".

BACKGROUND OF THE INVENTION

1. Field of the Invention

The present invention relates to a diffractive optical power region blended in a lens by decreasing the diffractive efficiency of the diffractive optical power region near the peripheral edge thereof. The present invention also relates to a diffractive optical power region that provides a progression of optical power. The present invention further relates to both static and dynamic multifocal lenses which may use continuous or discontinuous diffractive structures.

2. Description of the Related Art

A diffractive optical power region is a region of a lens or optic that generates optical power by diffracting light. A static diffractive optical power region comprises individual surface relief diffractive structures that are typically closed concentric curves. The surface relief diffractive structures are closely spaced (e.g., by a distance on the order of the wavelengths of visible light). The surface relief diffractive structures typically have the same heights. The surface relief diffractive structures may commonly be referred to as Fresnel zones.

In general, for a given thickness of a lens or optic, diffractive optical power regions are capable of generating greater optical power than their refractive counterparts. Despite this advantage, diffractive optical power regions have several disadvantages.

One of the main disadvantages of using diffractive optical power regions is that they exhibit large amounts of chromatic aberration compared to their refractive counterparts. Chromatic aberration refers to the change in optical power that occurs as the optical wavelength is varied. Chromatic aberration in a diffractive optical power region having a constant optical power increases as the diffractive structures approach the periphery of the lens. Thus, the periphery of the diffractive optical power region exhibits the highest degree of chromatic aberration.

As a result of such chromatic aberration, a lens having a diffractive optical power region provides serious vision compromises. A vision compromise can be seen, in one approach, when the diffractive region is used to create a bifocal lens. In this approach, a diffractive optical power region may be placed in optical communication with the bottom half of an ophthalmic lens. The lens has a far distance vision correction and the diffractive optical power region provides additional optical power for near distance correction. Thus, the periphery of the diffractive optical power region forms the boundary between far distance correction and near distance correction. Since this boundary has the highest degree of chromatic aberration, a user looking across the boundary will experience the highest degree of the compromised vision.

Another disadvantage of a diffractive optical power region is that it is generally considered to be cosmetically unattractive. In the bifocal approach described above, the lens would have a sharp delineation at the boundary between the diffractive optical power region and the ophthalmic lens, similar to the line in conventional bifocals, which can be observed on a wearer. A wearer typically finds this undesirable. Since the ophthalmic industry trends towards lineless multifocal lenses (e.g., progressive addition lenses), diffractive optical power regions are less cosmetically desirable.

Thus, there is a need in the art for a diffractive optical power region that resolves the aforementioned vision and cosmetic compromises. Accordingly, there is now provided with this invention an improved lens for effectively overcoming the aforementioned difficulties and longstanding problems inherent in the art.

SUMMARY OF THE INVENTION

In an embodiment of the invention, a lens system may include a diffractive optical power region. The diffractive optical power region includes a plurality of concentric surface relief diffractive structures. A greater portion of light incident on a diffractive structure near the center point contributes to the optical power than light incident on a diffractive structure peripherally spaced therefrom.

In an embodiment of the invention, a lens system may include a diffractive optical power region. The diffractive optical power region includes a plurality of concentric surface relief diffractive structures. The diffractive structures include a series of crests and adjacent troughs forming a sawtooth pattern. Each concentric surface relief diffractive structure extends from a trough to a crest of the sawtooth pattern. The (e.g., vertical) distance between a first crest and a first adjacent trough near the center point is greater than the (e.g., vertical) distance between a second crest and a second adjacent trough spaced from the center point.

In an embodiment of the invention, a lens system may include a diffractive optical power region. The diffractive optical power region has a center and a peripheral edge. The diffractive optical power region focuses light to a focal point. The amount of light focused on the focal point from the center is greater than the amount of light focused on the focal point from the peripheral edge.

In an embodiment of the invention, an electro-active lens system may include a controller for applying voltages, a plurality of concentric individually addressable electrodes electrically connected to the controller, and electro-active material disposed between the individually addressable electrodes. When the controller applies voltages to the plurality of individually addressable electrodes, the refractive index of electro-active material is altered to provide an optical power. A greater portion of light incident on an individually addressable electrode near the geometric center of the plurality of individually addressable electrodes contributes to the optical power than light incident spaced from the geometric center of the plurality of individually addressable electrodes.

In an embodiment of the invention, a lens system may include a diffractive optical power region having a first region with a plurality of concentric surface relief diffractive structures for focusing light of a specific wavelength λ to a focal length f. The radius of the $n^{th}$ concentric surface relief diffractive structure from the center point is greater than $\sqrt{2n\lambda f}$.

In an embodiment of the invention, a lens system may include a diffractive optical power region having a first region with a plurality of concentric surface relief diffractive structures for focusing light of a specific wavelength λ to a focal length f. The radius of the $n^{th}$ concentric surface relief diffractive structure from the center point is less than $\sqrt{2n\lambda f}$.

BRIEF DESCRIPTION OF THE DRAWINGS

Embodiments of the invention will be understood and appreciated more fully from the following detailed description in conjunction with the figures, which are not to scale, in which like reference numerals indicate corresponding, analogous or similar elements, and in which:

FIGS. 21A and 21B show front views of lenses 400 having the cropped progressive addition diffractive optical power regions of FIG. 19B.

FIGS. 22A-22B show front views of the lenses 400 of FIGS. 21A and 21B having the cropped progressive addition diffractive optical power regions of FIG. 19B in optical communication with the refractive progressive addition region of FIG. 1.

DETAILED DESCRIPTION OF THE INVENTION

A diffractive optical power region in a lens may be either static or dynamic. A static diffractive optical power region has an optical power that is fixed at any point. The optical power does not change by the application of electrical or other power. In contrast with a static diffractive optical power region, a dynamic diffractive optical power region has an alterable optical power at one or more positions along the diffractive region. The dynamic diffractive optical power region typically includes a plurality of conducting structures, e.g., pixels or electrode rings, electrically connected to a controller having an electrical power supply. The controller applies electrical power to the conducting structures to create a voltage pattern across the dynamic diffractive optical element, which is predetermined to diffract light to cause the desired optical power.

Figure 1:
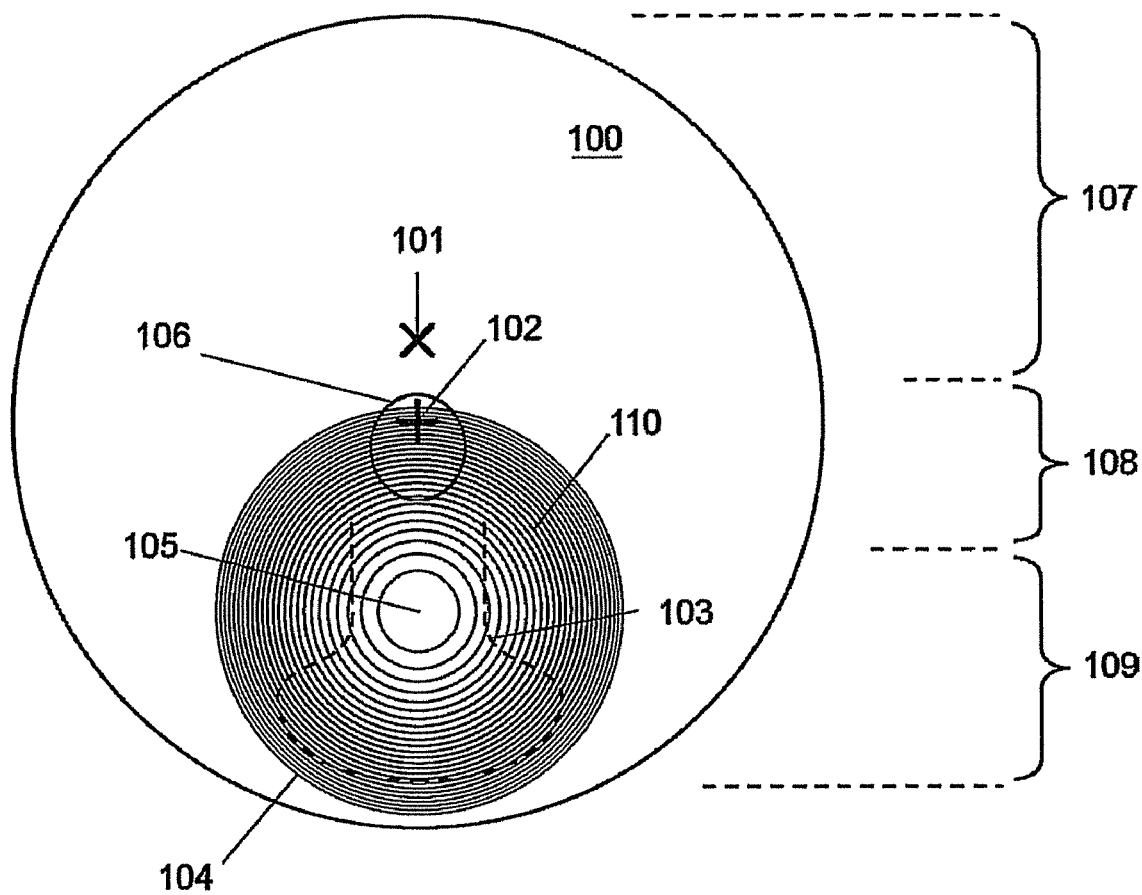
FIG. 1 shows a front view of a lens 100 having a refractive progressive addition region and a diffractive optical power region.

FIG. 1 shows a front view of a lens 100 having a refractive progressive addition region 103 and a diffractive optical power region 104, in accordance with a prior art design. The lens is a multifocal lens having at least a first optical power provided by the diffractive optical power region 104 alone and at least a second optical power provided by the combination of the refractive progressive addition region 103 and the diffractive optical power region 104.

The refractive progressive addition region 103 provides a gradient of continuously monotonically increasing positive optical power. The refractive progressive addition region 103 provides optical power by the refraction of light. The refractive progressive addition region 103 is shown in a static lens. Thus, although there is a change in optical power at different points along the surface of the refractive progressive addition region 103, at any single point, the optical power of the static lens is fixed (i.e., does not change by the application of electrical or other power).

The diffractive optical power region 104 provides optical power by the diffraction of light. The diffractive optical power region 104 is shown in a static lens. The static diffractive optical power region 104 includes a plurality of diffractive structures 110 that are concentric with a center point 105. When the diffractive optical power region 104 is static, the diffractive structures 110 are typically surface relief diffractive structures typically having a sawtooth cross-sectional pattern. The diffractive optical power region 104 is shown to provide a constant optical power, although any optical power may be achieved. The optical power of the diffractive optical power region 104 is determined by the spacing between each surface relief diffractive structure 110. To achieve a constant optical power, the radii of the surface relief diffractive structures 110 are defined by:

$$\rho_n = \sqrt{2n\lambda f} \qquad (1)$$

where $\rho_n$ is the radius of the $n^{th}$ concentric surface relief diffractive structure 110 from the diffractive geometric center 105, f is the design focal length (i.e., the inverse of the constant optical power of the diffractive region, expressed in diopters [m$^{-1}$]), and $\lambda$ is a design wavelength.

Although a static diffractive optical power region 104 is shown in FIG. 1, it is understood that in other embodiments of the invention, a dynamic diffractive optical power region may be used. A dynamic diffractive optical power region typically employs one or more voltages predetermined to achieve electro-active diffractive optical effects equivalent to those described in reference to the static approach of FIG. 1.

The diffractive optical power region 104 is in optical communication with the refractive progressive addition region 103. The diffractive optical power region 104 at least partially, and preferably largely, overlaps the refractive progressive addition region 103. When used in combination, the refractive progressive addition region 103 provides a wearer with optical power less than the wearer's total needed near distance optical power correction and the diffractive optical power region 104 provides the remaining optical power to provide the wearer's total needed near distance optical power correction. Using the diffractive optical power region 104 to supplement the optical power of the refractive progressive addition region 103 reduces the overall optical power of the refractive progressive addition region 103. Since unwanted astigmatism is known to increases at a greater than linear rate as a function of the total add power of a refractive progressive addition region, supplementing the optical power of the refractive progressive addition region 103 reduces these astigmatic and other unwanted effects, such as, distortion, perceptual blur, or swim.

The lens 100 includes a far distance vision region 107, a far-intermediate vision region 108, and an intermediate to near distance vision region 109. The intermediate to near distance vision region 109 may be located, for example, in the region where the refractive progressive addition region 103 has a maximum add power and coincides with the center of the diffractive optical power region 104. The far-intermediate distance vision region 108 may be located, for example, in the region where the refractive progressive addition region 103 has less than its maximum add power and coincides with the diffractive optical power region 104. Alternatively, the far-intermediate distance vision region 108 may be located, for example, in the region where the refractive progressive addition region 103 is absent and the diffractive optical power region 104 is present. The far distance vision region 107 may be located, for example, in the region where the refractive progressive addition region 103 and the diffractive optical power region 104 are absent. Near distance vision (e.g., for reading) typically describes vision at distances in a range of from approximately 10" to approximately 16" from the eye. Intermediate distance vision (e.g., for computer and other office work) typically describes vision at distances in a range of from approximately 16" to approximately 24" from the eye. Far-intermediate vision describes vision at distances in a range of from approximately 24" to approximately 6' from the eye. For example, the optical power for correcting far-intermediate vision is approximately 50% (and preferably approximately 40%) or less of the optical power for correcting near distance vision.

The lens 100 has a geometric (or physical) center 102 and a fitting point 101. Typically, the far distance vision region 107 is located on the upper half of the viewing region of the lens 100 above the fitting point 101. The fitting point 101 is designed to coincide with the location of the wearer's pupil and typically marks the start of the optical power progression (along the progressive addition region 103) from the far distance vision region 107 to the intermediate to near distance vision region 109.

The diffractive optical power region is shown in FIG. 1 to be located below the fitting point 101 and overlapping the geometric center 102 of the lens 100. However, it may be appreciated that the diffractive optical power region 104 can be located anywhere on the lens 100. For example, the diffractive optical power region 104 can be centered at the fitting point 101 of the lens 100, such that the diffractive structures 110 are concentric with the fitting point 101.

Figure 2A:
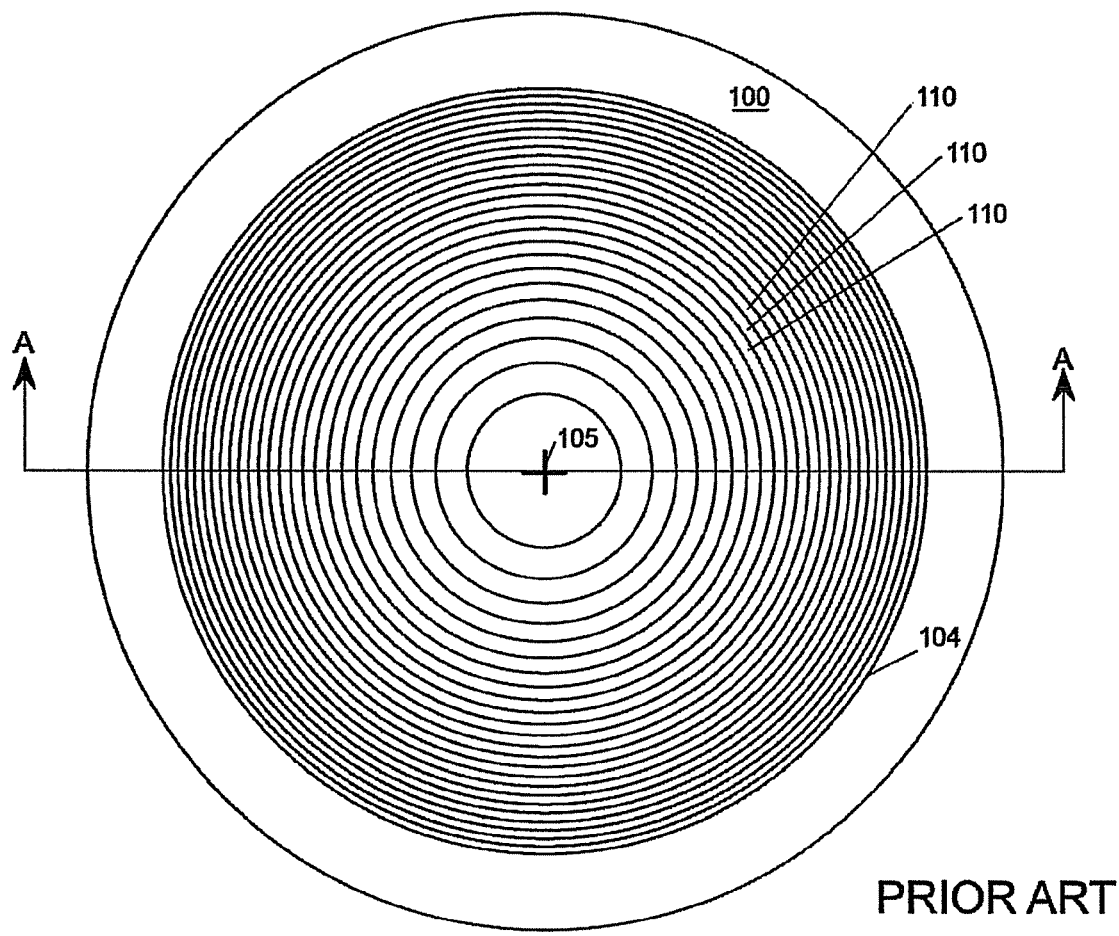
FIG. 2A shows a front view of the lens 100 of FIG. 1 having the static diffractive optical power region.

FIG. 2A shows a front view of the lens 100 of FIG. 1 having the static diffractive optical power region 104, in accordance with a prior art design. The static diffractive optical power region 104 includes a plurality of surface relief diffractive structures 110 that are concentric with a diffractive geometric center 105. The surface relief diffractive structures 110 are continuous closed curves, which, although shown as circular, can be shaped as any closed curves such as an ellipse.

Figure 2B:
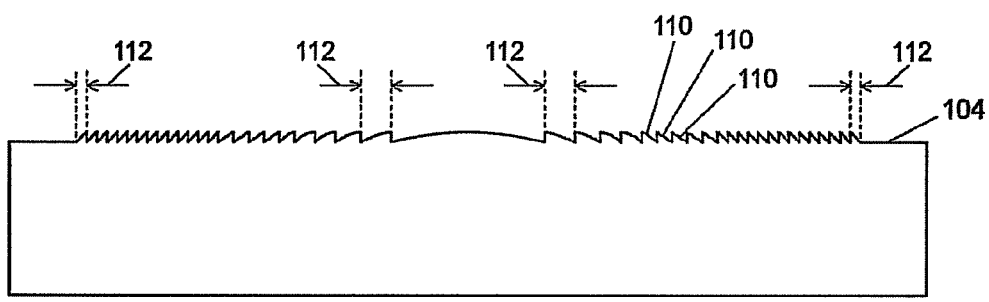
FIG. 2B shows a cross-sectional view of the lens of FIG. 2A taken along axis AA.

FIG. 2B shows a cross-sectional view of the lens 100 of FIG. 2A taken along axis AA, in accordance with a prior art design. FIG. 2B shows the topographical profile of the diffractive optical power region 104 of FIG. 2A formed from the diffractive structures 110. The topographical profile of the surface relief diffractive structures 110 shows a sawtooth pattern. The portion of a surface relief diffractive structure 110 at the maximum height of the structure is referred to as a "diffractive peak" and the portion of a surface relief diffractive structure 110 at the minimum height of the structure is referred to as a "diffractive trough". The heights of the surface relief diffractive structures 110 are shown to be constant.

However, the radial widths of the diffractive structures 110, that is, the distance from one peak to an adjacent peak (or one trough to an adjacent trough), decrease as the diffractive structures 110 extend radially toward the periphery of the diffractive optical power region 104. A radial width is shown as 112 in FIG. 2B. As described above, as the radial widths 112 of the diffractive structures 110 decrease, the chromatic aberration increases. Accordingly, the peripheral region of the diffractive optical power region 104 exhibits the greatest degree of chromatic aberration.

Referring again to FIG. 1, the diffractive optical power region 104 includes a compromised vision region 106. The compromised vision region 106 is a region that causes incident light to experience chromatic aberration greater than a predetermined threshold. Typically, the compromised vision region 106 is located near at least a portion of the periphery of the diffractive optical power region 104. The compromised vision region 106 may form a sharp delineation at its boundary with the remainder of the lens 100.

Figure 3:
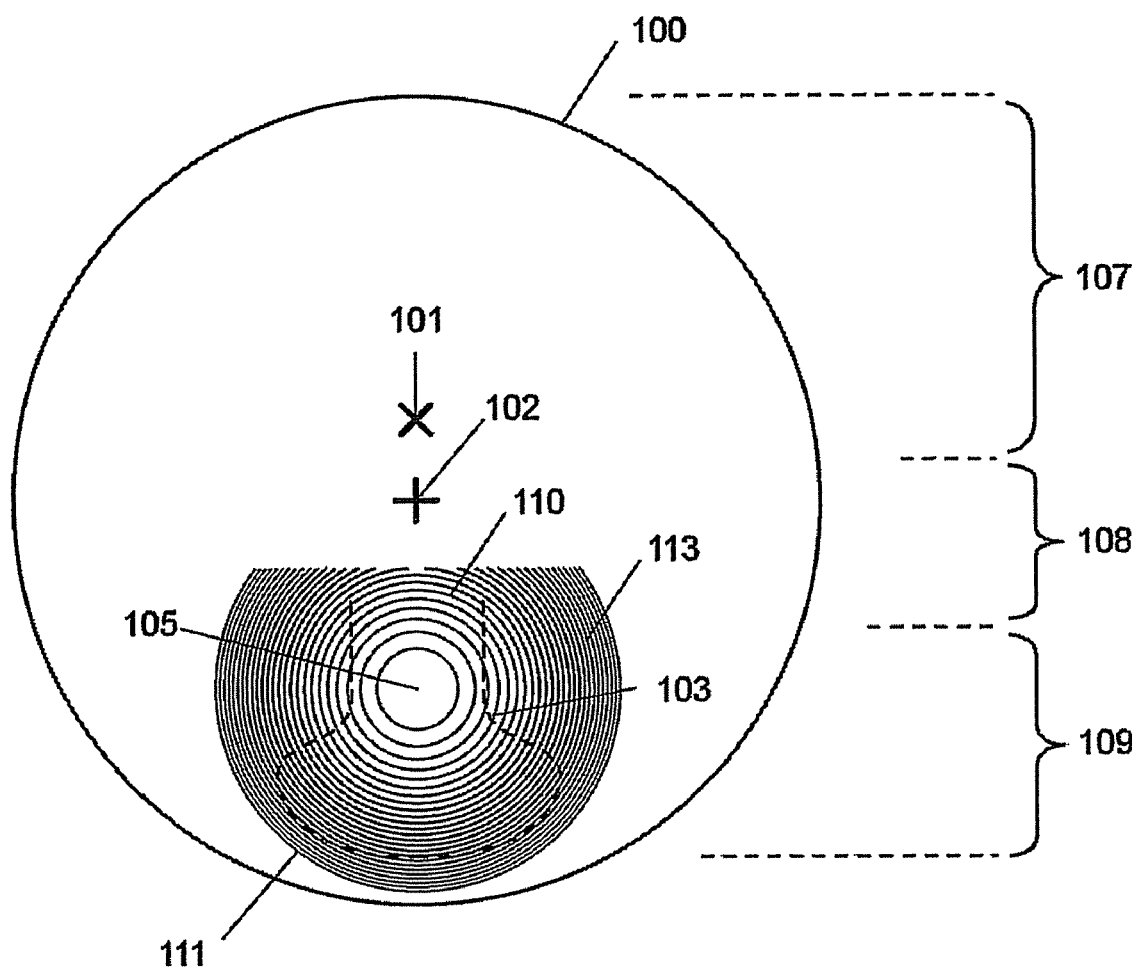
FIGS. 3 and 4 show front views of the lens 100 of FIG. 1 having a cropped diffractive optical power region.

As shown in FIG. 3, to minimize these cosmetic and vision compromises, the compromised vision region depicted in FIG. 1 can be removed from the lens 100, in accordance with an aspect of the present invention. In one approach, at least a portion of the peripheral edge of a diffractive optical power region can be physically "cropped" to exclude the compromised vision region. Typically, cropping a diffractive optical power region does not change the shape of individual surface relief diffractive structures that form the region. For example, the individual surface relief diffractive structures remain circular and concentric with the center point 105. However, cropping does change the shape of a diffractive optical power region as a whole by defining a new peripheral edge thereof. Prior to cropping, the peripheral edge, and thus, the dimensions of the diffractive optical power region are defined by the most peripheral surface relief diffractive structure (i.e., the circle with the largest diameter). Cropping cuts the most peripheral surface relief diffractive structure(s), thereby interrupting the closed curved shape thereof. The interrupted surface relief diffractive structure(s) are no longer closed curves, but arcs or segments thereof. The peripheral edge of the cropped diffractive optical power region includes one or more surface relief diffractive structures that are shaped as arcs (no longer forming closed curves).

Figure 4:
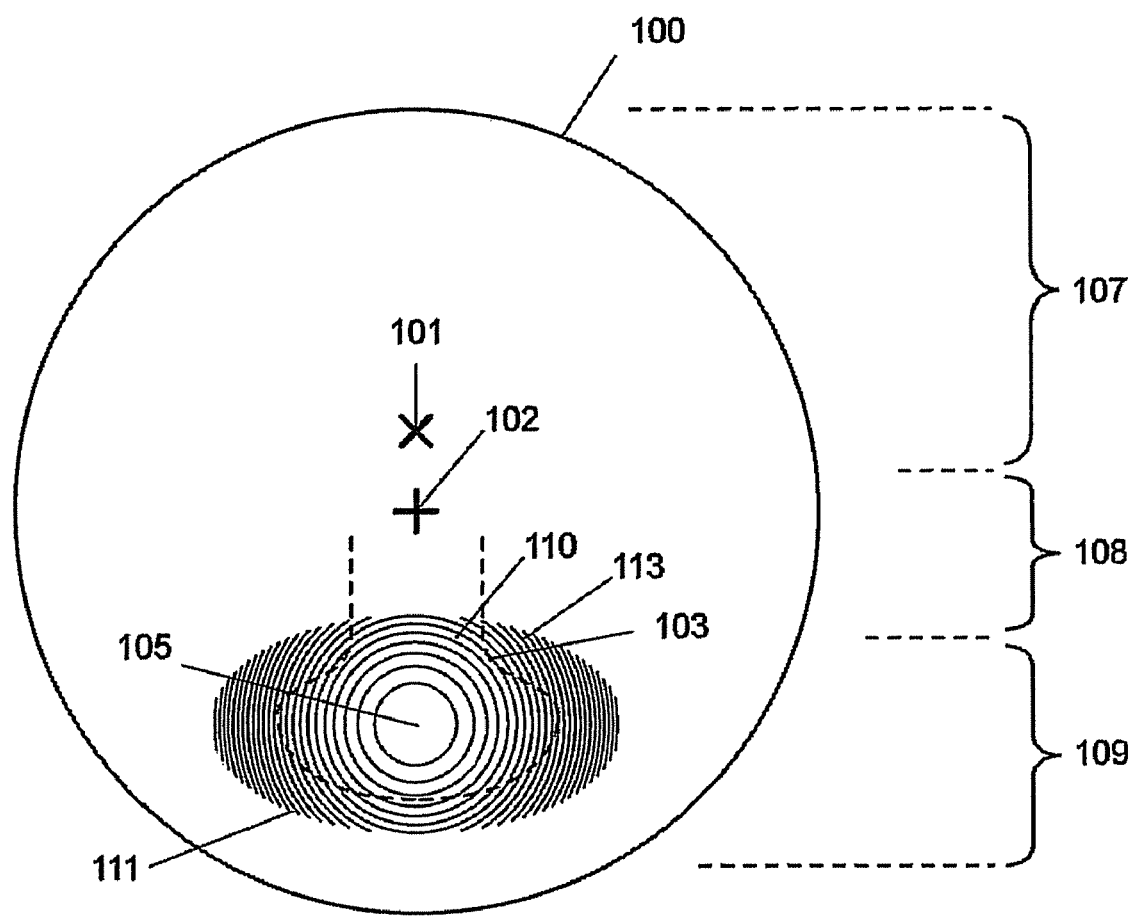

FIGS. 3 and 4 show front views of the lens 100 of FIG. 1 having a cropped diffractive optical power region 111, in accordance with various aspects of the present invention. A "cropped diffractive optical power region" is a diffractive optical power region having one or more diffractive structures 113 that do not form closed curves. Instead the diffractive structures are shaped as arcs, e.g., closed segments of complete closed curves (e.g., circles or ellipses). These diffractive structures 113 may be referred to as "discontinuous". The cropped diffractive optical power region 111 can also have surface relief diffractive structures that form complete closed curves. Diffractive structures that form complete closed curves are referred to as "continuous". Diffractive structures 110 depicted in FIG. 1, e.g., can be considered continuous. Continuous diffractive structures are typically located radially interior to the discontinuous diffractive structures 113. The peripheral boundary of the cropped diffractive optical power region 111 is referred to as the "cropping boundary".

Typically, the portions of continuous diffractive structures that are not present (i.e., cropped) in the discontinuous diffractive structures 113 are those that, if present, would have the highest degree of spherical aberration. Thus, the exclusion of these portions in a cropped diffractive optical power region provides fewer vision compromises than a comparable diffractive optical power region having the same optical power (i.e., the same radial spacing of diffractive structures) that is not cropped (i.e., having continuous diffractive structures).

Although, the cropped diffractive optical power region 111 is shown to have a "D" shape and an elliptical shape in FIGS. 3 and 4, respectively, it may be appreciated that the cropped diffractive optical power region may have any shape.

Figure 5:
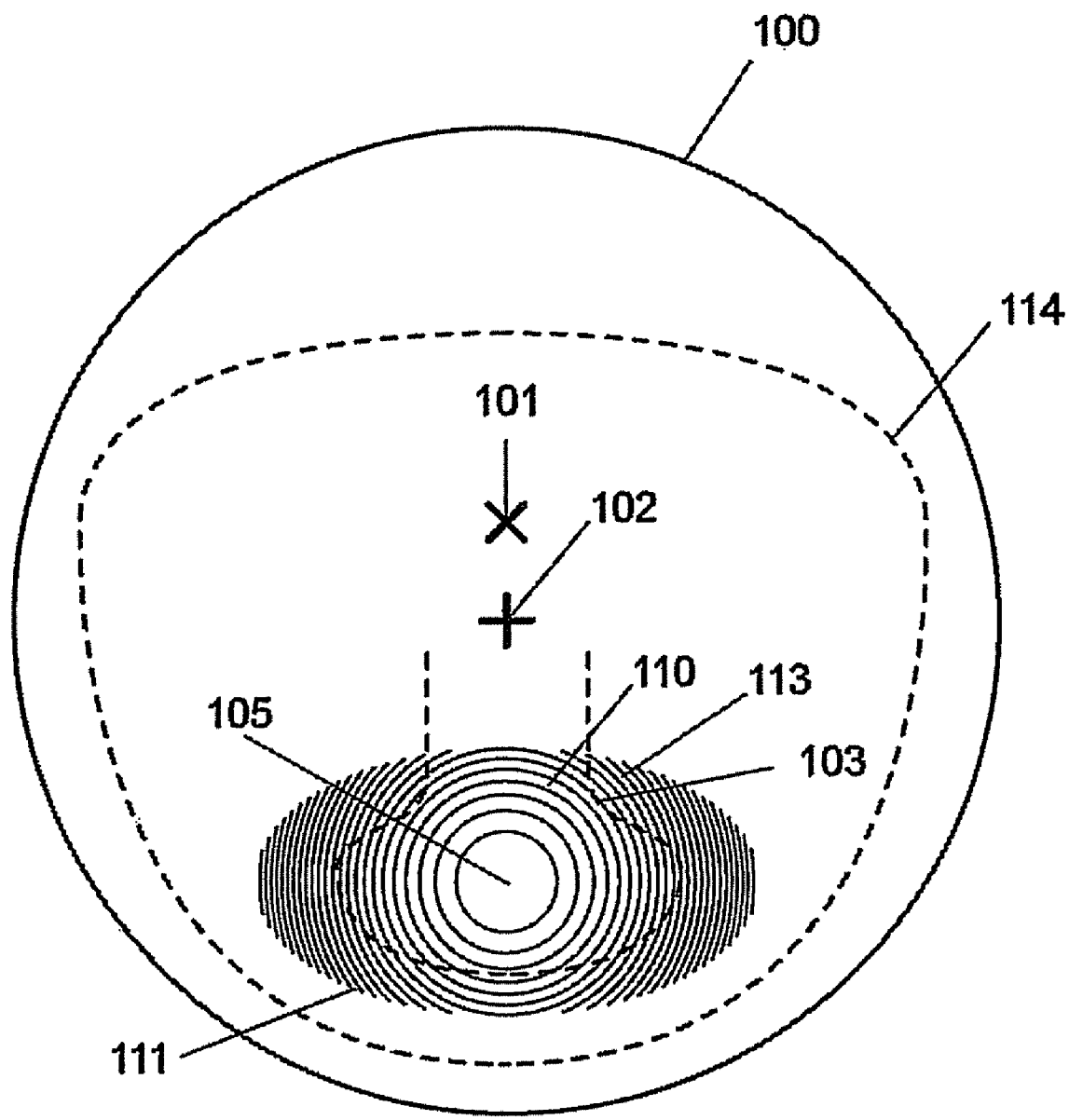
FIG. 5 shows a front view of the lens 100 of FIG. 4 having an edging boundary.

FIG. 5 shows a front view of the lens 100 of FIG. 4 having an edging boundary 114, in accordance with an aspect of the present invention. The edging boundary 114 is a boundary to which the lens 100 can be edged to be mounted in a spectacle lens frame, e.g., without damaging or altering the optical properties of the cropped diffractive optical power region 111. Edging to the edging boundary may be particularly important in embodiments shown in FIGS. 15 and 16, when the diffractive optical power region is formed from an electro-active element, in accordance with an aspect of the present invention. In such embodiments, edging the diffractive optical power region may cause physical damage to the electro-active element, such as leaking of electro-active material.

Figure 6A:
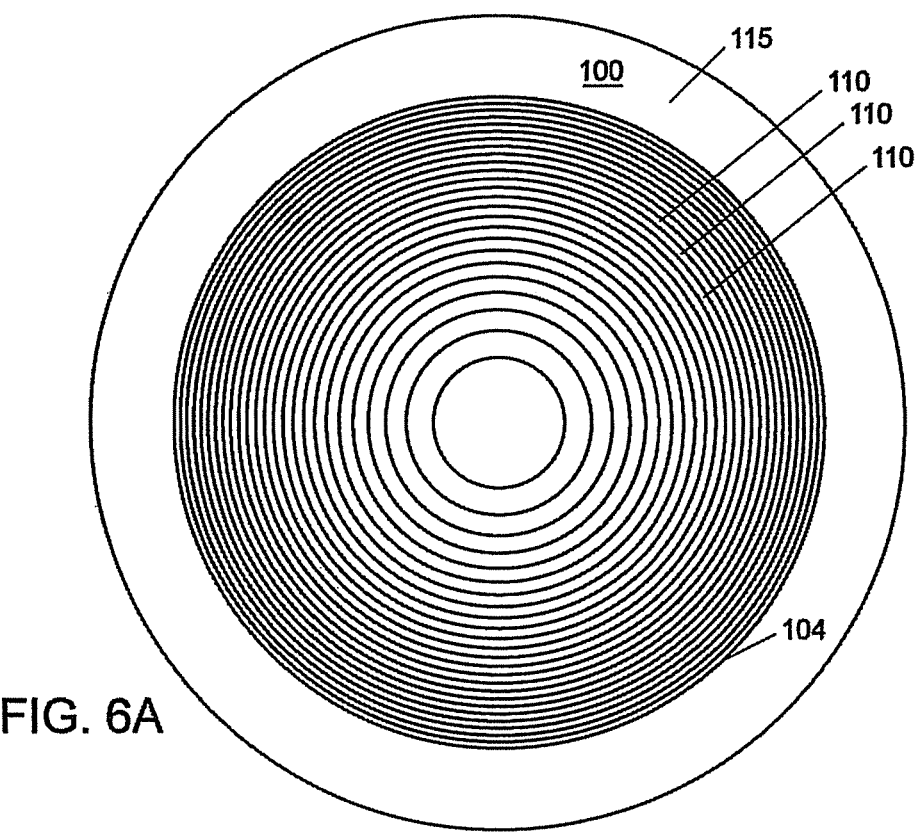
FIGS. 6A and 6B show front views of the lens 100 of FIG. 1 having substrate layers with a continuous and a cropped diffractive optical power region, respectively.
Figure 6B:
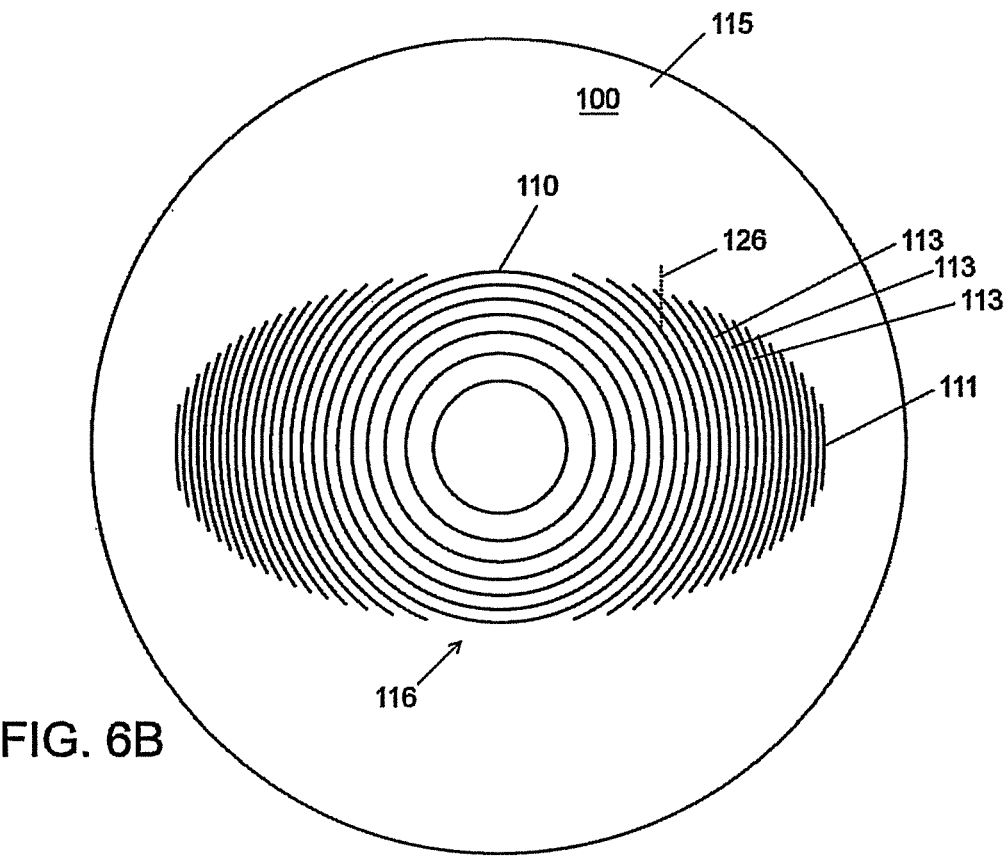

FIGS. 6A and 6B show front views of the lens 100 of FIG. 1 having substrate layers 115 with a continuous diffractive optical power region 104 and a cropped diffractive optical power region 111, respectively, in accordance with various aspects of the present invention. The substrate layer 115 may be composed of any transparent optical material suitable for use in an ophthalmic spectacle lens such as, e.g., ultra-violet (UV) and/or thermally cured monomer resins, or thermoplastics. The diffractive optical power region 111 may be formed into a tool for casting, stamping, embossing, or thermo-forming the diffractive optical power region 111 into a transparent optical material suitable for an ophthalmic spectacle lens using methods known in the art. Such tools are typically composed of metal, e.g., a nickel coated aluminum, stainless steel material, or any other known material(s).

FIG. 6A shows the substrate layer 115 having closed curves forming the continuous diffractive structures 110 of the diffractive optical power region 104.

FIG. 6B shows the substrate layer 115 having discontinuous curves forming the discontinuous diffractive structures 113 of the cropped diffractive optical power region 111. The cropped diffractive optical power region 111 also has continuous closed curves forming the continuous diffractive structures 110. FIG. 6B has a cropping boundary 116 (i.e., the outer boundary of the cropped diffractive optical power region 111). The cropping boundary 116 lies completely within the peripheral edge of the substrate layer 115.

Various methods and devices may be used to cut diffractive structures 113 into the substrate layer 115 of FIGS. 6A and 6B so that the diffractive structures may be recessed into the lens or protruding out from the lens.

In one method, a diamond machine tool is used to cut or etch grooves directly into the substrate layer to form the curves of the diffractive structures. Alternatively, the grooves may be cut into a mold tool (or mold master for later replication) for casting or embossing the substrate layer. The lathe may utilize a diamond tipped cutting tool that is angled perpendicular to an outer surface of the substrate layer. The lens or mold tool is rotated and the cutting tool may be moved along a direction parallel to the axis of the lens rotation (normal to the plane of rotation). When the cutting tool is moved inwards towards the lens, the tool penetrates the substrate layer, removing material from the layer. Likewise, when the cutting tool is moved away from the lens, the tool releases from the substrate layer and no material is removed from the layer. Thus, as the lens or mold tool rotates, the cutting tool may penetrate the lens to form rotationally symmetric (i.e., circular) grooves. Alternatively, elliptical grooves may be cut into the lens by rotating the lens about an axis and moving the cutting tool in a line as the cutting tool penetrates the lens surface at a constant depth. Similarly, the cutting tool may be moved in other patterns to cut grooves having other curvatures.

Figure 7:
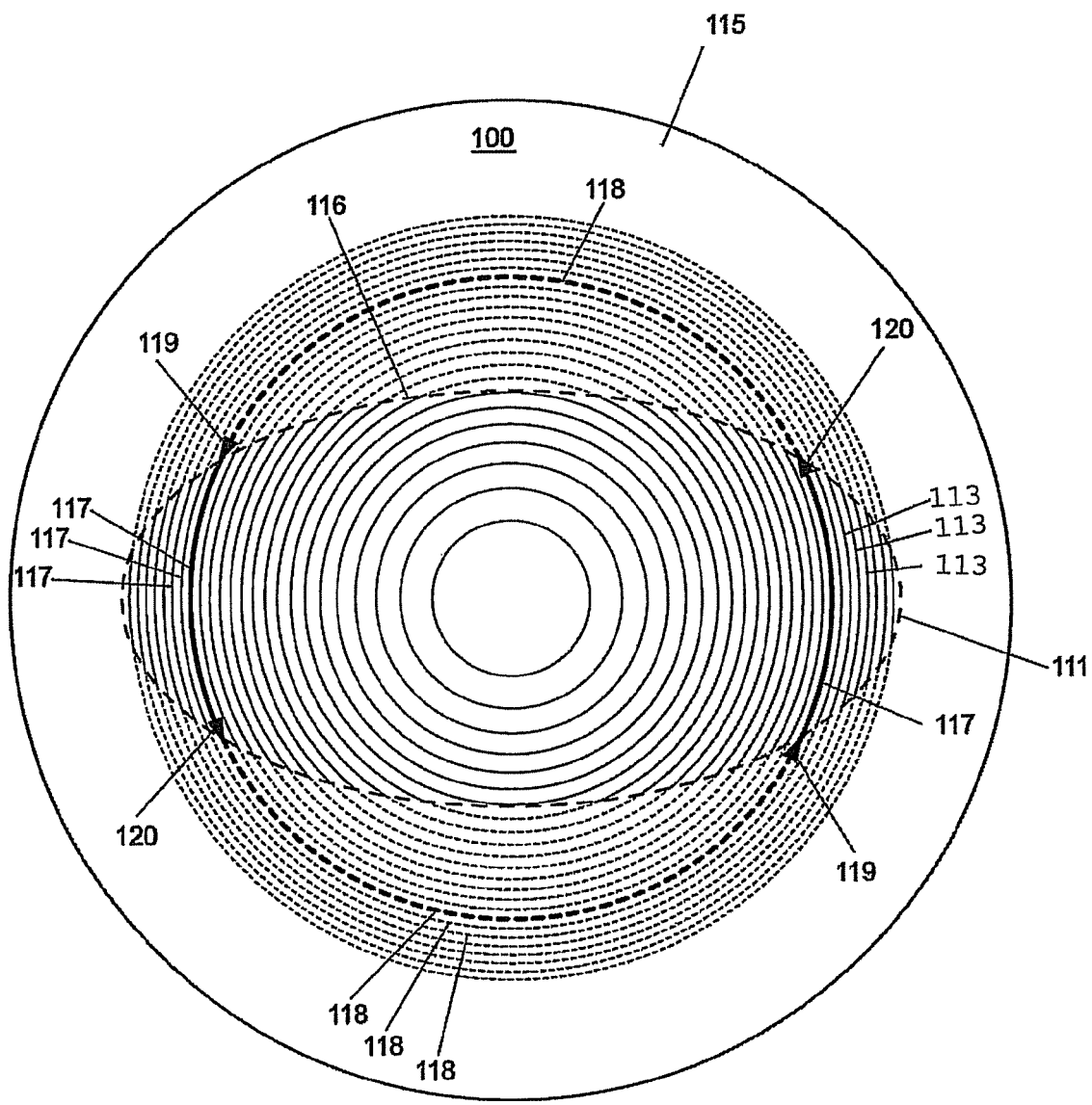
FIG. 7 shows a path along which a cutting tool orbits the lens 100 of FIG. 6B to cut the cropped diffractive optical power region into the substrate layer.
Figure 8A:
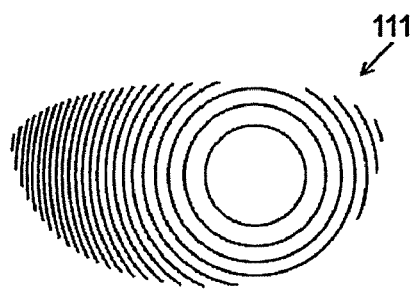
FIGS. 8A-8I show front views of cropped diffractive optical power regions having a variety of shapes.
Figure 8B:
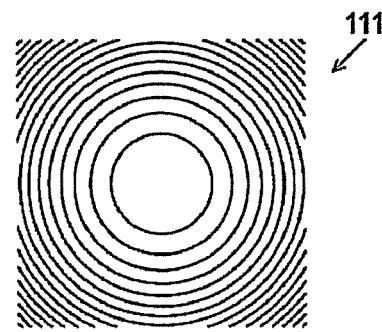
Figure 8C:
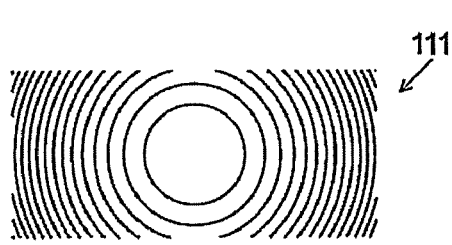
Figure 8D:
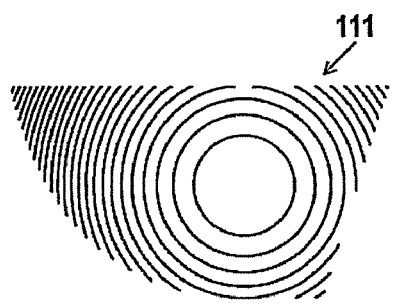
Figure 8E:
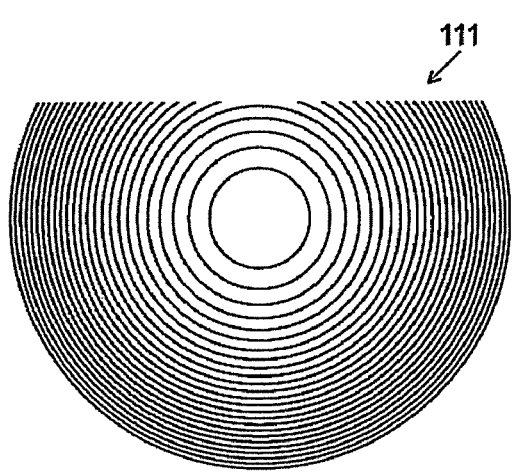
Figure 8F:
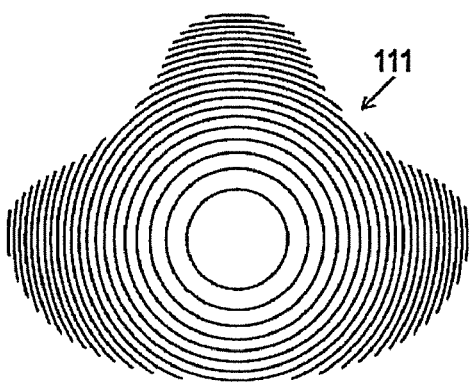
Figure 8G:
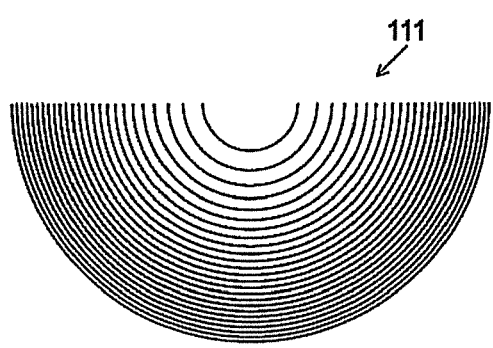
Figure 8H:
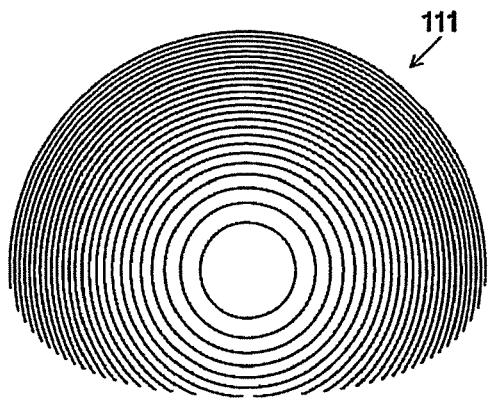
Figure 8I:
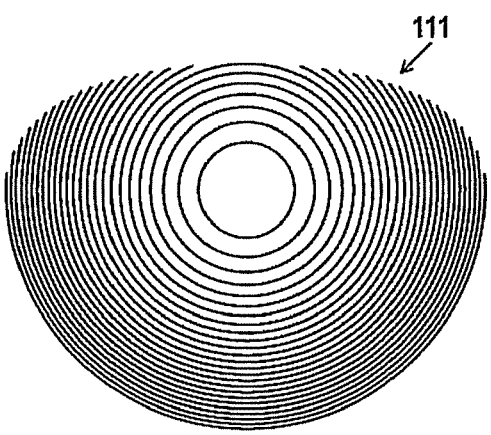

The discontinuous diffractive structures 113 of FIG. 6B are cut into the substrate layer as shown in FIG. 7.

FIG. 7 shows a path along which a cutting tool orbits the front view lens 100 of FIG. 6B to cut a cropped diffractive optical power region 111 into the substrate layer 115, in accordance with an aspect of the present invention. The orbital path is marked by solid paths 117 indicating the tool is cutting into the substrate layer 115 and dashed paths 118 indicating the tool is not cutting into the substrate layer 115. The cutting tool weaves into and out of the substrate layer 115, entering the lens 100 at an entry point 119 to initiate cutting and exiting the lens 110 at an exit point 120 to stop cutting. The locations of the entry point 119 and the exit point 120 define where the diffractive structures are cut into the substrate layer 115 and where they are not. The entry point 119 and the exit point 120 form the ends of the curved arcs of the discontinuous diffractive structure 113. The entry point 119 and the exit point 120 lie on and define the cropping boundary 116. Interior to the cropping boundary 116, the cutting tool engages the substrate layer 115 and cuts the grooves of the discontinuous surface relief diffractive structure 113 (along the solid paths 117). Exterior to the cropping boundary 116, a mechanical actuator typically removes the tool from the substrate layer 115 as the cutting tool orbits the lens when it is unengaged (along the dashed paths 118). Thus, the discontinuous diffractive structures 113 of the cropped diffractive optical power region 111 are cut into the substrate layer 115. The cropped diffractive optical power region 111 can be cut into the substrate layer 115 with a cutting tool using fast-tool servo or slow-tool servo techniques, although other known techniques and tools for cutting the substrate layer 115 can be used. The area exterior to the cropping boundary 116, which is not cut, typically includes the compromised vision region 106 shown in FIG. 1, near the peripheral edge of the continuous diffractive optical power region 104. The compromised vision region 106 may be predicted to, if formed, provide a high degree of chromatic aberration.

Although the orientation of rotation of the lens 100 in FIG. 7 is shown to be counterclockwise (indicated by arrows at the entry and exit points 119 and 120) it may be appreciated that the orientation can be reversed to clockwise. If the orientation of rotation of the lens 100 is reversed, the positions of the entry point 119 and the exit point 120 are also reversed.

Although, FIG. 7 is described in reference to elliptically shape cropped diffractive optical power region 111, it may be appreciated that a similar process may be used to crop a diffractive optical power region to have any rotational shape. In one approach, the entry point 119 and the exit point 120 may be positioned at alternative locations on a surface of the lens 100 to define a cropping boundary having a desired shape and size.

FIGS. 8A-8I show front views of cropped diffractive optical power regions 111 having a variety of shapes, in accordance with various aspects of the present invention. It is to be understood that other shapes and sizes of cropped diffractive optical power regions 111 are possible using the techniques described herein. The cropped diffractive optical power regions 111 shown in FIGS. 8A-8I may also be made coincident with the continuous diffractive optical power region 104 of FIG. 6A.

The continuous diffractive structures 110 of the diffractive optical power region 104 of FIG. 6A can be cut into the substrate layer 115 by penetrating the layer with the cutting tool at different radii while the lens 100 rotates. The lens 100 may rotate at least a full rotation (e.g., at least 360° relative to the cutting tool before the cutting tool is moved to the next radius. Alternatively, the cutting tool may move continuously outward as the lens rotates in the lathe, forming spiraling groove(s).

However, having a discontinuity may introduce other optical difficulties. Typically, when the cutting tool cuts with an instantaneous puncture or release, a sharp discontinuous gradient in depth of the substrate layer 115 forms along the cropping boundary 116 of the cropped diffractive optical power region 111. The discontinuous gradient in depth causes an unwanted line along the cropping boundary 116. To solve this problem, a blend zone may be added to blend this boundary.

Conventional blend zones typically blend optical power. Optical power is blended between a diffractive region and another region by altering the radial positions of the diffractive structures. A more detailed description of such embodiments may be found in U.S. application Ser. No. 11/595,971 filed on Nov. 13, 2006 and entitled "Electro-Active Ophthalmic Lens Having an Optical Power Blending Region", which is incorporated herein by reference in its entirety. The optical power of the diffractive region generally decreases to zero where the diffractive structures meet the rest of the lens. Thus, an abrupt change in optical power and thus, any line, at this boundary between the diffractive structures and the rest of the lens is eliminated. Although this blend zone reduces the visibility of the line from the lens, it has other further disadvantages. One disadvantage is that, as the optical power decreases to zero in the blend zone, the blend zone has little optical use.

To solve this problem, a blend zone is proposed that blends the diffractive optical power region by reducing the diffractive efficiency thereof to zero extending radially towards the peripheral edge thereof. Diffraction efficiency is the fraction of incident light that is directed into the desired diffraction order (i.e., the design optical power or focal length of the lens). As the diffractive efficiency of the diffractive optical power region approaches zero, the fraction of light that is focused by the diffractive optical power region is likewise reduced to zero. Thus, at the peripheral edge of the diffractive optical power region, the diffractive efficiency is blended to zero and the optical effect of the region is likewise blended to zero, forming a gradual and lineless boundary.

The diffraction efficiency, $\eta$, at the design focal length is mathematically defined as:

$$\eta = \left\{ \frac{\sin\left[\left[1 - \frac{\Delta\phi}{2\pi}\right]\pi\right]}{\left[1 - \frac{\Delta\phi}{2\pi}\right]\pi} \right\}^2 \quad (2)$$

where $\Delta\phi$ is the phase delay generated by a diffractive optic, such as, the surface relief diffractive structures.

Equation (2) shows that the diffraction efficiency, $\eta$, is 1 (100% of incident light is focused to the design focal length) when the phase delay, $\Delta\phi$, is $2\pi$, and zero (no light is focused to the design focal length) when the phase delay, $\Delta\phi$, is zero.

When a surface relief diffractive structure having a first refractive index, $n_1$, is in contact with another optical structure having a second refractive index, $n_2$, the phase delay $\Delta\phi$ is defined as:

$$\Delta\phi = 2\pi \frac{n_1 - n_2}{\lambda} d \quad (3)$$

where $\lambda$ is the incident optical wavelength d is the depth of a diffractive structure.

Together equations (2) and (3) show that as the depth, d, of the diffractive structure is smoothly blended to zero, the diffraction efficiency is likewise blended to zero.

Thus, a diffraction efficiency blend zone can be formed by blending the heights of the diffractive structures.

Figure 9A:
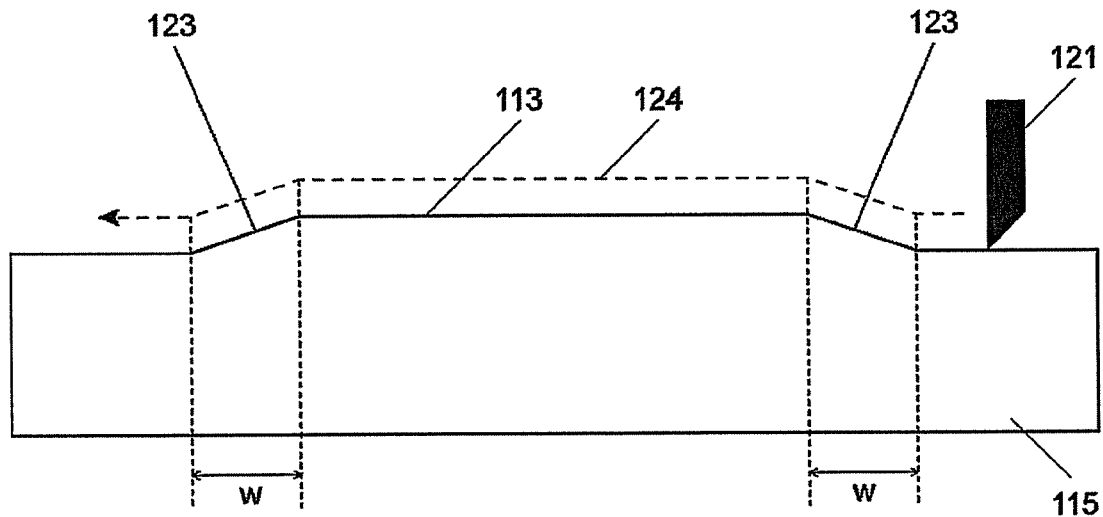
FIGS. 9A and 9B show side views of the lens 100 of FIG. 6B having the cropped diffractive optical power region with discontinuous diffractive structures and a blend zone for blending the discontinuous diffractive structures.
Figure 9B:
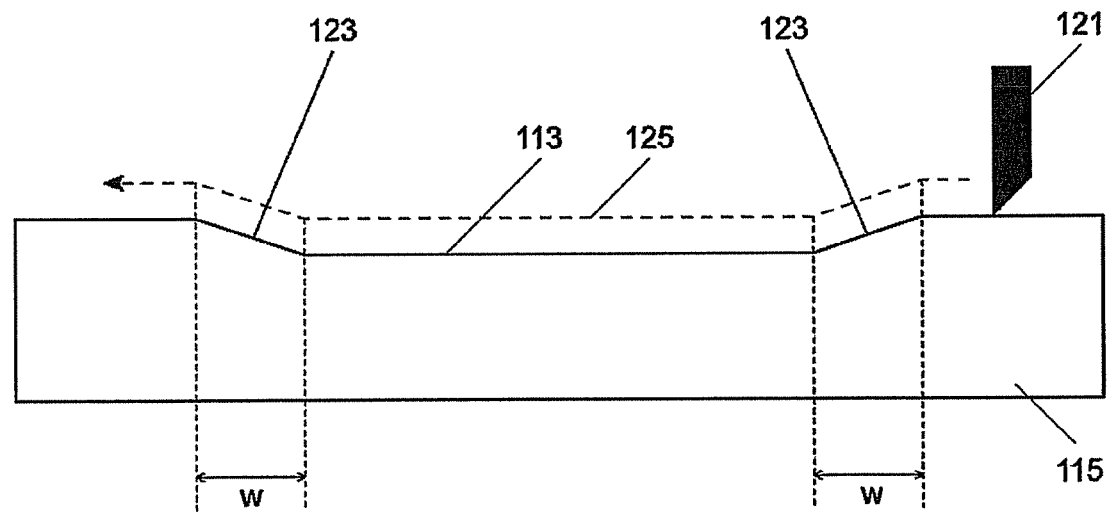

FIGS. 9A and 9B show side views of a single discontinuous curve of a discontinuous diffractive structure 113 and a blend zone 123 for blending the discontinuous curve, in accordance with various aspects of the present invention. The blend zone 123 is achieved by varying the heights of the discontinuous curve at the cropping boundary of the cropped diffractive optical power region. As the cutting tool 121 approaches the cropping boundary, the cutting tool enters and exits the substrate layer 115 over the blend zone 123 having a distance, w, predetermined to cause a continuous gradient in the height of the discontinuous curve (e.g., from a minimum (0) to a maximum value). This continuous gradient in depth is predetermined to blend the cropped diffractive optical power region to form a lineless cropping boundary. The distance, w, for the entry and exit of the cutting tool is in a range of from, e.g., approximately 0.5 millimeters (mm) to approximately 4 mm, and is preferably approximately 1 mm, although any distance, w can be used.

In FIG. 9A, the cutting tool 121 cuts the substrate layer along a path 124 predetermined to form a protruding discontinuous curve. In FIG. 9B, the cutting tool 121 cuts the substrate layer along a path 125 predetermined to form a recessed discontinuous curve. Although the discontinuous curves of FIGS. 9A and 9B are physically inverted, they are generally optically equivalent.

Figure 10A:
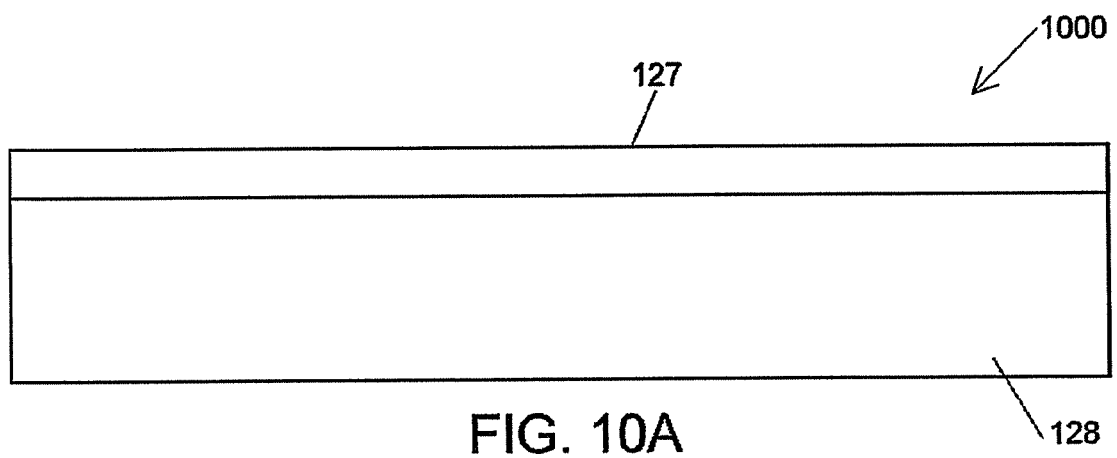
FIGS. 10A-10C show side views of lenses in sequential stages of etching the cropped diffractive optical power region of FIG. 6B into a substrate layer of a lens.
Figure 10B:
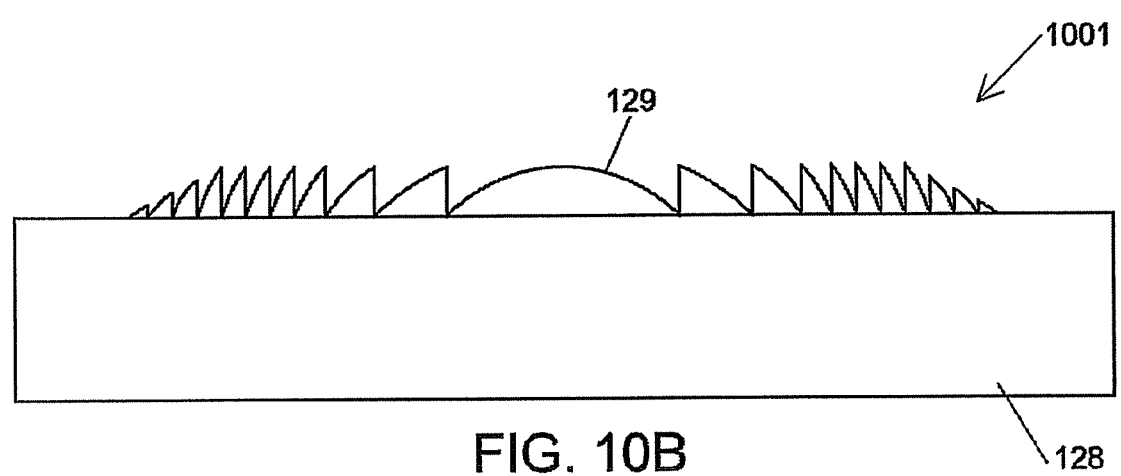
Figure 10C:
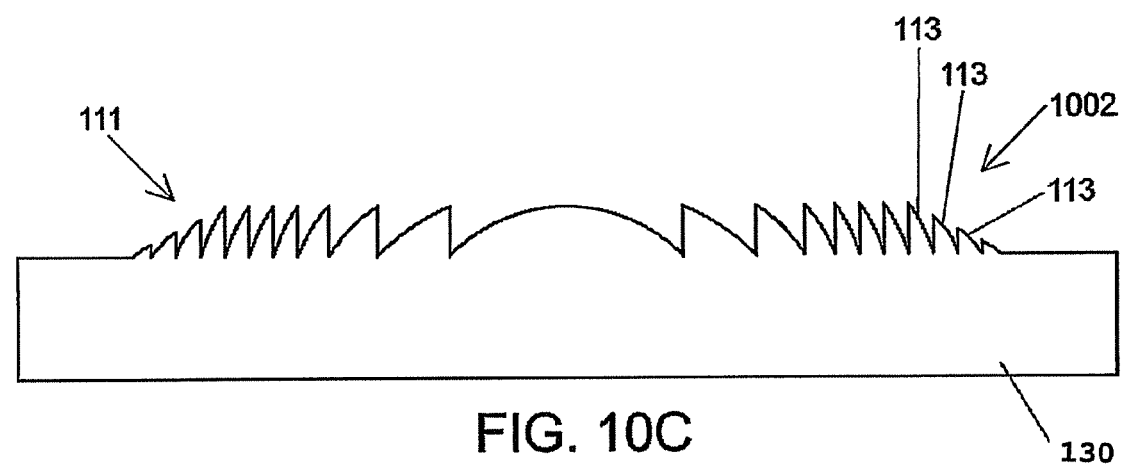

In contrast to FIGS. 7, 9A and 9B, which show a blended cropped diffractive optical power region formed using a cutting tool, the blended cropped diffractive optical power region may alternatively be etched using known semiconductor processing tools and techniques, as shown in FIGS. 10A-10C.

FIGS. 10A-10C show side views of lenses 1000-1002, respectively, in sequential stages of etching a cropped diffractive optical power region onto a substrate layer of a lens, in accordance with various aspects of the present invention.

FIG. 10A shows a side view of a lens 1000 having a flat substrate layer 128 coated with an etch resist layer 127. The etch resist layer 127 may be composed of, e.g., a photoresist, although other materials may be used. The substrate material may be the desired final material for the lens or may be a mold material from which the desired diffractive structures may be cast, stamped, thermo-formed, or embossed.

FIG. 10B shows a side view of a lens 1001 having the flat substrate layer 128 of FIG. 10A and a patterned etch resist layer 129 having a surface relief diffractive topography. The surface relief diffractive topography is formed by patterning the etch resist layer 129, e.g., using known semiconductor processing tools and techniques. For example, the etch resist layer can be patterned using any gray-scale lithography process such as, for example, techniques using a direct laser writing or exposure through a variable transmission high energy beam sensitive (HEBS) photo mask. The surface relief diffractive topography has a pattern of discontinuous diffractive structures. The surface relief diffractive topography can decrease in height at the periphery of the diffractive region to form a blend zone. The discontinuous diffractive structures may have a wide variety of shapes, e.g., such as those shown in FIGS. 8A-8I. In one approach, the surface relief diffractive topography is formed by initially patterning the etch resist layer 127 with continuous diffractive structures and then cropping those structures to form discontinuous diffractive structures that have a smooth blending in height at their peripheral edge. Alternatively, the discontinuous diffractive structures and blend zones are patterned directly into the etch resist layer.

FIG. 10C shows a side view of a lens 1002 having a patterned substrate layer 130 with the cropped diffractive optical power region 111 having the discontinuous diffractive structures 113 of FIG. 6B. The discontinuous diffractive structures 113 are formed by transferring the surface relief diffractive pattern from the patterned etch resist layer 129 of FIG. 10B to the flat substrate layer 128 of FIG. 10B. In one approach, the pattern is transferred by placing the lens 1001 of FIG. 10B into a dry-etch chamber such as, for example, a reactive ion etching (RIE) machine. The dry-etch chamber etches through both the patterned etch resist layer 129 and the flat substrate layer 128 of FIG. 10B to transfer the diffractive pattern. Once transferred, the patterned substrate layer 130 of FIG. 10C is formed having a blended cropped diffractive optical power region 111 with discontinuous diffractive structures 113.

Figure 11:
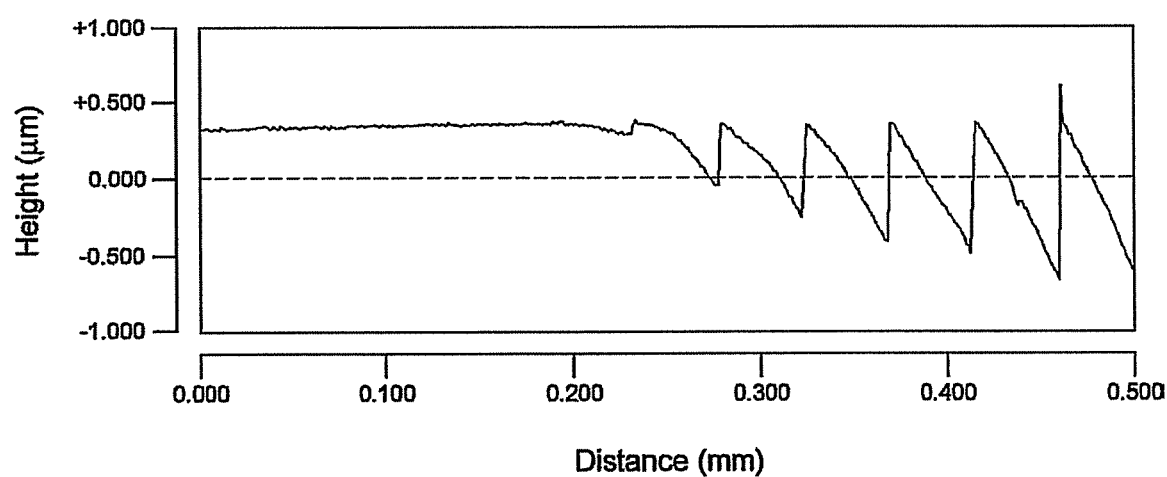
FIG. 11 is a graph of a measured surface topography of a mold for manufacturing a lens having a blended cropped diffractive optical power region.

FIG. 11 is a graph of a measured surface topography of a mold for manufacturing a lens from the peripheral edge of the lens towards the center of the lens, in accordance with an aspect of the present invention. The lens has a cropped diffractive optical power region and a blend zone. The diffractive optical power region can be cropped, e.g., as described in FIGS. 7 and 9B or alternatively, in FIGS. 10A-10C. The cropped diffractive optical power region has a cropping boundary with an elliptical shape. The elliptical shape of the cropping boundary has a major axis of, e.g., approximately 30 mm and a minor axis of, e.g., approximately 16 mm. The blend zone includes diffractive structures having a continuous change in the heights that approach zero at the cropping boundary (i.e., where the peripheral edge of the diffractive optical power region meets the rest of the mold). The blend zone is positioned exterior to the cropping boundary. Alternatively, the blend zone is positioned interior to or centered at the cropping boundary. The blend zone has a width of, e.g., approximately 1 mm. Although, the blend zone can have a width in a range of, e.g., approximately 0.1 mm to approximately 5.0 mm, and preferably in a range of, e.g., approximately 0.2 mm to approximately 1.0 mm. The cropped diffractive optical power region provides, e.g., +1.25 diopters (D) of optical power for light having a wavelength of, e.g., 550 nanometers. Other dimensions, optical powers, and wavelengths can be used for the mold for casting a lens having other desired physical or optical properties.

The graph shows the height of the surface relief diffractive structures of the mold (measured in micrometers (μm)) along a length of the surface of the mold (measured in millimeters (mm)). The surface length in this example is measured along a measurement line 126 shown in FIG. 6B. In this example, the measurements are provided by a Zygo white light interferometer.

Figure 12A:
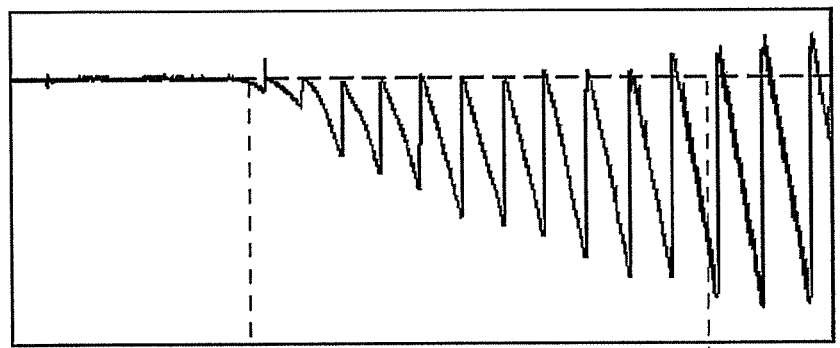
FIGS. 12A-12C are graphs of the surface topography, optical power, and diffractive efficiency, respectively, of the lens mold of FIG. 11, measured across the blend zone of the cropped diffractive optical power region.
Figure 12B:
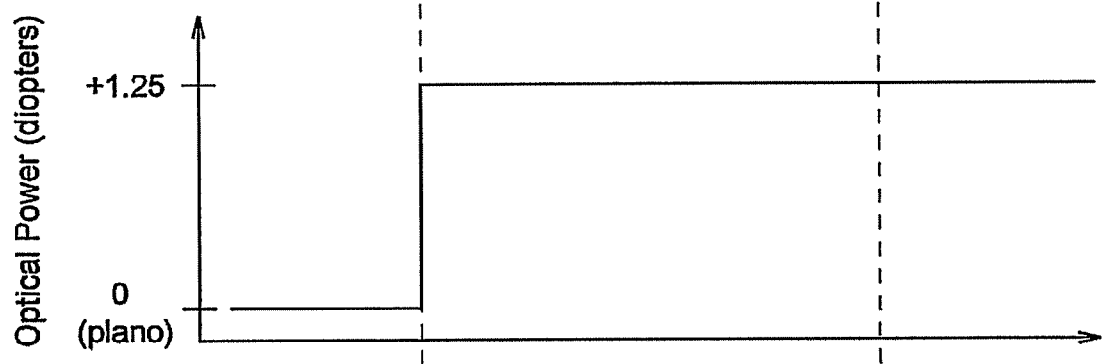
Figure 12C:
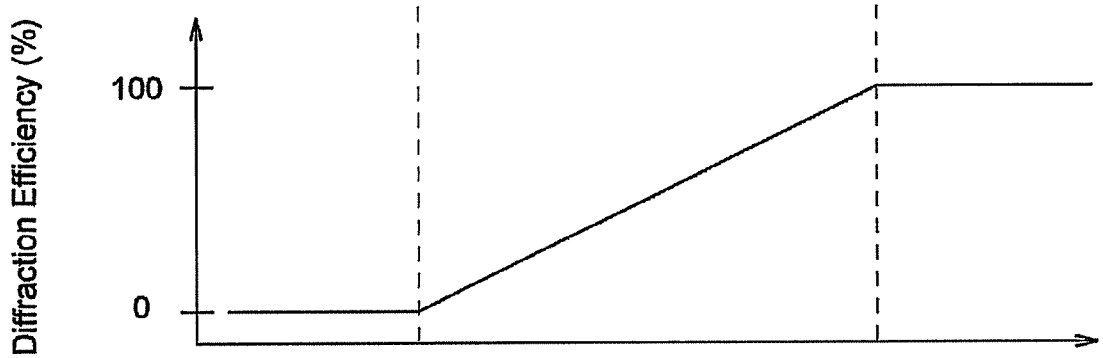

FIGS. 12A-12C are graphs of the surface topography, optical power, and diffractive efficiency of a lens, respectively, measured across a blend zone of a diffractive optical power region of the lens mold described in reference to FIG. 11, in accordance with various aspects of the present invention.

The relationship between the diffractive efficiency in FIG. 12C and the heights of the diffractive structures in FIG. 12A measured along a length of the lens mold is defined by equations (2) and (3). As the heights of the diffractive structures decrease from a maximum value to zero, the diffractive efficiency of the blend zone likewise decreases to zero. The blend zone blends the diffractive region by varying the height of the diffractive structures and not the optical power thereof. As previously described, optical power is a function of the radii of the diffractive structures, e.g., according to equation (1), and is independent of the height of the diffractive structures. Thus, as the heights of the diffractive structures are varied for blending the diffractive efficiency, the optical power is not affected. Thus, a blended diffractive region having any optical power(s) can be achieved.

In FIG. 12B, the optical power of the diffractive optical power region is constant. Light focused by a constant optical power region is focused to a single corresponding focal point. However, since the diffractive efficiency of the blend zone decreases to approximately zero at the peripheral edge of the region, the amount of light focused thereby (to the focal point) likewise decreases to zero. Thus, although there is an abrupt change in optical power across the peripheral edge of the diffractive optical power region, the amount of light focused by, and therefore the visibility of, the diffractive optical power region gradually approaches zero at the peripheral edge to form a lineless boundary.

Figure 13A:
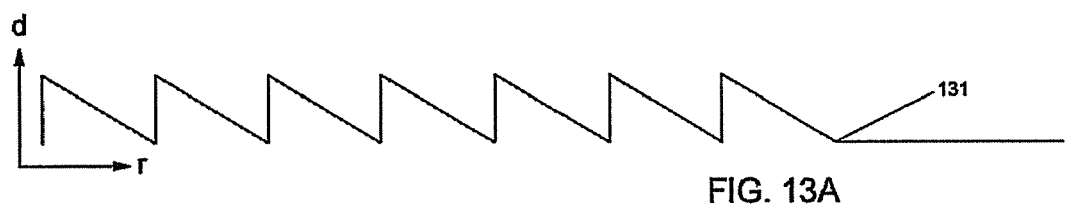
FIGS. 13A-13D are graphs of the surface topography of a lens having surface relief diffractive structures and blending functions for smoothing the surface topography of the diffractive structures.

FIG. 13A is a graph of the surface topography of a lens having diffractive structures with an abrupt termination point 131 at a cropping boundary, in accordance with an aspect of the present invention. The graph shows the height, d, of the surface relief diffractive structures as a function of the radial distance, r, across the cropping boundary. The diffractive structures are concentric and have a series of crests and adjacent troughs forming a sawtooth pattern. Each concentric diffractive structure extends from a trough to a crest of the sawtooth pattern. Diffractive structures may be used described according to embodiments found in U.S. application Ser. No. 12/054,313 filed on Mar. 24, 2008 and entitled "Surface Relief Diffractive Optical Elements", which is incorporated herein by reference in its entirety.

Figure 13B:
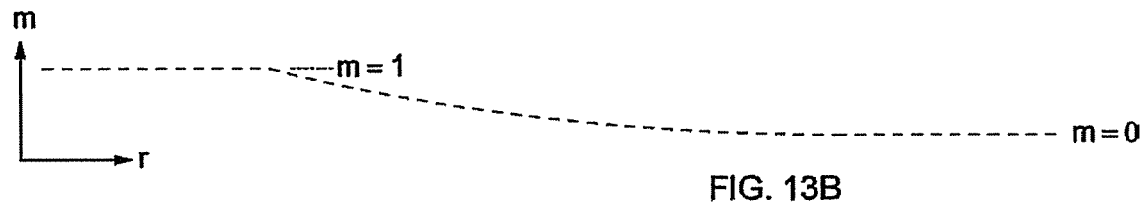

FIG. 13B is a graph of a blending function for blending the diffractive structures of the lens of FIG. 13A for reducing the abrupt termination point at the cropping boundary, in accordance with an aspect of the present invention. The graph shows the blending function, m, as a function of the radial distance, r, across the cropping boundary. The blending function monotonically decreases from the center of the lens to the cropping boundary. The blending function is shown to be initially constant (e.g., having a value of 1 for not altering depth) and then gradually decreasing over a finite distance. The blending function can be any continuous function or mathematical relation, such as, for example, constant functions, linear functions, polynomial functions, trigonometric functions, exponential functions, hyperbolic functions, or logarithmic functions, either alone or in combination.

Figure 13C:
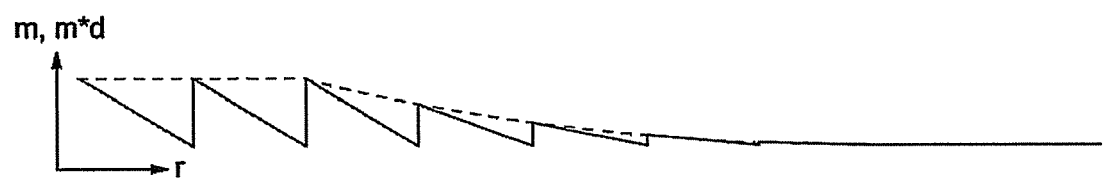

FIG. 13C is a graph of the product, m*d, of the height, d, of the diffractive structures of FIG. 13A and the blending function, m, of FIG. 13B as a function of the radial distance, r, across the cropping boundary, in accordance with an aspect of the present invention.

Figure 13D:
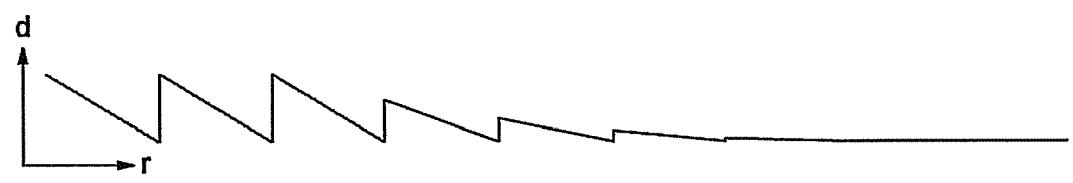

FIG. 13D is a graph of the blended surface topography of diffractive structures having heights that are the product of FIG. 13C, in accordance with an aspect of the present invention. The graph shows the height, d, of the blended surface relief diffractive structures as a function of the radial distance, r, across the cropping boundary. The height of the blended surface relief diffractive structures is the product of the height of the non-blended surface relief diffractive structures and the blending function.

When the blending function is applied to the surface topography of the surface relief diffractive profile, the blending function causes a monotonic decrease of the diffractive efficiency over the width, w of the blending zone. For a diffractive optical power region having a plurality of concentric diffractive structures, the height of a first diffractive structure (i.e., the distance between a first crest and a first trough adjacent thereto) near the center point of the diffractive optical power region is greater than the height of a second diffractive structure (i.e., the distance between a second crest and a second trough adjacent thereto) spaced from the center point.

The product scales the heights of the diffractive structures by a value (m), e.g., between one and zero (at the cropping boundary). Scaling is the application of a value function by an operator. In the example of FIG. 13C, the value function is a monotonically decreasing value function having a range of from 1 to 0 and the operator is multiplication.

By scaling the heights of the diffractive structures, the diffraction efficiency of the diffractive optical power region varies from a maximum to zero. The maximum diffraction efficiency occurs where the diffractive structures have full, unaltered peak heights. The maximum diffractive efficiency typically occurs near the center point of the concentric diffractive structures, i.e., interior to the blend zone. At the minimum (zero) diffraction efficiency, the diffractive optical power region focuses none of the incident light to the diffractive optical power. The minimum diffraction efficiency occurs where the diffractive structures have a peak height of zero. The minimum diffraction efficiency typically occurs at the periphery of the concentric diffractive structures, i.e., at the periphery of the blend zone.

At the region of maximum diffraction efficiency, the diffractive optical power region focuses approximately 100% of the incident light to the design optical power of the diffractive region. As the diffraction efficiency of the diffractive optical power region decreases to zero, the amount of light affected by the region decreases to zero and thus, the region becomes invisible. Thus, the lens having the blended surface topography of FIG. 13D has a diffractive optical power region that is fully blended by varying the diffractive efficiency thereof.

Figure 14A:
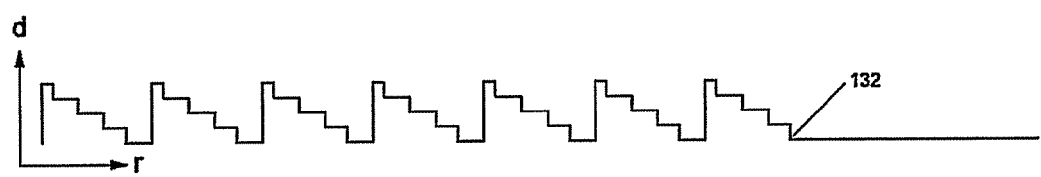
FIG. 14A-14D is a graph of the surface topography of a lens having multi-level surface relief diffractive structures and blending functions for smoothing the surface topography of the multi-level diffractive structures.

FIG. 14A is a graph of the surface topography of a lens having multi-level surface relief diffractive structures that end at an abrupt termination point 132 at a cropping boundary, in accordance with an aspect of the present invention. The surface topography of the multi-level surface relief diffractive structures is a discrete function, such as a stair-step function or a combination of square functions. The diffraction efficiency of the multi-level surface relief diffractive structure increases as the height of the highest level increases. Multi-level surface relief diffractive structures are known to approximate the surface relief diffractive structures of FIG. 13A. The diffraction efficiency of a multi-level surface relief diffractive structure is less than the diffractive efficiency of the surface relief diffractive structures approximated thereby. As the number of levels per zone used to approximate the surface topography increases, the diffraction efficiency thereof likewise increases.

Figure 14B:
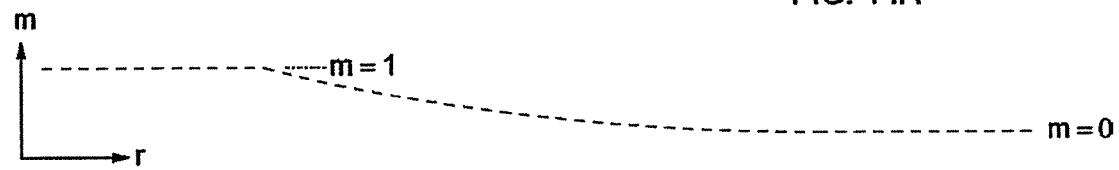

FIG. 14B is a graph of a blending function for blending the surface topography of the diffractive structures FIG. 14A for reducing the abrupt termination point at the cropping boundary, in accordance with an aspect of the present invention. The blending function may be the blending function of FIG. 13B.

Figure 14C:

FIG. 14C is a graph of the product of the surface topography of the diffractive structures of FIG. 14A and the blending function of FIG. 13B, in accordance with an aspect of the present invention.

Figure 14D:
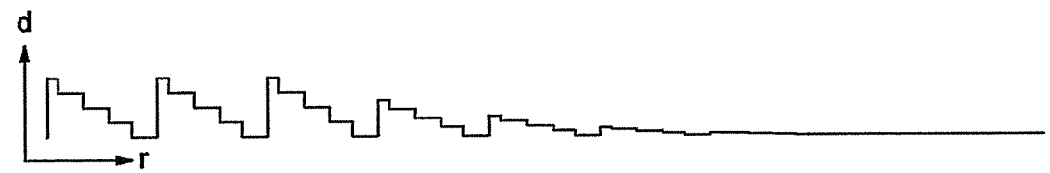

FIG. 14D is a graph of the blended surface topography of diffractive structures having heights that are the product of FIG. 14C, in accordance with an aspect of the present invention. As described in reference to FIGS. 13A-13D, the lens having the blended surface topography of FIG. 13D has a diffractive optical power region that is fully blended by varying the diffractive efficiency thereof.

Although a static diffractive optical element is described in the aforementioned figures having surface relief diffractive structures that utilize a physical gradation in surface topography predetermined to cause diffractive effects, alternatively, a dynamic diffractive optical element can be used, as shown in FIGS. 15, 16, and 17A-17D to generate all of the optical results achieved by the static structure, in accordance with an aspect of the present invention.

Figure 15:
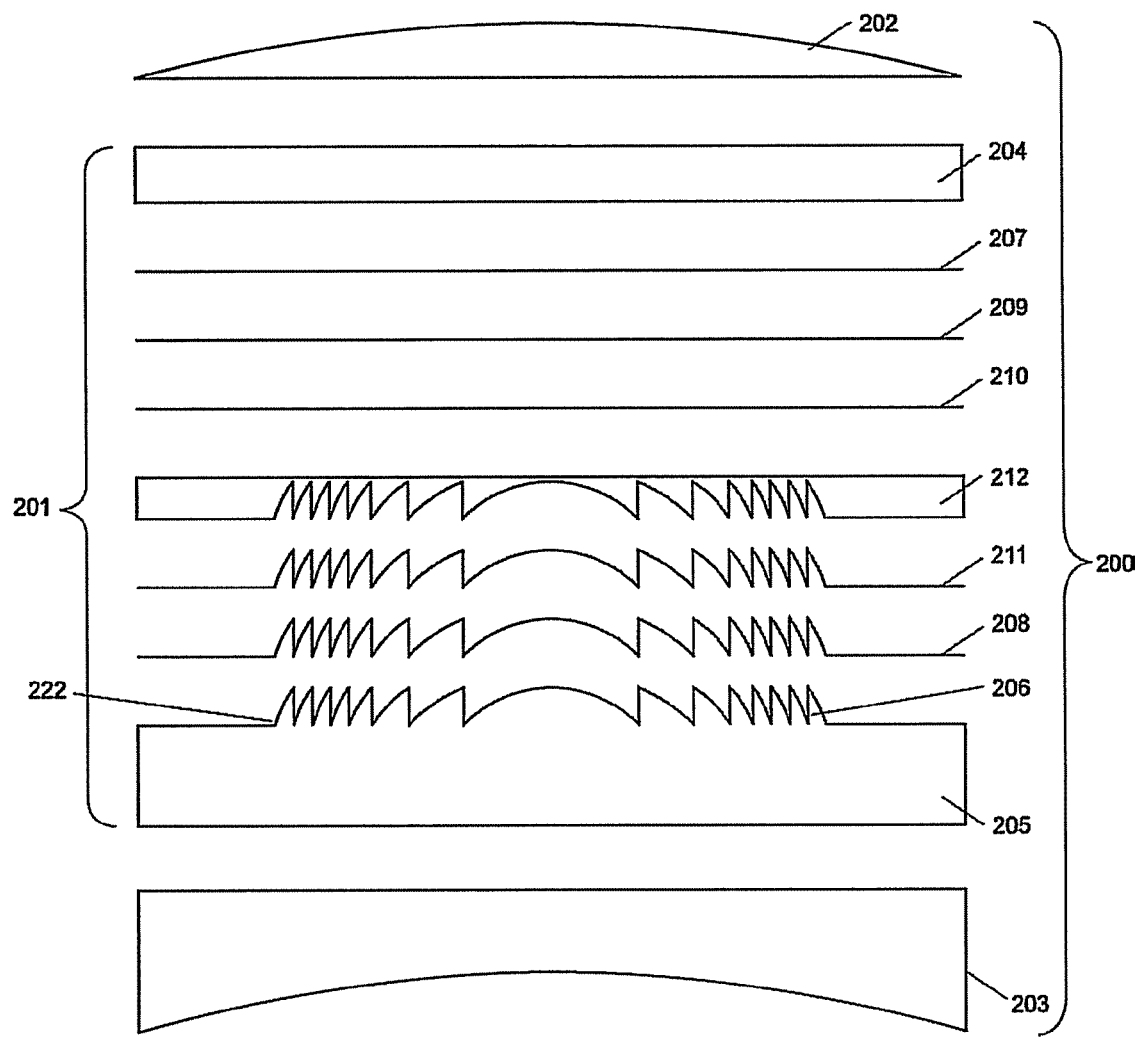
FIGS. 15 and 16 show exploded cross-sectional views of an electro-active lens.

FIG. 15 shows a first exploded cross-sectional view of an electro-active lens 200, in accordance with an aspect of the present invention. The lens 200 includes an electro-active element 201 disposed between a first optical element 202 and a second optical element 203. The electro-active element 201 includes a first substrate layer 204, a second substrate layer 205, transparent electrodes 207 and 208, an insulating layer 209, alignment layers 210 and 211, and electro-active material 212. A more detailed description of such embodiments may be found in U.S. application Ser. No. 12/018,048 filed on Jan. 22, 2008 and entitled "Cholesteric Liquid Crystalline Material", which is incorporated herein by reference in its entirety.

The electro-active element 201 is in optical communication with the first and second optical elements 202 and 203. The electro-active element 201 is attached to the first and second optical elements 202 and 203, e.g., by adhesive layers (not shown). The first and second optical elements 202 and 203 may be convex and concave, respectively, or otherwise shaped or finished to provide desired optical effects. For example, a refractive progressive optical power region can be formed on interior or exterior surfaces of a portion of either or both of the first and second optical elements to cause a progression in optical power. Either or both of the first and second optical elements 202 and 203 may have external surfaces which may be unfinished, semi-finished, or finished. Either or both optical elements 202 and 203 may be formed as the first and second substrate layers 204 and 205, respectively.

The first substrate layer 204 has a flat surface topography and the second substrate layer 205 has a surface relief diffractive topography formed by diffractive structures 206. Although the surface topography of the first substrate layer 204 is shown to be flat, any substantially featureless surface topography (e.g., curved) may be used. The transparent electrode 208, alignment layer 211, and the region containing the electro-active material 212, are formed along the second substrate layer 205 and thus, also have a surface relief diffractive topography. Alternatively, the first substrate 204 also has a surface relief diffractive topography. As another alternative, the second substrate 205 has a flat surface topography and the first substrate 204 has a surface relief diffractive topography.

The first substrate layer 204 and the second substrate layer 205 may be coated with the transparent electrodes 207 and 208, respectively. Transparent electrodes 207 and 208 may be uniformly deposited over the entire inner surfaces of the first substrate layer 204 and the second substrate layer 205, respectively.

The electro-active material 212 may be contained between the first and second substrate layers 204 and 205. The electro-active material 212 may be a liquid crystalline material, such as, a nematic liquid crystal, a cholesteric liquid crystal, a smectic liquid crystal, a polymer dispersed liquid crystal, or a polymer stabilized liquid crystal.

The alignment layers 210 and 211 align the molecules of the electro-active material 212 in a predetermined direction relative to the substrates layers 204 and 205. The alignment layers 210 and 211 may be composed of, e.g., a polyimide material (for mechanical buffing), or a photosensitive material (for polarized UV optical alignment).

The transparent electrodes 207 and 208 may be electrically connected to a controller (not shown), e.g., via electrical contacts (not shown). The insulating layer 209 is disposed between the transparent electrodes 207 and 208 to prevent electric conduction (i.e., electrical shorting) between the transparent electrodes 207 and 208. The controller applies voltages to the transparent electrodes 207 and 208 predetermined to cause an electric field to form across the electro-active material 212 as well as the alignment layers 210 and 211. The electric field changes the orientation of the molecules of the electro-active material 212, thereby changing the refractive index of the electro-active material 212. The change in refractive index of the electro-active element 201 is predetermined to cause a diffractive pattern in the electro-active material 212 to provide optical power. When no voltage is applied to electrodes 207 and 208 the refractive index of the electro-active material 212 matches the refractive index of the surface relief diffractive structures 206. Accordingly, no optical phase delay is generated and no light is focused (i.e. the diffraction efficiency is zero). When a predetermined voltage is applied to electrodes 207 and 208 the refractive index of the electro-active material 212 is different from the refractive index of the surface relief diffractive structures 206. Accordingly, an optical phase delay is generated for focusing approximately all incident light to the optical power (i.e., approximately 100% diffraction efficiency). Thus, by switching the voltage applied to the transparent electrodes 207 and 208 on or off, the optical power of the electro-active element 201 is likewise switched on or off, thereby modulating the diffraction efficiency of the electro-active element 201 between a maximum and minimum values, respectively.

When voltage is applied to the electro-active element 201, optical power is generated within a boundary 222. The application of voltage causes an abrupt change in optical power across the boundary 222 formed by the outermost continuous surface relief diffractive structure(s). Thus, a visible line is formed in the lens 200. To reduce the visibility of the line, a blend zone is needed.

The boundary 222 can be blended using a blend zone blending the heights of the diffractive structures 206 down to zero over a pre-determined distance at the boundary 222. This blend zone is formed according to embodiments described in FIG. 9A, 9B, or 11A-11C.

Although the electro-active element 201 in FIG. 15 is shown to be flat, it should be understood that the electro-active element 201 may alternatively be curved.

When the electro-active material is a polarization sensitive liquid crystalline material such as, e.g., a nematic liquid crystal, two electro-active elements are preferably used. The two electro-active elements are positioned in series and have alignment layers with orthogonal alignment directions to allow equal focusing of incident light of any polarization state. A more detailed description of such embodiments may be found in U.S. application Ser. No. 10/863,949 filed on Jun. 9, 2004 and entitled "Hybrid Electro-Active Lens", which is incorporated herein by reference in its entirety.

Figure 16:
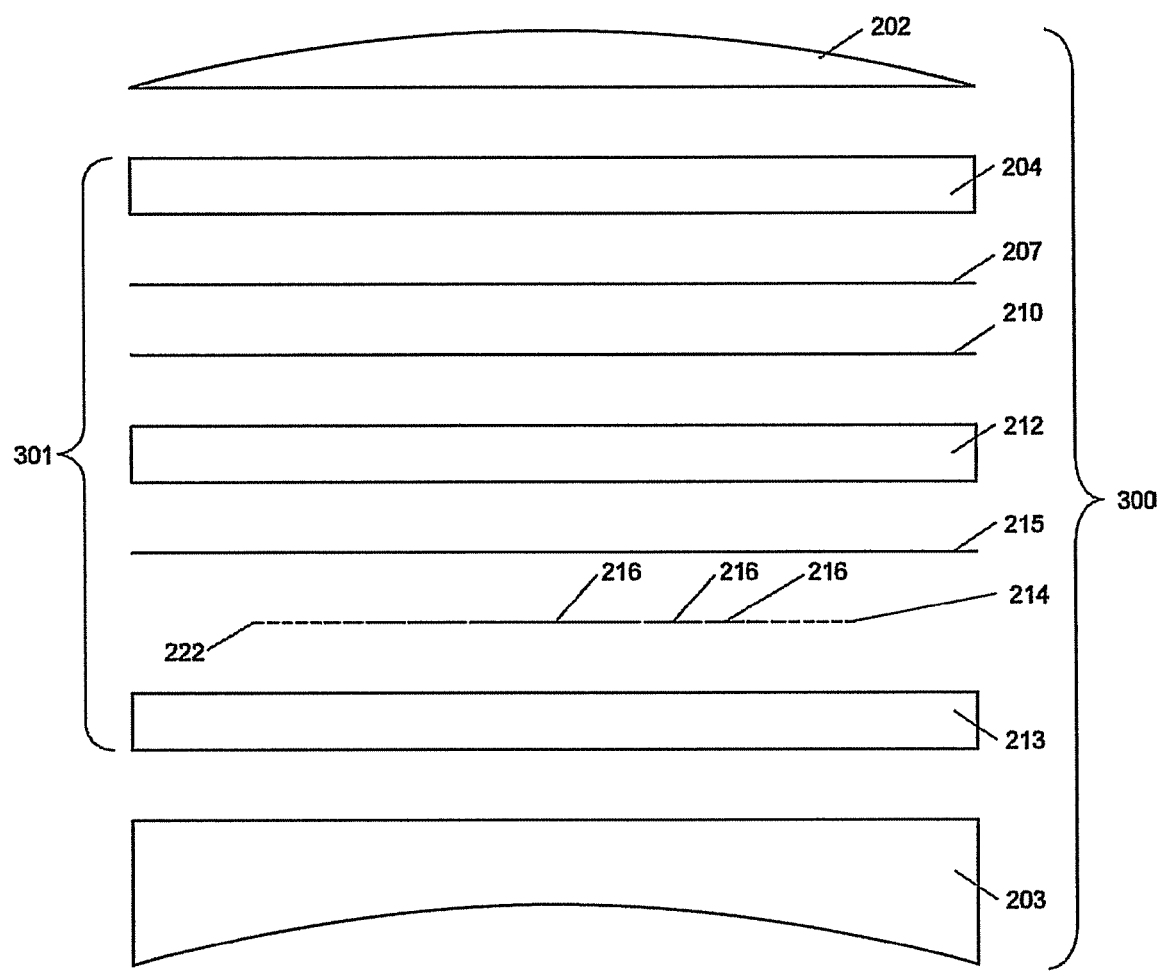

FIG. 16 shows a second exploded cross-sectional view of the electro-active lens 200 of FIG. 15 having an electro-active element 301 including the first substrate layer 204 and a second substrate layer 213, both having a flat surface topography, in accordance with an aspect of the present invention. Although the surface topography of the first substrate layer 204 and the second substrate layer 213 are shown to be flat, any substantially featureless surface topography (e.g., curved) may alternatively be used.

The electro-active lens 300 has an electro-active element 301 that includes a patterned transparent electrode 214, an alignment layer 215, and a region containing the electro-active material 212, each formed along the second substrate layer 213. Since the second substrate layer 213 along which the aforementioned elements are formed, has a flat surface topography, these elements also have flat surface topographies.

Figure 17A:
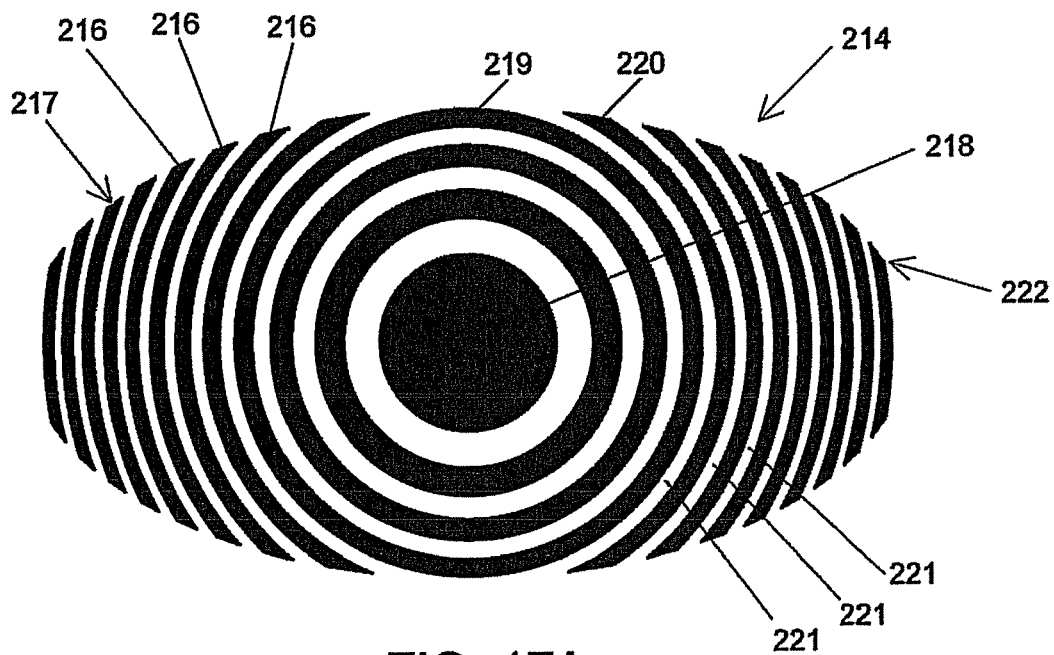
FIGS. 17A and 17B show front views of the patterned electrode layer of the electro-active lens of FIG. 16.
Figure 17B:
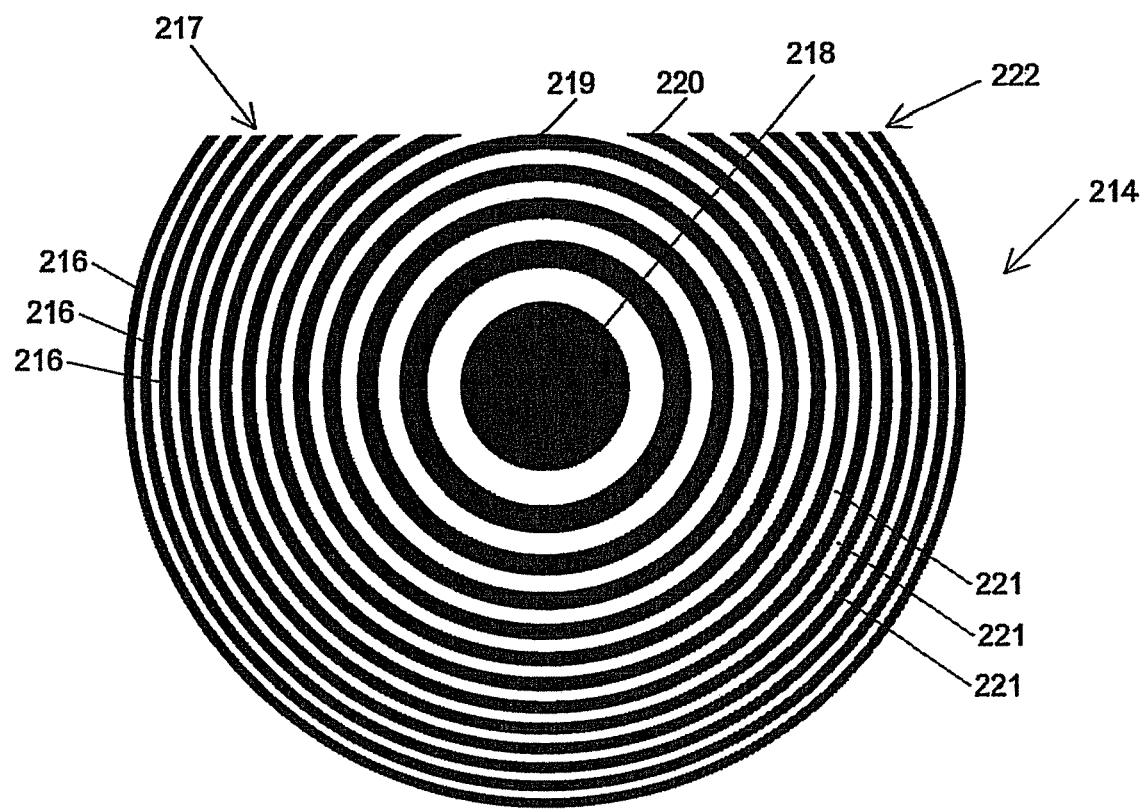

The patterned transparent electrode 214 includes a plurality of individually addressable electrodes 216 (e.g., electrode rings or pixels). The individually addressable electrodes 216 are arranged for forming a diffractive optical power region in the lens 300, as shown in FIGS. 17A and 17B. The transparent electrode 207 is a thin film transparent electrode layer that serves as a reference electrode (i.e., an electrical ground) for the patterned transparent electrode 214. When voltage is applied to the electro-active element 301 across the patterned transparent electrode 214 and the transparent electrode 207, a diffractive pattern forms within a boundary 222 of the electro-active element 301.

FIGS. 17A and 17B show front views of the patterned transparent electrode 214 of FIG. 16 having individually addressable electrodes 216 bound by the boundary 222, in accordance with various aspects of the present invention.

The individually addressable electrodes 216 include a continuous full electrode 218, a continuous closed curve electrode 219, and a curved arc electrode 220. Alternatively, the individually addressable electrodes 216 may only be discontinuous curve electrodes. The individually addressable electrodes 216 are shown to be shaped as circles or circular arcs, although other geometries such as elliptical or polygonal geometries may alternatively be used. Although 12 and 13 individually addressable electrodes 216 are shown in FIGS. 17A and 17B, respectively, any number of individually addressable electrodes 216 may be used. In a pixilated approach, any number and arrangement of pixels may be used. The individually addressable electrodes 216 are preferably concentric. The individually addressable electrodes 216 are optically transparent. The individually addressable electrodes 216 are composed of any of the known transparent conductive oxides (e.g., indium tin oxide (ITO)) or a conductive organic material (e.g., poly(3,4-ethylenedioxythiophene) poly(styrenesulfonate) (PEDOT:PSS) or carbon nano-tubes).

The individually addressable electrodes 216 have individual electrical connections with a controller (not shown) along an electrical boundary 217. An electrical insulating layer (not shown) is formed between the individually addressable electrodes 216. The electrical insulating layer occupies spaces 221 formed between adjacent individually addressable electrodes 216 to prevent electrical conduction therebetween.

The individually addressable electrodes 216 including at least one curved arc electrode 220 that can be positioned in any arrangement to form a diffractive optical power region having any shape. In FIG. 17A the individually addressable electrodes 216 are arranged for generating an elliptically shaped diffractive optical power region, while in FIG. 17B the individually addressable electrodes 216 are arranged for generating a flat-top segment shaped diffractive optical power region. Alternatively, the individually addressable electrodes 216 may be arranged and shaped differently for generating a diffractive optical power region having any shape (e.g., of FIGS. 8A-8I).

When used in the lens 300 of FIG. 16, voltages applied to the individually addressable electrodes 216 are predetermined to cause a voltage pattern across the electro-active material 212. This voltage pattern, in turn, is predetermined to cause a change in the refractive index of the electro-active material 212 (and thus, the lens 300). This change in refractive index forms a diffractive pattern and thus, a diffractive optical power region in the electro-active element 301.

Figure 18A:
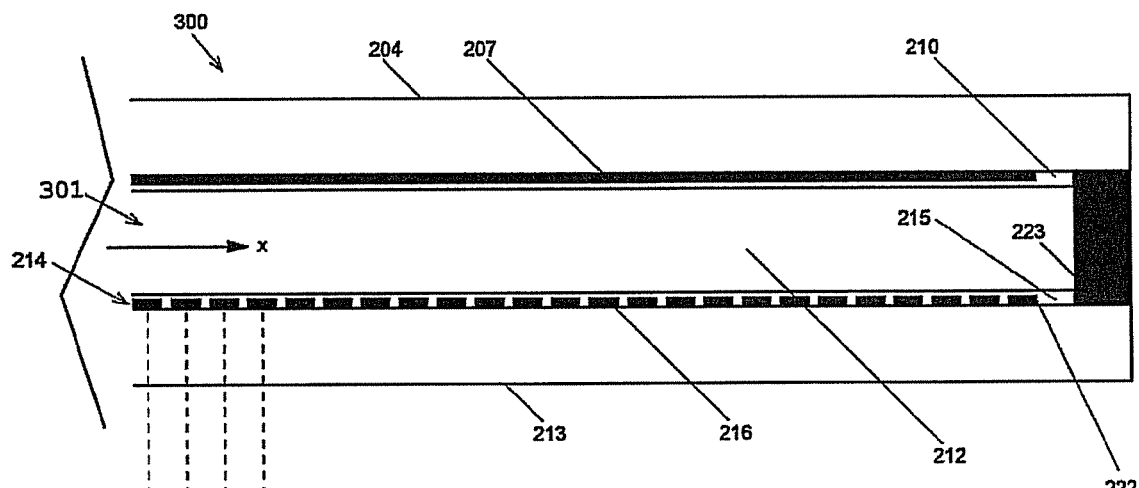
FIG. 18A shows a side view of the electro-active lens of FIG. 16 having individually addressable electrodes.

FIG. 18A shows a side view of a radially peripheral portion of the electro-active lens 300 of FIG. 16 having a plurality of individually addressable electrodes 216, in accordance with an aspect of the present invention.

Figure 18B:
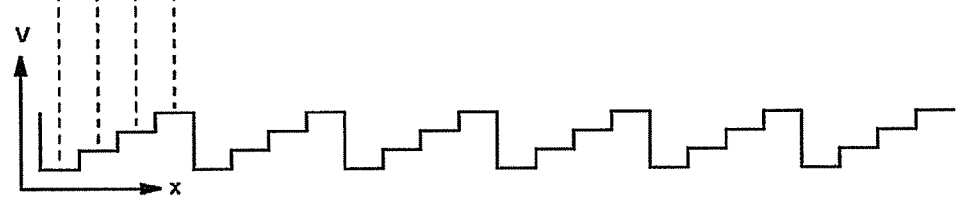
FIG. 18B shows voltages applied to the individually addressable electrodes of FIG. 18A predetermined to cause a diffractive optical power region.

FIG. 18B shows voltages applied to the individually addressable electrodes 216 predetermined to cause a diffractive optical power region in the electro-active element 301 of FIG. 16, in accordance with an aspect of the present invention. The voltages (e.g., four voltages; V1, V2, V3, and V4) are applied to the individually addressable electrodes 216. The voltages are applied in a repeating sequence of monotonically increasing voltages to the individually addressable electrodes 216 in the order that the individually addressable electrodes 216 are radially arranged. The voltages form a multi-level voltage pattern across the electro-active material 212 predetermined to cause a multi-level diffractive pattern in the electro-active element 301. The multi-level diffractive pattern of FIG. 18B is similar to the multi-level surface relief diffractive pattern of FIG. 14A. However, the multi-level diffractive pattern of FIG. 18B is formed by a variation in refractive index, while the multi-level surface relief diffractive pattern of FIG. 14A is physically formed by a variation in the heights of diffractive structures. Diffractive structures may refer to any structures capable of diffracting light. In one example, diffractive structures may refer to surface relief diffractive structures having a physically formed sawtooth pattern including a series of crests and adjacent troughs, as shown in FIGS. 13A, 13D, 14A, and 14D. In another example, in FIG. 15, diffractive structures may refer to the diffractive structures 206 having the sawtooth pattern, the electrode 208 having the sawtooth pattern, or a combination thereof and/or other components of electro-active element 201. In yet another example, in FIG. 16, diffractive structures may refer to the individually addressable electrodes 216 having a uniform or flat surface topography. In this example, the diffraction of light is formed by applying a voltage pattern for varying the refractive index of the electro-active material 212. In this example, although the diffractive structures (i.e., the individually addressable electrodes 216) are capable of diffracting light, when no voltage is applied thereto, the diffractive structures do not diffract light.

When the voltage of FIG. 18B are applied to the individually addressable electrodes 216 of FIG. 18A, a diffractive pattern in the electro-active element 301 forms within the boundary 222 causing an abrupt change in optical power across the boundary 222 causing a visible line in the lens. To solve this problem, a blend zone is needed.

In the aforementioned figures a static blend zone is described, which utilizes a physical variation in the heights of the diffractive structures to cause a blending of diffractive efficiency to reduce a visibility of a line at the boundary 222 of a diffractive structure. However, since the lens 300 of FIG. 16 utilizes the patterned transparent electrode 214 that has a flat surface topography, an alternative blending means is needed.

Figure 18C:
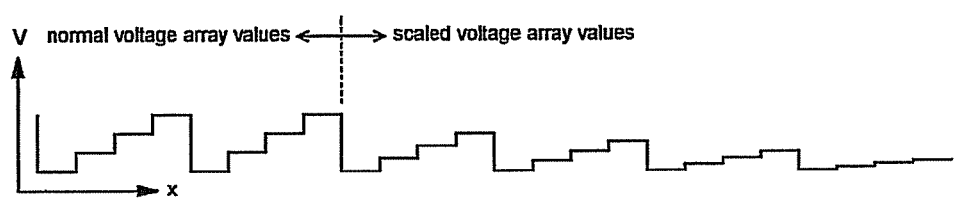
FIG. 18C shows voltages applied to the individually addressable electrodes of FIG. 18A predetermined to cause a diffractive efficiency blended diffractive optical power region.

FIG. 18C shows voltages applied to the individually addressable electrodes 216 predetermined to cause a blending of the diffractive optical power region in the electro-active element 301 of FIG. 16. A blending function (e.g., of FIGS. 13B-13D and 14B-14D) modulates the profile by monotonically decreasing the diffractive efficiency from the radial center of the lens 300 to the boundary 222 over a finite distance. The blending function scales the voltage amplitudes applied to the individually addressable electrodes 216 by a value (m), e.g., between 1 and 0 (at the boundary 222). As the voltage amplitudes applied to the individually addressable electrodes 216 approach zero near the boundary 222, the change in refractive index in the lens 300 and thus the diffractive effects caused thereby (i.e., diffraction efficiency) also approach zero near the boundary 222. As the diffraction efficiency of the lens 300 decreases to zero, the boundary 222 becomes invisible.

Although four voltages are shown in FIGS. 18B and 18C, any number of voltages can be used. The larger the number of distinct voltages (and thus levels per Fresnel zone or voltage period), the better the approximation to an ideal diffractive structure. However, the width of one period of the sequence of voltages, and thus, the width of the individually addressable electrodes 216 to which these voltages are applied, determines the diffractive optical power of the lens 300. In order to preserve this diffractive optical power, as the number of distinct voltages used to approximate a diffractive structure is increased, the number of individually addressable electrodes 216 in the same region must likewise be increased. Thus, the density of individually addressable electrodes 216 is increased. To fit more individually addressable electrodes 216 into the same sized region of the lens 300, the individually addressable electrodes 216 can be narrowed and moved closer together. When the spacing between the individually addressable electrodes 216 is reduced, the potential for electrical conduction (i.e., shorting) between adjacent individually addressable electrodes 216 is increased. Accordingly, additional insulation (not shown) may be used between the individually addressable electrodes 216 to prevent such electrical conduction.

The dynamic blending means of FIG. 18A is not a physical structure, but an electrical state, e.g., of voltages predetermined to cause the blending of diffractive efficiency. The blending means is preferably integral to the electro-active element 301.

In another approach, the voltage amplitudes are not modulated by the blending function. In this approach, the voltage amplitudes are not decreased at the source (the individually addressable electrodes) but instead are intercepted by insulating material (not shown) placed near the periphery of the electro-active element. The insulating material has a monotonically increasing thickness predetermined to reduce the voltage amplitudes according to the voltage pattern shown in FIG. 18C. Thus, the effect of blending the diffractive efficiency of the diffractive optical power region is the same yet caused by the predetermined placement of insulating material instead of modulating the applied voltage.

Any of the aforementioned means for blending the diffraction efficiency of the diffractive optical power region may be used in conjunction with conventional optical power blend zones (e.g., taught in Stewart et. al., U.S. application Ser. No. 11/595,871, which is incorporated herein by reference in its entirety). When used together in a lens, the diffraction efficiency blend zone and the optical power blend zone may be separately disposed or alternatively, may partially or fully overlap.

In FIG. 18A, the electro-active lens 300 includes a spacer 223 for controlling the thickness of the electro-active material 212.

Figure 19A:
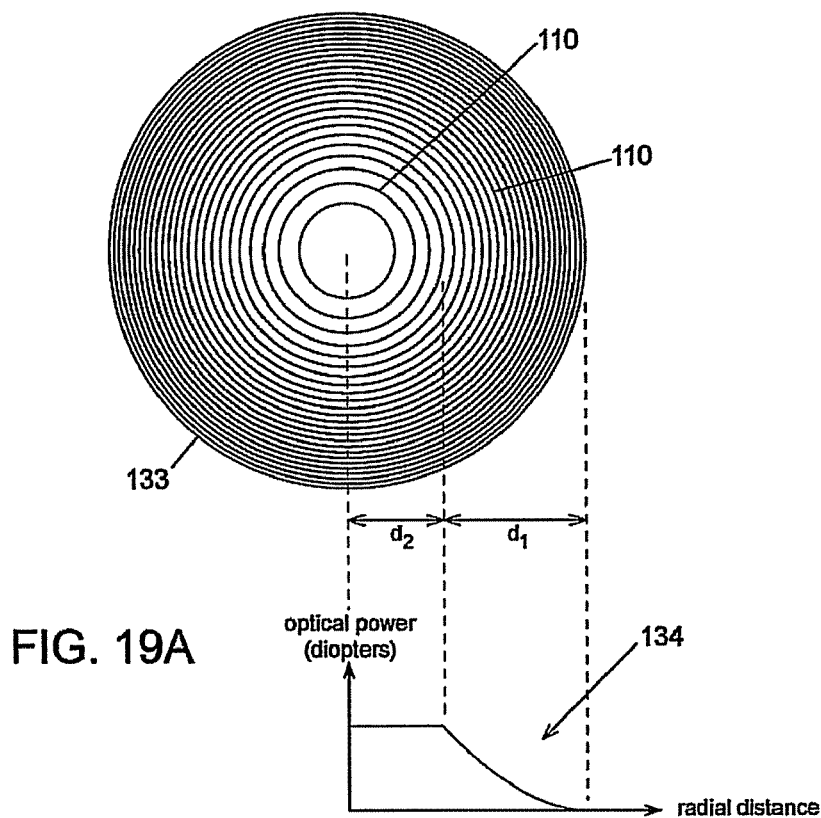
FIG. 19A shows a front view of a progressive addition diffractive optical power region.

FIG. 19A shows a front view of a progressive addition diffractive optical power region 133, in accordance with an aspect of the present invention. The progressive addition diffractive optical power region has a plurality of concentric surface relief diffractive structures for focusing light of a specific wavelength λ to a focal length f. The progressive addition diffractive optical power region 133 is static or dynamic. The progressive addition diffractive optical power region 133 has a first region that includes the concentric surface relief diffractive structures 110 with radii from the center point, r, in a first range, $d_2 < r \leq d_1 + d_2$. The progressive addition diffractive optical power region 133 has a second region that includes the concentric surface relief diffractive structures 110 with radii from the center point, r, in a second range, $r \leq d_1$. For example, the second region is positioned radially interior to the first region.

The progressive addition diffractive optical power region 133 has a progression of optical power as the radial distance thereof increases from the center point. In the figure, the optical power of the progressive addition diffractive optical power region 133 is constant in the second region. To achieve the constant optical power, the radius of the $n^{th}$ concentric surface relief diffractive structure 110 of the second region from the center point thereof is equal to $\sqrt{2n\lambda f}$ (i.e., according to the definition of equation (1)). In the figure, the optical power of the progressive addition diffractive optical power region 133 decreases in the first region as the radial distance from the center point thereof increases. To achieve the decreasing optical power progression, the radii of at least some of the diffractive structures 110 deviate from the definition of equation (1). To achieve a progression of decreasing optical power, the radius of the $n^{th}$ concentric surface relief diffractive structure of the first region from the center point thereof is greater $\sqrt{2n\lambda f}$. Alternatively, the optical power of the progressive addition diffractive optical power region 133 increases in the first region as the radial distance from the center point thereof increases. To achieve a progression of increasing optical power, the radius of the $n^{th}$ concentric surface relief diffractive structure of the first region from the center point thereof is less than $\sqrt{2n\lambda f}$. In one example, the radial widths of at least some of the diffractive structures are equal to one another, e.g., in the first region.

The optical power progression of the progressive addition diffractive optical power region 133 is shown in a graph 134. In the figure, the optical powers of the progressive addition diffractive optical power region 133 decrease with increasing radial distance. Accordingly, the relative radial widths of the diffractive structures of the progressive addition diffractive optical power region 133 decreases at a slower rate than in a constant diffractive optical power region. Since the degree of chromatic aberration decreases as the width of the diffractive structures increase, the chromatic aberration of the progressive addition diffractive optical power region 133 is less than the chromatic aberration of a constant diffractive optical power region. It is experimentally observed that a progressive addition diffractive optical power region providing +1.00 D of optical power and composed of typical spectacle lens materials exhibits a degree of chromatic aberration below a predetermined threshold level (e.g., a noticeable level) at radial distances less than 6 mm from the center of the progressive addition diffractive optical power region 133.

If the degree of chromatic aberration, e.g., of a +1.00 D progressive addition diffractive optical power region 133 at 6.0 mm from the center thereof is below a predetermined threshold level, then so too are other regions having diffractive structures having the same radial width, e.g., a +0.50 D diffractive optical power region at 12.0 mm from the center, a +0.33 D diffractive optical power region at 18.0 mm from the center and a +2.00 D diffractive optical power region at 3.0 mm from the center. The radial widths of the diffractive structures, which determines the chromatic aberration thereof, is locally constant at each radial distance and decreases with increasing radius. This approach forms a progressive addition diffractive optical power region 133 having uniform chromatic aberration for all diffractive structures. The progressive addition diffractive optical power region 133 can be cropped at a cropping boundary to remove diffractive structures predetermined to cause chromatic aberration greater than a predetermined threshold.

Figure 19B:
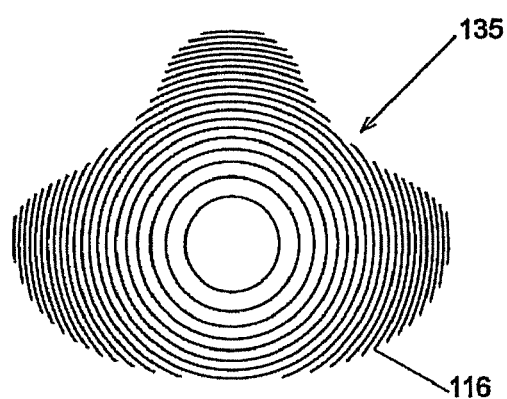
FIGS. 19B and 19C show front views of the progressive addition diffractive optical power region of FIG. 19A being cropped.
Figure 19C:
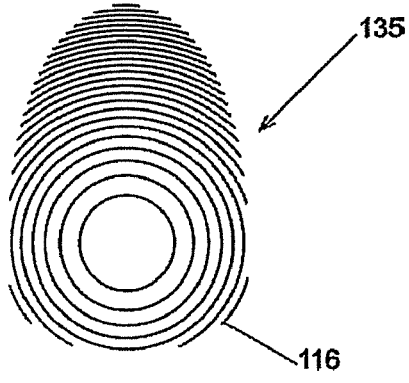

FIGS. 19B and 19C show front views of the progressive addition diffractive optical power region 133 of FIG. 19A being cropped along the cropping boundary 116, in accordance with various aspects of the present invention. FIG. 19B shows a cropped progressive addition diffractive optical power region 135 with a wider than tall near distance vision zone and an optical power progression in both the vertical and horizontal directions. FIG. 19C shows a cropped progressive addition diffractive optical power region 135 with a narrower than tall intermediate to near distance vision zone and an optical power progression in only or mostly the vertical direction. It may be appreciated that the progressive addition diffractive optical power region 135 can be cropped to have any desired shape (e.g., as shown in FIGS. 8A-8I).

A diffractive efficiency blend zone can blend the cropped progressive addition diffractive optical power region 135 of FIGS. 19B and 19C by reducing the diffractive efficiency thereof to zero radially extending towards the peripheral edge thereof. Since the diffractive efficiency blend zone blends independently of optical power, the blend zone can blend the cropped diffractive optical power region along the entire cropping boundary thereof (having varying optical power) to reduce the appearance of a line along the cropping boundary 116.

The progressive addition diffractive optical power regions of FIGS. 19A-19C may have different optical power progressions in the vertical and horizontal directions. Additionally, the optical power progressions need not terminate to a zero optical power.

Figure 20A:
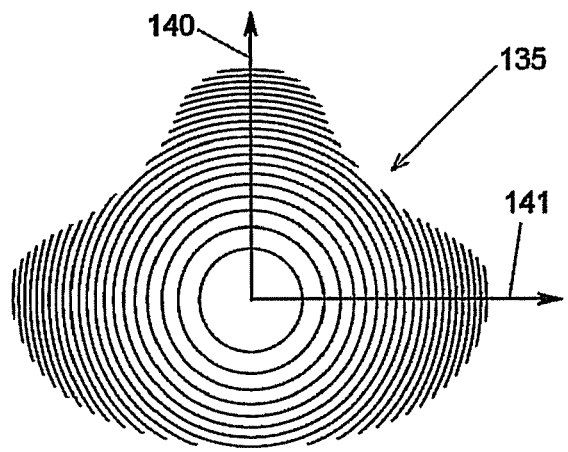
FIG. 20A shows the cropped progressive addition diffractive optical power region of FIG. 19B with an optical power progression along a vertical axis 140 and horizontal axis 141.

FIG. 20A shows the cropped progressive addition diffractive optical power region 135 of FIG. 19B with an optical power progression along a vertical axis 140 and an optical power progression along a horizontal axis 141, in accordance with an aspect of the present invention.

Figure 20B:
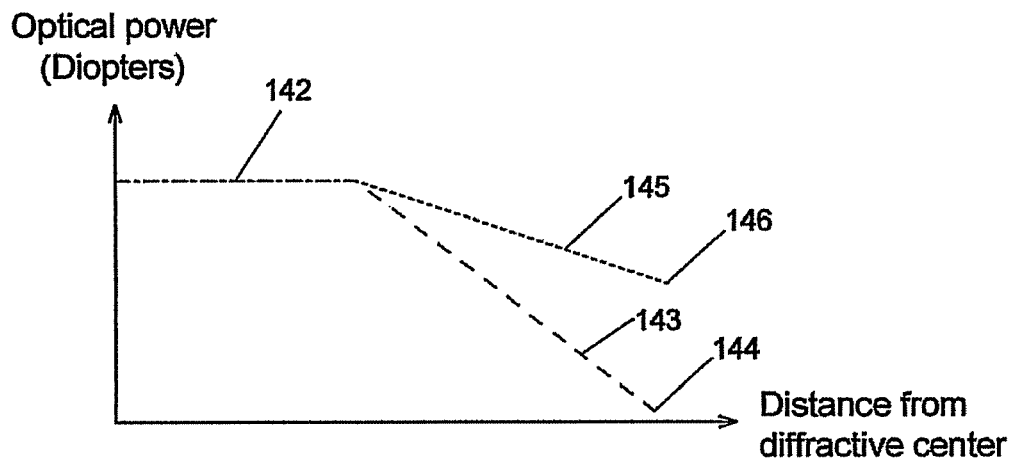
FIG. 20B shows graphs of the optical power along axes 140 and 141 of FIG. 20A.
Figure 20C:
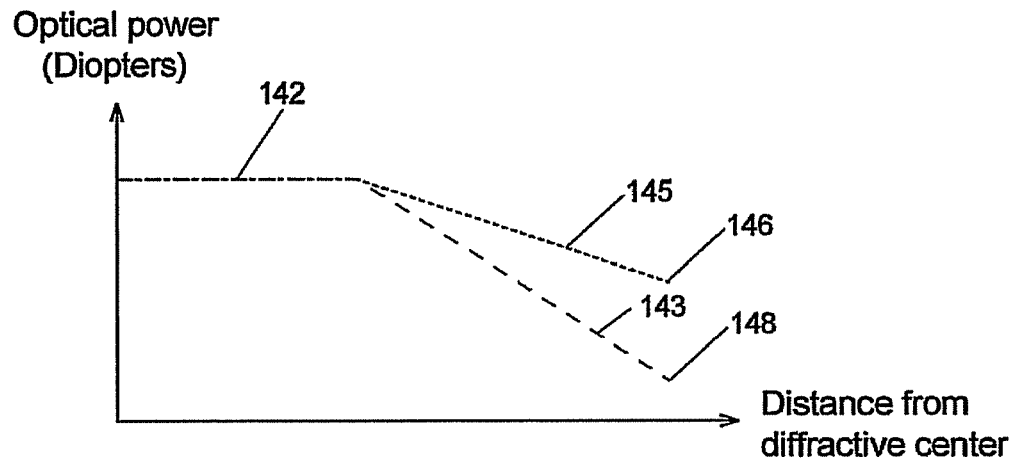
FIG. 20C shows graphs of the optical power along axes 140 and 141 of FIG. 20A.
Figure 20D:
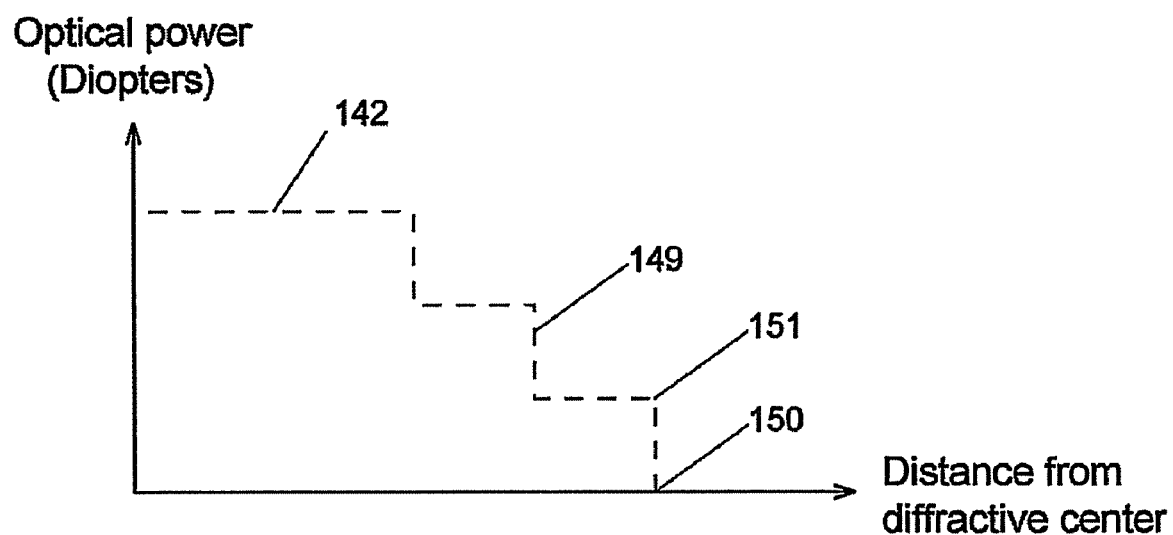
FIG. 20D shows graphs of the optical power along one or both of axes 140 and 141 of FIG. 20A.

FIGS. 20B, 20C and 20D show graphs of the optical power along axes 140 and 141 of FIG. 20A, in accordance with various aspects of the present invention.

In FIGS. 20B and 20C, the optical power progression 143 is the optical power along the vertical axis 140 of FIG. 20A and the optical power progression 145 is the optical power along the horizontal axis 141 of FIG. 20A. In FIGS. 20B and 20C, the constant optical power 142 is the optical power along both the vertical and horizontal axes 140 and 141 of FIG. 20A, where the optical powers coincide. The optical powers typically coincide in the near distance vision region.

In FIG. 20B, the optical power progression 143 along the vertical axis decreases monotonically to approximately a zero optical power 144 (i.e., plano) outside of the near distance vision region. The optical power progression 145 along the horizontal axis decreases monotonically to the non-zero optical power 146 outside of the near distance vision region. In one example, the optical power along the horizontal axis decreases to the non-zero optical power 146 that is in a range of from approximately 50% to approximately 75% of the constant optical power 142, although other non-zero optical powers may be used.

In FIG. 20C, both the optical power progression 143 along the vertical axis and the optical power progression 145 along the horizontal axis decrease monotonically to non-zero optical powers 148 and 146, respectively, outside of the near distance vision region. In one example, the optical power along the vertical axis decreases to the non-zero optical power 148 that is in a range of from approximately +0.12 D to approximately +1.00 D, but is preferably in a range of from approximately +0.25 D to approximately +0.75 D, although other non-zero optical powers may be used.

When the optical power progression 143 along the vertical axis decreases to a non-zero optical power 148 (in an intermediate distance vision region), there is a discontinuity in the optical power between the far-intermediate and intermediate distance vision regions. These discontinuities typically cause undesirable optical effects, such as, image breaks or a step-up in optical power, when viewed across the distance and intermediate distance vision regions. The degree of an image break typically depends on the magnitude of the change in optical power at the discontinuity.

In FIG. 20D the optical power along the vertical axis is the constant optical power 142 in the near distance vision region and a discrete monotonic decreasing optical power 149 (e.g., as a stair-step or piecewise function) to either a zero optical power 150 or a non-zero optical power 151. The discontinuities in the discrete optical power progression can be blended with an optical power blend zone or diffraction efficiency blend zone.

Alternatively, the optical power of the cropped progressive addition diffractive optical power region 135 of FIG. 19B may vary radially according to any mathematical function, e.g., such as, constant functions, linear functions, polynomial functions, trigonometric functions, exponential functions, hyperbolic functions, logarithmic functions, or any combination thereof. The diffractive optical power variation in a spectacle lens may occur over distances in a range of from approximately 6 mm to approximately 16 mm, or from approximately 8 mm to approximately 14 mm, and preferably from approximately 10 mm to approximately 12 mm.

FIGS. 21A and 21B show front views of lenses 400 having the cropped progressive addition diffractive optical power regions 135 of FIG. 19B having astigmatism less than a predetermined threshold and providing a wearer's full near distance vision prescription, in accordance with an aspect of the present invention. Since the cropped progressive addition diffractive optical power region 135 provides the wearer's full near distance vision prescription, no additional optics are required.

In FIG. 21A, the progressive addition diffractive optical power region 135 provides a continuous monotonically increasing progression of optical power ranging from a minimum optical power region 158 (e.g., a plano region) having zero optical power to a maximum optical power region 159 (e.g., a region having +1.25 D of optical power).

In FIG. 21B, the progression of optical power may vary from a non-zero minimum optical power region 160 to a maximum optical power region 159 (e.g., a region having +1.00 D of optical power). The optical power progression of FIG. 21B (e.g., that terminates at the non-zero minimum optical power region) is typically not considered a progressive addition lens (PAL), which is generally defined to have an optical power progression that terminates to zero optical power. When the wearer's full near distance vision prescription is, e.g., +1.50 D or less of optical power in the near distance vision region (e.g., for emerging presbyopes) correction may be fully provided by cropped the progressive addition diffractive optical power region 135.

In some cases, removing the diffractive structures by cropping the cropped progressive addition diffractive optical power regions 135 decreases the optical power of the lens 400 to be less than the optical power prescribed to a wearer. In other cases, e.g., when the wearer's fall near distance vision prescription is greater than +1.50 D, the cropped the progressive addition diffractive optical power region 135 providing the greater than +1.50 D optical power, does not provide sufficient reduction in chromatic aberration and unwanted astigmatism. In such cases, the cropped progressive addition diffractive optical power region (e.g., providing a portion of the optical power needed) may be combined with a refractive optic, such as, a refractive progressive addition region (e.g. providing a portion of the optical power needed), to provide the full optical power needed.

FIGS. 22A-22B show front views of the lenses 400 of FIGS. 21A-21B having the cropped progressive addition diffractive optical power regions 135 of FIG. 19B in optical communication with the refractive progressive addition region 103 of FIG. 1, in accordance with an aspect of the present invention. The cropped progressive addition diffractive optical power region 135 has astigmatism less than a predetermined threshold and has less than a wearer's full near distance prescription. The refractive progressive addition region 103 provides the remainder of the optical power needed to provide the wearer's full near distance vision prescription. In one example, the wearer's full near distance vision prescription is, e.g., +2.00 D of optical power in the near distance vision region. For example, +1.00 D of optical power is provided by the progressive addition diffractive optical power region 135 and +1.00 D of optical power is provided by the refractive progressive addition region 103.

In FIG. 22A, the progressive addition diffractive optical power region 135 and the refractive progressive addition region 103 each have a minimum optical power region 158 with zero optical power (e.g., a plano region). The minimum optical power region is located where the peripheral edges of the regions meet the top of the progressive channel. Thus, there is no step-up in optical power at the top of the progressive channel. In FIG. 22B, the progressive addition diffractive optical power region 135 begin at a non-zero (e.g., +0.25 D) minimum optical power region 160. Thus, there is a (e.g., +0.25 D) step-up in optical power at the top of the progressive channel.

Figure 23A:
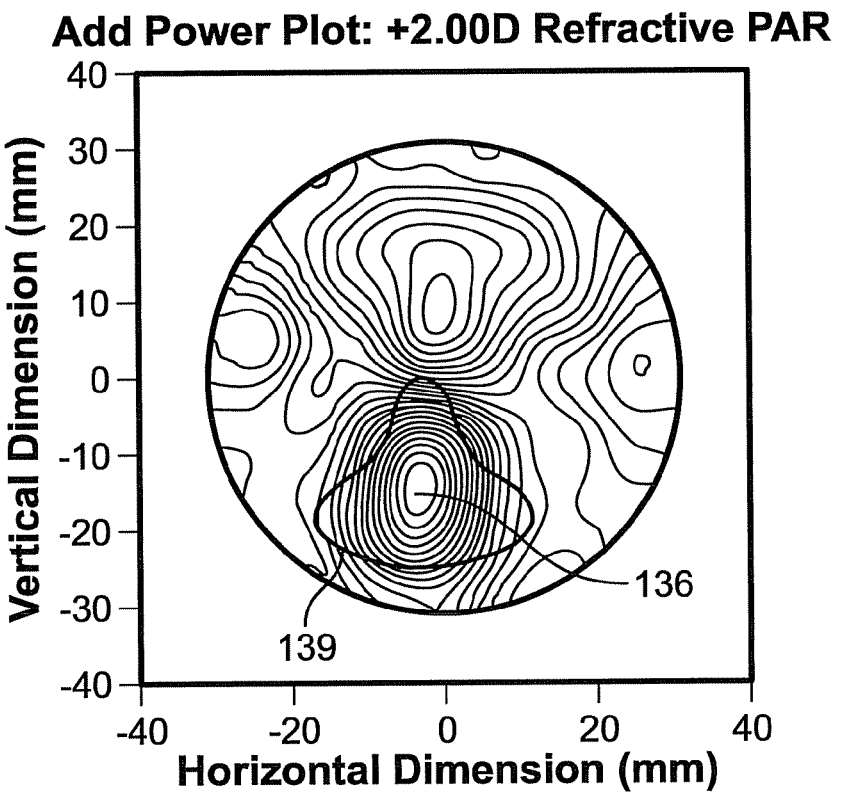
FIGS. 23A and 23B are contour plots of the optical power and astigmatism, respectively, of the refractive progressive addition region of FIG. 1.
Figure 23B:
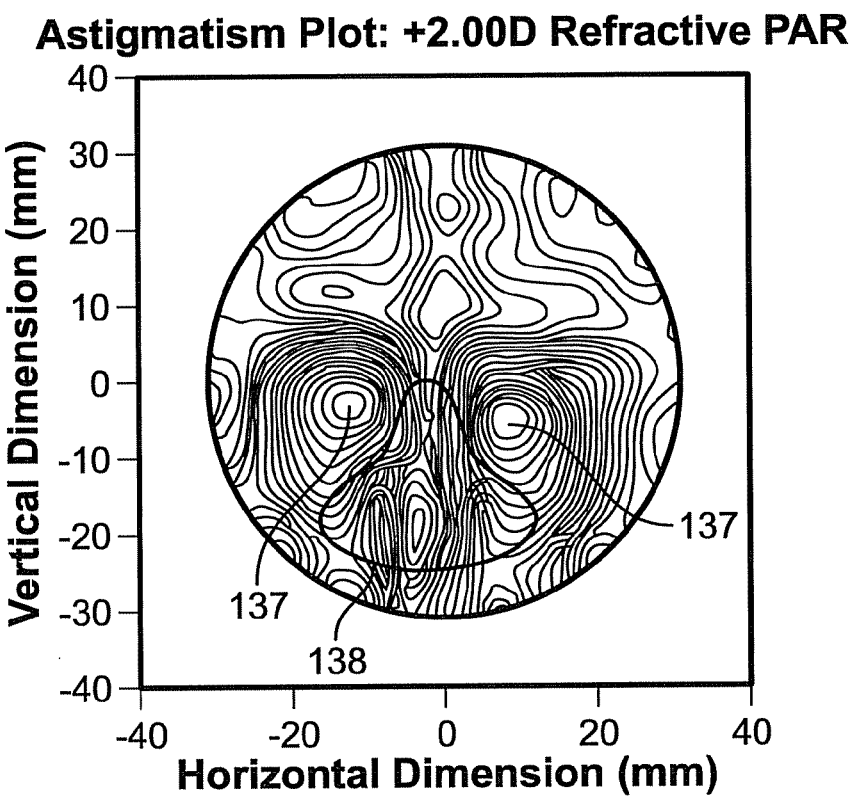

FIGS. 23A and 23B are contour plots of the optical power and astigmatism, respectively, of the refractive progressive addition region of FIG. 1. In the figure, the refractive progressive addition lens provides a maximum (+2.00 D in this example) of optical power in a near distance vision region 136.

The refractive progressive addition region has a compromised vision region that causes incident light to experience astigmatism greater than a predetermined threshold. Astigmatism greater than the predetermined threshold is located in region(s) 137 of the astigmatism contour plot. Since astigmatism greater than 1.00 D generally causes noticeable distortion and swim when viewed in a lens, the predetermined threshold value may be approximately 1.00 D, and is preferably 0.25 D, although other values may be used. In FIG. 23B, there are two of the regions 137 on respective sides of the progressive channel, although there may be any number and position(s) of the regions 137. In this example, the regions 137 have a maximum astigmatism of approximately 2.00 D.

To reduce the unwanted astigmatism of the regions 137, the cropped progressive addition diffractive optical power region 135 of FIG. 19B can be used to approximate the refractive progressive addition region of FIG. 1, while having the cropping boundary 116 that excludes the compromised vision region that causes the unwanted astigmatism of the regions 137.

Figure 23C:
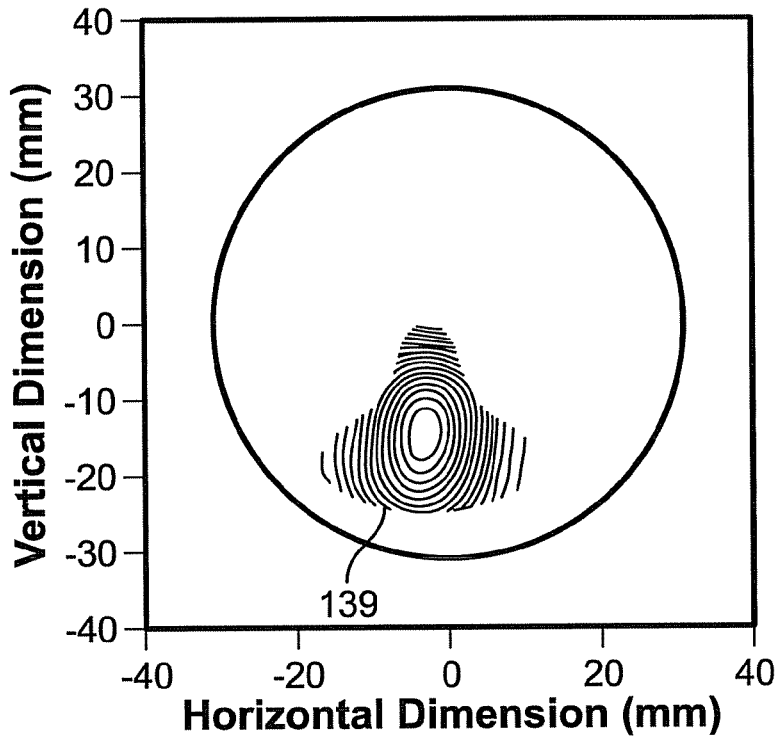
FIGS. 23C and 23D are contour plots of the optical power and astigmatism, respectively, of the cropped progressive addition diffractive optical power region of FIG. 19B approximating the optical power progression of the refractive progressive addition region of FIG. 1.
Figure 23D:
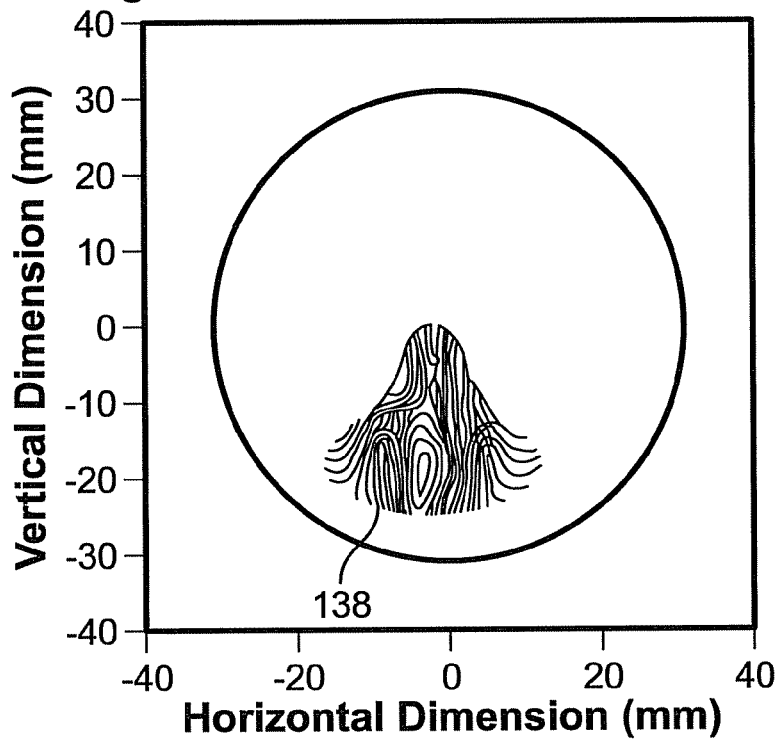

FIGS. 23C and 23D are contour plots of the optical power and astigmatism, respectively, of the cropped progressive addition diffractive optical power region 135 of FIG. 19B approximating the +2.00 D optical power progression in the near distance vision region of the refractive progressive addition region of FIG. 1.

The unwanted astigmatism (e.g., up to 2.00 D) in the regions 137 of the refractive progressive addition lens shown in FIG. 23B, is greater than the unwanted astigmatism (e.g., up to 1.25 D) in region 138 of the cropped progressive addition diffractive optical power region shown in FIG. 23D for the same optical powers 136 and 139, respectively. Thus, using the cropped progressive addition diffractive optical power region to provide a portion or all of the needed optical power can reduce the astigmatism compared with using the refractive progressive addition region alone. It may be appreciated that cropping the diffractive optical power region may reduce but not eliminate astigmatism. For example, FIG. 23D shows cropping can reduce astigmatism to be below the predetermined threshold value of astigmatism, e.g., less than 1.00 D and preferably, less than 0.25 D.

Figure 24A:
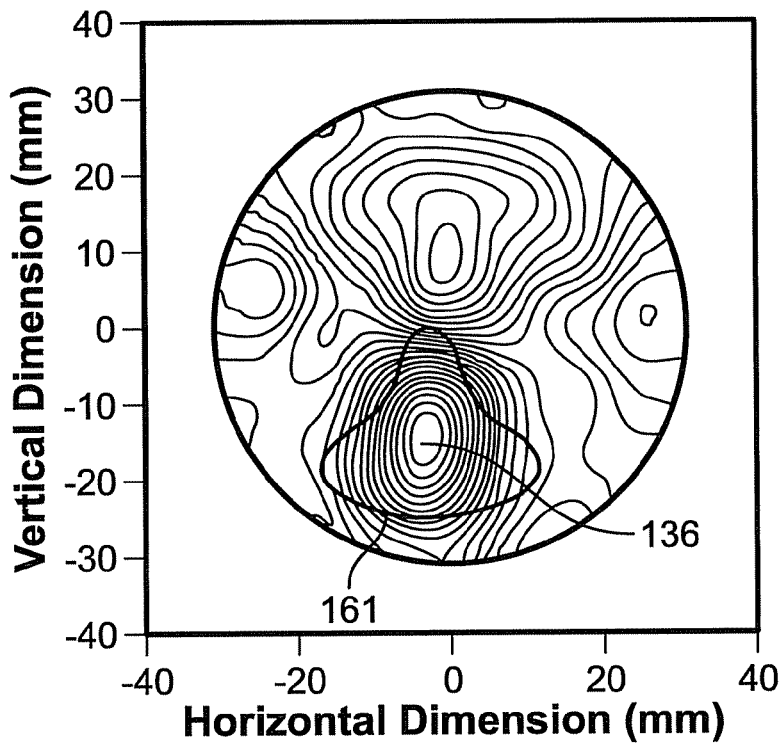
FIGS. 24A and 24B are contour plots of the optical power and astigmatism, respectively, of the progressive addition diffractive optical power region of FIG. 19A.
Figure 24B:
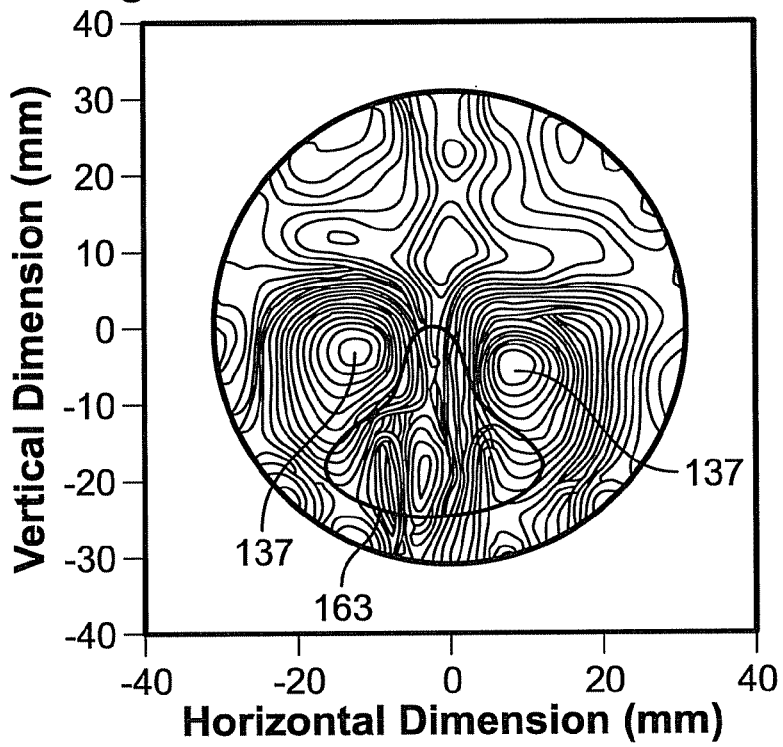

FIGS. 24A and 24B are contour plots of the optical power and astigmatism, respectively, of the progressive addition diffractive optical power region 133 of FIG. 19A. FIGS. 24A and 24B include an optical power region 161 (e.g., of up to +1.00 D of optical power) and an astigmatism region 163 having astigmatism less than or equal to the predetermined threshold value (e.g., 0.25 D), respectively, in accordance with various aspects of the present invention.

Figure 24C:
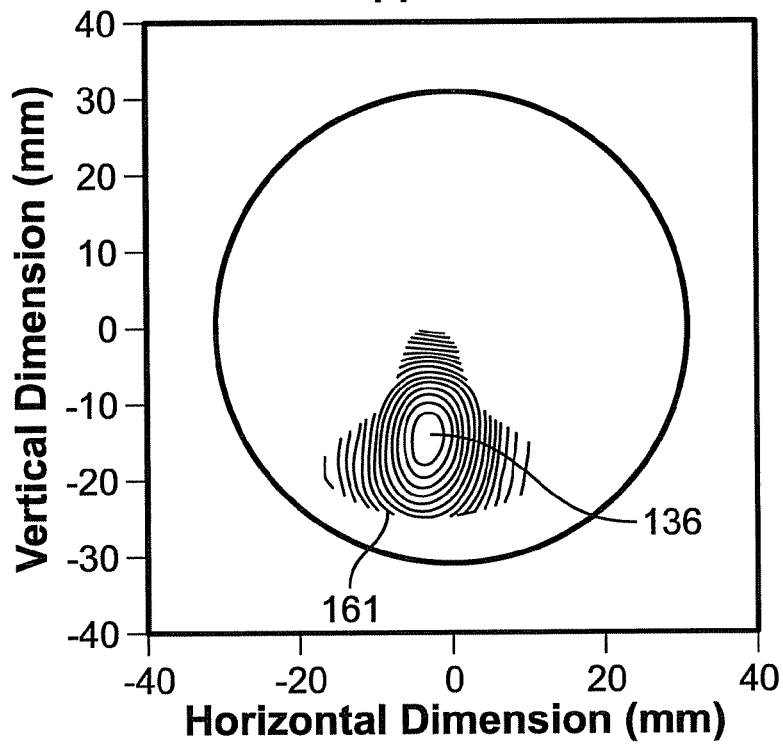
FIGS. 24C and 24D are contour plots of the optical power and astigmatism, respectively, of the cropped progressive addition diffractive optical power region of FIG. 19B.
Figure 24D:
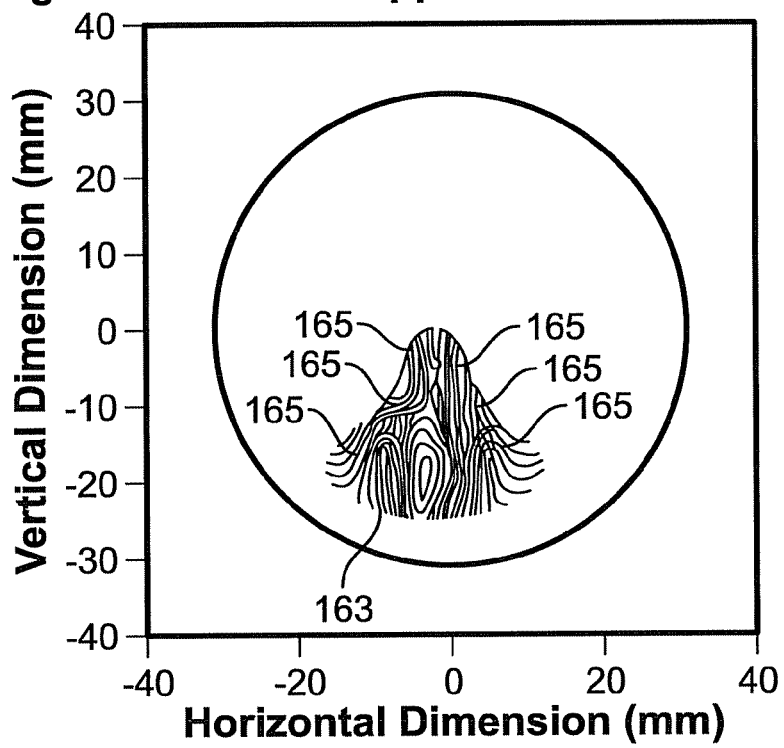

FIGS. 24C and 24D are contour plots of the optical power and astigmatism, respectively, of the cropped progressive addition diffractive optical power region 135 of FIG. 19A, respectively. FIGS. 24C and 24D include cropped areas of greater than the predetermined threshold value (e.g., 0.25 D) of astigmatism 165, in accordance with various aspects of the present invention. Other optical powers and threshold values may be used.

Figure 24E:
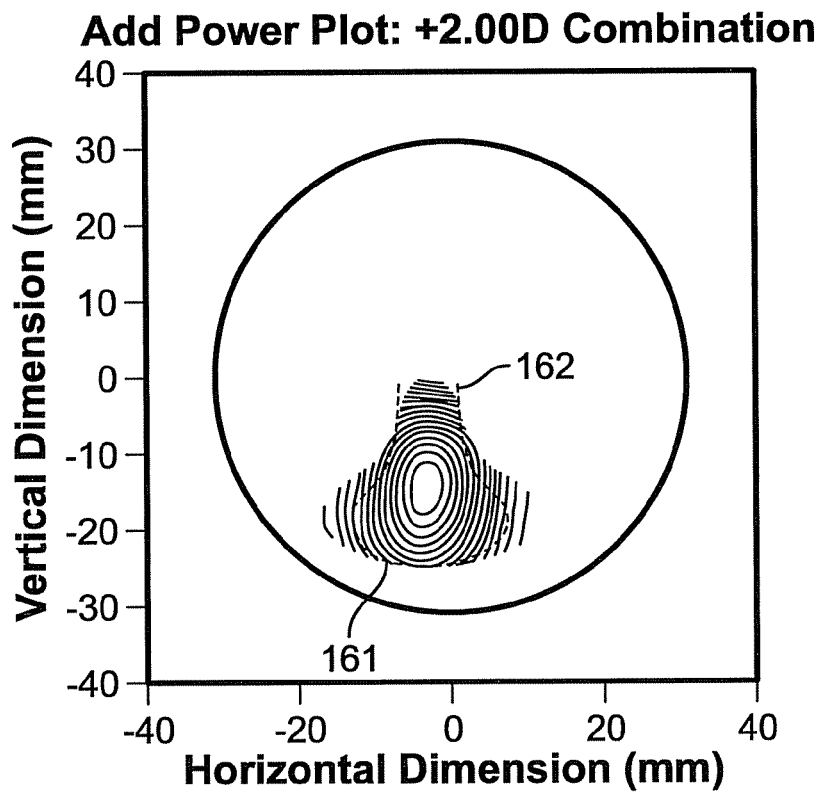
FIGS. 24E and 24F are contour plots of the optical power and astigmatism, respectively, of the cropped progressive addition diffractive optical power region of FIG. 19B in combination with a refractive progressive addition region of FIG. 1.
Figure 24F:
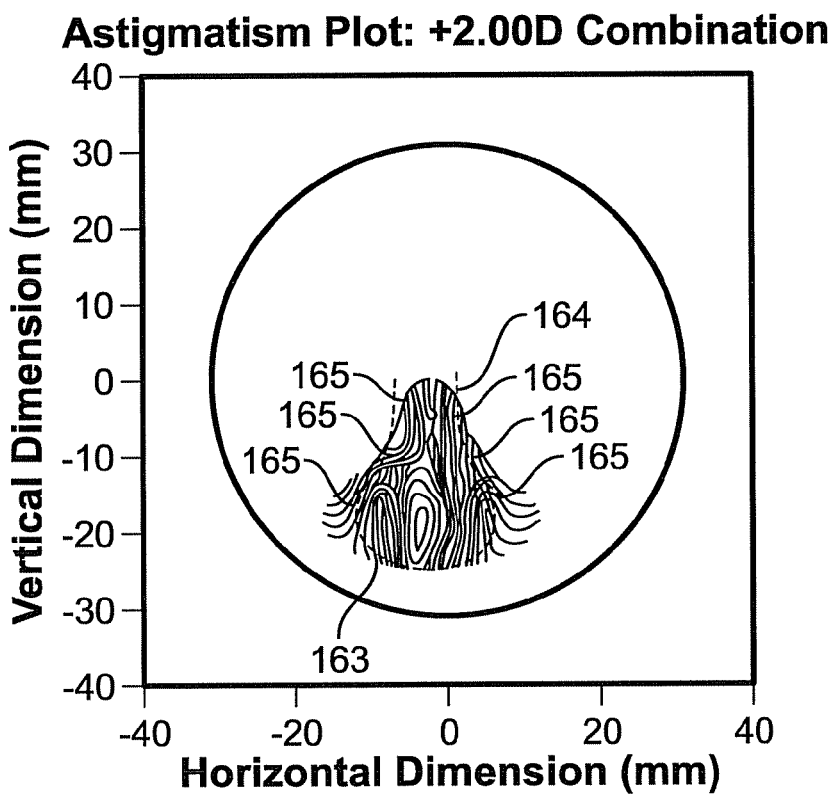
Figure 25A:
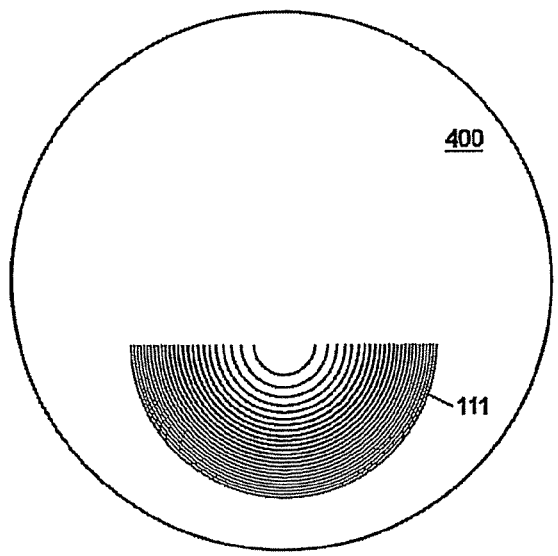
FIGS. 25A-25D show front views of the lenses 400 of FIGS. 21A-21B having the cropped diffractive optical power region with constant optical power.
Figure 25B:
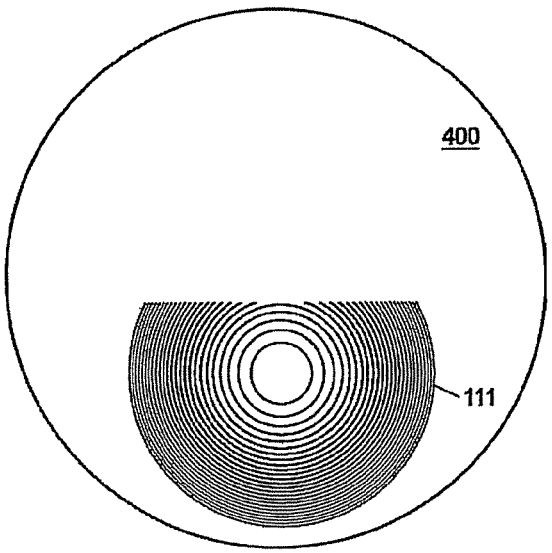
Figure 25C:
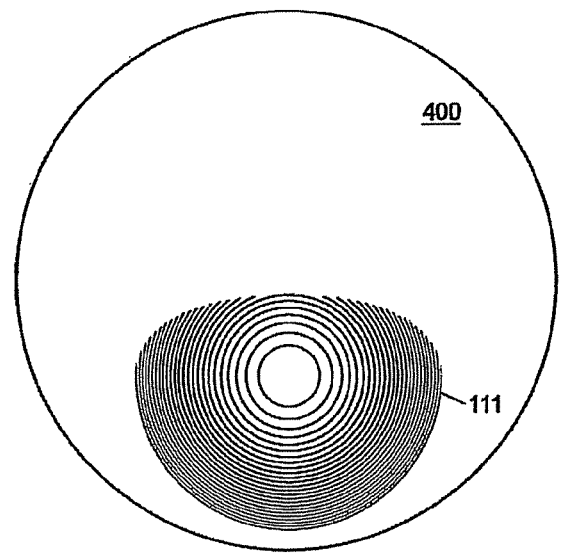
Figure 25D:
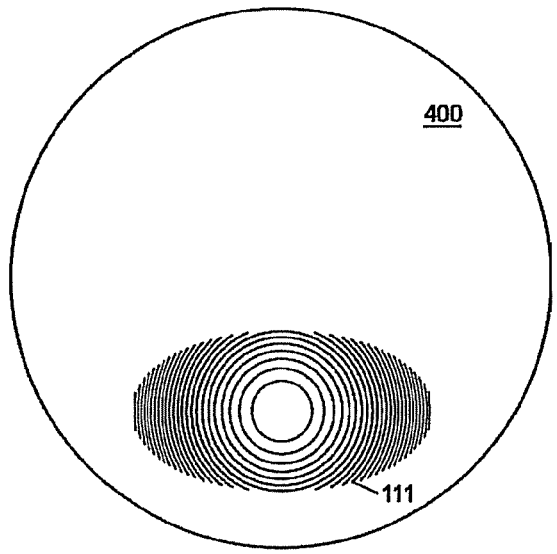
Figure 26A:
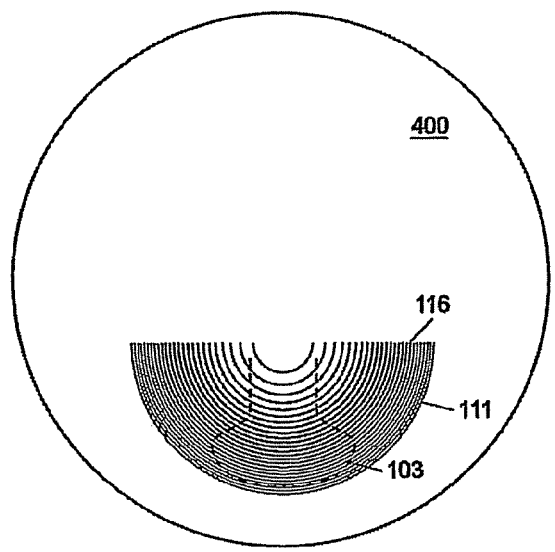
FIGS. 26A-26D show front views of the lenses 400 of FIGS. 25A-25D having the cropped diffractive optical power region with constant optical power in optical communication with the refractive progressive addition region of FIG. 1.
Figure 26B:
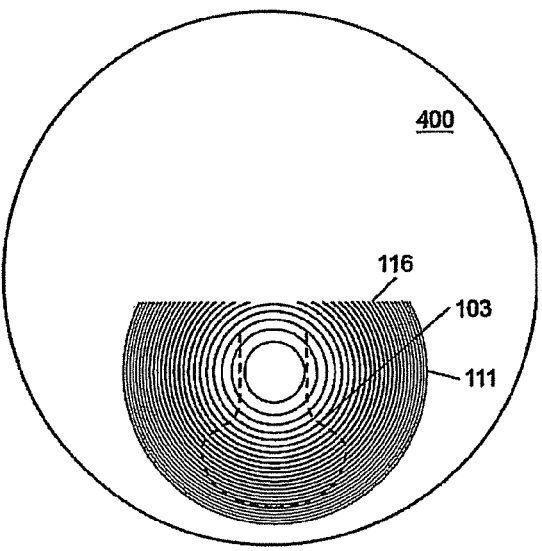
Figure 26C:
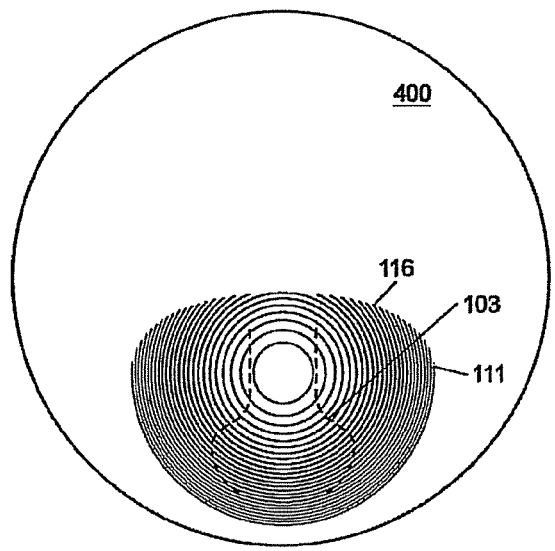
Figure 26D:
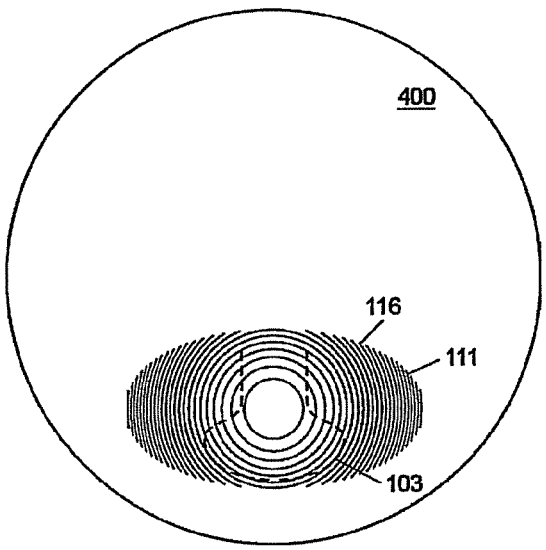
Figure 27A:
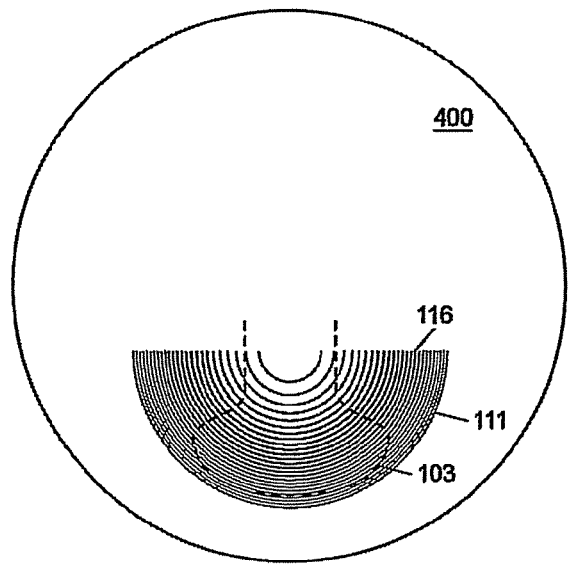
FIGS. 27A-27D show front views of the lenses 400 of FIGS. 26A-26D having the refractive progressive addition region located at least partially outside of the cropping boundary of the diffractive optical power region.
Figure 27B:
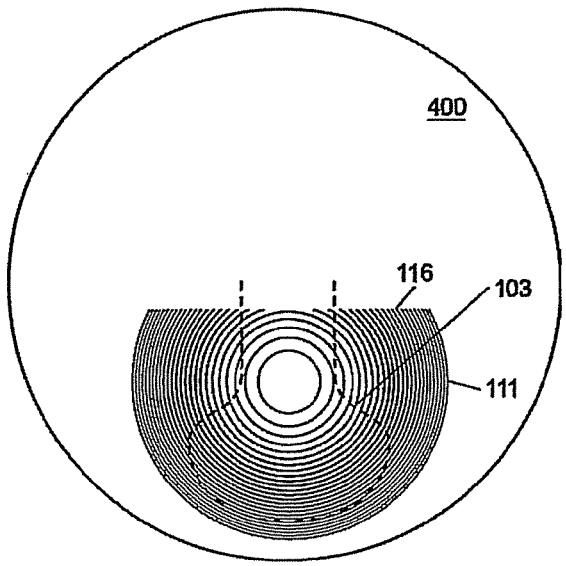
Figure 27C:
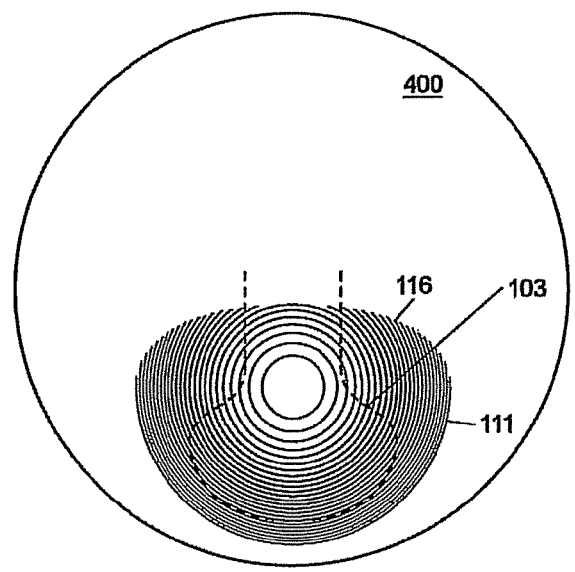
Figure 27D:
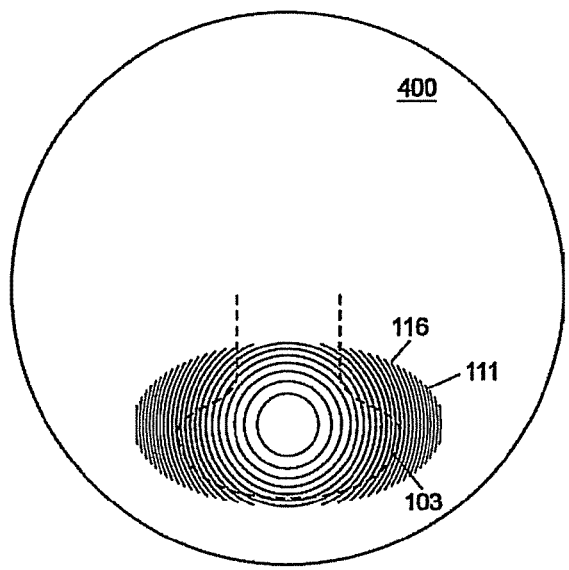

FIGS. 24E and 24F are contour plots of the optical power and astigmatism, respectively, of the lens 400 of FIG. 22A, which includes the cropped progressive addition diffractive optical power region 135 of FIG. 19B and the refractive progressive addition region 103 of FIG. 1, in accordance with various aspects of the present invention. The optical power of the lens will be the addition of the optical power region 161 of the cropped progressive addition diffractive optical power region and an optical power region 162 of the refractive progressive addition region. In this example, the optical power region 161 provides a first progression of optical power (e.g., of up to +1.00 D) and the optical power region 162 provides a second progression of optical power (e.g., of up to +1.00 D) for providing the lens with a combined optical power progression (e.g., of up to +2.00 D) in the near distance vision region 136. Likewise, the astigmatism of the lens will be the addition of the astigmatism region 163 having astigmatism less than or equal to the predetermined threshold value of astigmatism 165 (e.g., 0.25 D) and an astigmatism region 164 including astigmatism of the refractive progressive addition region. In this example, the astigmatism region 163 provides astigmatism equal to the predetermined threshold value of astigmatism (e.g., of up to 0.25 D) and the astigmatism region 164 provides astigmatism (e.g., of up to 1.00 D) associated with the (e.g., +1.00 D optical power) of the refractive progressive addition region. Thus, the lens will have a total of up to 1.25 D of astigmatism. The 1.25 D of astigmatism formed by combining the cropped progressive addition diffractive optical power region and the refractive progressive addition region to provide +2.00 D of optical power is less than the 2.00 D of astigmatism formed by the refractive progressive addition region providing the +2.00 D of optical power alone (as shown in FIG. 23B).

In one example, when the wearer's full near distance vision prescription is, e.g., +1.00 D or less, and preferably +0.75 D or less, of optical power in the near distance vision region (e.g., for emerging presbyopes with some accommodation remaining), correction may be fully provided by a diffractive optical power region having constant optical power.

FIGS. 25A-25D show front views of the lenses 400 of FIGS. 21A-21B having the cropped diffractive optical power regions 111 of FIGS. 8G, 8E, 8I, and 6B, respectively, with constant optical power, in accordance with various aspects of the present invention. The cropped diffractive optical power regions 111 of FIGS. 25A-25D have a variety of shapes, although it may be appreciated that any portion of a continuous diffractive optical power region can be cropped. The cropped diffractive optical power regions 111 can be static as shown in FIGS. 8A-8I or dynamic, formed by the transparent electrode 208 coating the surface relief diffractive structures 206 as shown in FIG. 15, or by the individually addressable electrodes 216, as shown in FIGS. 17A-17B.

FIGS. 26A-26D show front views of the lenses 400 of FIGS. 25A-25D having the cropped diffractive optical power region 111 with constant optical power in optical communication with the refractive progressive addition region 103 of FIG. 1, in accordance with various aspects of the present invention.

The refractive progressive addition region 103 may be spaced from the cropping boundary 116 of the cropped diffractive optical power region 111. For example, the refractive progressive addition region 103 may begin below the optical power discontinuity of the cropping boundary 116, e.g., spaced by a distance in a range of from approximately 0 to approximately 6 mm (measured along the vertical axis).

In one example, the wearer's near distance vision prescription is, e.g., approximately +2.00 D; far-intermediate distance vision prescription is, e.g., approximately +0.62 D; and intermediate distance vision prescription is, e.g., approximately +1.00 D. To provide the total optical power for the prescriptions in this example, the lens 400 of FIG. 26B may have the cropped diffractive optical power region 111 providing a constant optical power, e.g., of up to +0.62 D. The cropped diffractive optical power region 111 may have a largest diffractive structure having a diameter of approximately 40 mm. The lens 400 may have the refractive progressive addition region 103 begin approximately 6 mm below the optical power discontinuity of the cropping boundary 116 having approximately zero (plano) optical power. The refractive progressive addition region 103 may increase optical power to provide +0.38 D at a distance of 9 mm from the optical power discontinuity of the cropping boundary 116 (e.g., in the intermediate distance vision region). The +0.38 D of optical power contributed by the refractive progressive addition region 103 is combined in the lens 400 with the +0.62 D of optical power contributed by the cropped diffractive optical power region 111 to provide a total of +1.00 D of optical power for the intermediate distance vision prescription of the wearer. The refractive progressive addition region 103 provides up to +1.38 D of optical power, which when combined with the +0.62 D provided by of the cropped diffractive optical power region 111, provides a total of +2.00 D near distance vision prescription of the wearer. The portion of the cropped diffractive optical power region 111 that is situated above the refractive progressive addition region 103 provides correction of the wearer's far-intermediate distance vision prescription. In another example, the optical power needed to correct for near distance vision may be split equally between the cropped diffractive optical power region 111 and the refractive progressive addition region 103. In this example, if the wearer's near distance vision prescription is +2.50 D, the cropped diffractive optical power region 111 provides +1.25 D of constant optical power and the refractive progressive addition region 103 provides a progression of up to +1.25 D of optical power.

In FIGS. 26A-26D, since the refractive progressive addition region 103 is spaced from the cropping boundary 116 of the cropped diffractive optical power region 111, the shape and size of the refractive progressive addition region 103 depends upon the shape and size of the cropped diffractive optical power regions 111.

FIGS. 27A-27D show front views of the lenses 400 of FIGS. 26A-26D having the refractive progressive addition region 103 located at least partially outside of the cropping boundary 116 of the cropped diffractive optical power region 111, in accordance with various aspects of the present invention. For example, the refractive progressive addition region 103 may begin above the optical power discontinuity of the cropped diffractive optical power region 111, e.g., by a distance in a range of from approximately 0 to approximately 6 mm (measured along the vertical axis).

In one example, the wearer's near distance vision prescription is, e.g., approximately +2.50 D; far-intermediate distance vision prescription is, e.g., approximately +0.75 D; and intermediate distance vision prescription is, e.g., approximately +1.25 D. To provide the optical power for the prescriptions in this example, the lens 400 of FIG. 26B may have the diffractive optical power region 111 providing a constant optical power, e.g., of up to +0.75 D. The refractive progressive addition region 103 may have approximately zero (i.e., plano) optical power at a distance of 3 mm above the optical power discontinuity of the cropping boundary 116. The refractive progressive addition region 103 may increase optical power to provide +0.25 D of optical power at the optical power discontinuity to reduce step-up at the discontinuity. The refractive progressive addition region 103 may increase optical power to approximately +0.50 D of optical power at a distance of 6 mm below the optical power discontinuity (e.g., in the intermediate distance vision region). The +0.50 D of optical power contributed by the refractive progressive addition region 103 is combined in the lens 400 with the +0.75 D of optical power contributed by the cropped diffractive optical power region 111 to provide a total of +1.25 D of optical power for the intermediate distance vision prescription of the wearer. The refractive progressive addition region 103 provides up to +1.75 D of optical power, which when combined with the +0.75 D provided by the cropped diffractive optical power region 111, provides the total +2.50 D near distance vision prescription of the wearer.

In FIGS. 27A-27D, since the refractive progressive addition region 103 is located above the optical power discontinuity of the cropping boundary 116, the shape and size of the refractive progressive addition region 103 depends upon the shape and size of the cropped diffractive optical power regions 111.

In other embodiments, the refractive progressive addition region or the cropped diffractive optical power region may be used alone for correcting a high (e.g., greater than +1.00 D) near distance vision prescription for a wearer. Alternatively, the refractive progressive addition region or diffractive optical power region may be used in combination for correcting a low (e.g., less than +1.00 D) near distance vision prescription for a wearer to further reduce distortion and chromatic aberration typically associated with a purely refractive or diffractive lens.

The lenses 400 of FIGS. 19A-19C, 20A-20D, 21A-21B, 22A-22B, 25A-25D, 26A-26D, and 27A-27D can be static or dynamic, in accordance with various aspects of the present invention.

Figure 28A:
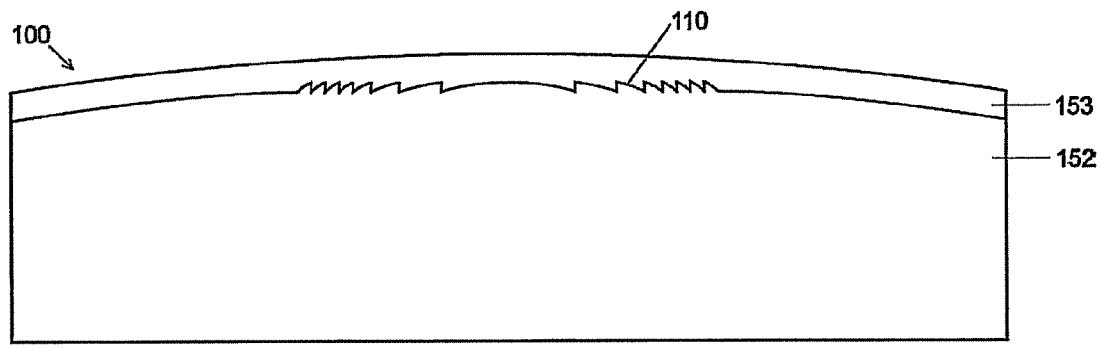
FIGS. 28A-28D show side views of the lenses 100 of FIGS. 3 and 4.
Figure 28B:
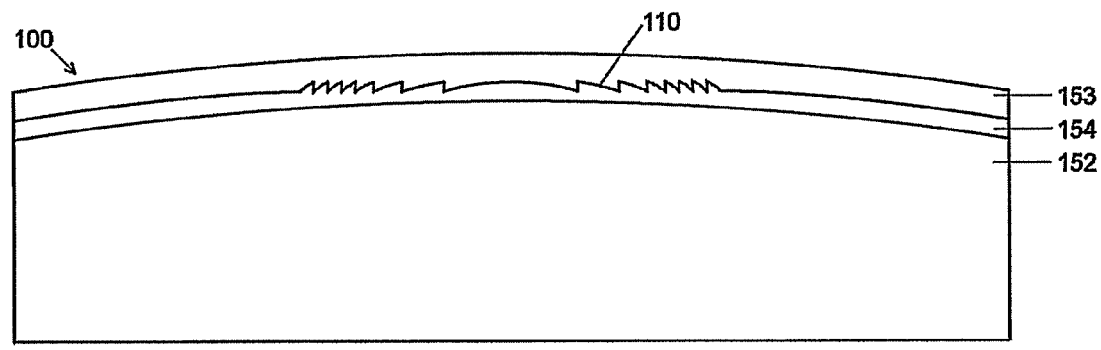

FIGS. 28A-28B show side views of the static lens 100 of FIGS. 3 and 4, in accordance with various aspects of the present invention. The lens 100 has a first layer 152 including diffractive structures 110 having a surface relief diffractive topography (forming a diffractive optical power region).

In FIG. 28A, the diffractive structures 110 are formed on the first layer 152. The first layer 152 is composed of a first material with a first refractive index ($n_1$). The first layer 152 is in optical communication with a second layer 153 composed of a second material with a second and different refractive index ($n_2$). The height d of the diffractive structures 110 are preferably defined as follows:

$$d(n_1 - n_2) = d(\Delta n) = \lambda \quad (4)$$

where $\lambda$ is the design wavelength of the diffractive optical power region. As the difference in refractive index, $\Delta n$, increases, the heights of the diffractive structures 110 decrease. Diffractive structures 110 that are shorter are easier to manufacture and less visible. However, increasing the difference in refractive index generally increases interfacial Fresnel reflections between the first and second materials, which decrease the transmission of light through a final finished lens. Accordingly, the difference in refractive index $\Delta n$ is, e.g., in a range of from approximately 0.02 to approximately 0.25, and is preferably in a range of from approximately 0.05 to approximately 0.15. Additionally, the transmission of light across the two materials or any optical material interface may be increased by using thin film, quarter-wave, and index matching layers, which are known in the art.

In one approach, in accordance with an aspect of the present invention, the lens 100 is manufactured by initially generating a pre-form of the first layer 152 or second layer 153 having the surface relief diffractive structures 110. The pre-form is then joined with the remaining portion of the lens 100, e.g., using optical quality adhesive. The pre-form may be manufactured, e.g., by casting a thermal or ultra-violet (UV) cure monomer resin. Alternatively, the pre-form may be manufactured by injection molding, embossing, stamping or otherwise thermo-forming a thermoplastic material, as is known in the art. The pre-form may act as a consumable mold. When a pre-form of the second layer 153 is formed, an inner surface of the pre-form has the diffractive structures 110 and an outer surface of the pre-form (forming the front surface of the lens 100) can be formed as a refractive optic, e.g., such as a progressive addition region. The progressive addition region is preferably aligned in a predetermined orientation with respect to the surface relief diffractive structures to ensure that the far, far-intermediate, and intermediate to near distance vision regions are properly generated. The thickness of the pre-form and any material added to the pre-form are such that the surface relief diffractive structures 110 are spaced approximately 1 mm or less from the finished front surface of a final lens.

As described above, the refractive indices of the first layer 152 and the second layer 153 must be different. In one example, one of the first layer 152 and the second layer 153 is composed of MR-20 (having a refractive index of 1.594) while the other is composed of Trivex (having a refractive index of 1.53). In one example, one of the first layer 152 and the second layer 153 is composed of CR39 (having a refractive index of 1.49) while the other is composed of TS216 (having a refractive index of 1.59). In yet another example, one of the first layer 152 and the second layer 153 is composed of MR-10 (having a refractive index of 1.668) while the other is composed of Trivex (having a refractive index of 1.53).

In general, the lenses 100 may be composed of any of the materials listed in Table 1, although other material may be used.

TABLE 1

| Material | Refractive Index | Abbe Number | Supplier |
| --- | --- | --- | --- |
| CR39 | 1.49 | 55 | PPG |
| Nouryset 200 | 1.49 | 55 | Great Lakes |
| Rav-7 | 1.50 | 58 | Great Lakes |
| Trivex | 1.53 | 44 | PPG |
| Brite-5 | 1.548 | 38 | Doosan |
| Brite-Super | 1.553 | 42 | Doosan |
| TS216 | 1.59 | 32 | Tokuyama |
| Polycarbonate | 1.59 | 30 | Multiple |
| MR-20 | 1.594 | 43 | Mitsui |
| MR-8 | 1.597 | 41 | Mitsui |
| Brite-60 | 1.60 | 35 | Doosan |
| UDEL P-1700 NT-06 | 1.634 | 23.3 | Solvay |
| Radel A-300 NT | 1.653 | 22 | Solvay |
| MR-7 | 1.665 | 31 | Mitsui |
| MR-10 | 1.668 | 31 | Mitsui |
| Radel R-5000 NT | 1.675 | 18.7 | Solvay |
| Eyry | 1.70 | 36 | Hoya |
| Essilor High Index | 1.74 | 33 | Essilor |

FIG. 28B shows the lens 100 of FIG. 28A having a third layer 154 composed of a third material having a third refractive index ($n_3$). If the third layer 154 is a pre-form, then diffractive structures 110 are formed on the third layer 154. The third layer 154 is disposed between the first substrate layer 152 and the second substrate layer 153. The refractive index of the third layer 154 is different from the refractive index of one or both of the first layer 152 and the second layer 153. The refractive indices of the first layer 152 and the second layer 153 can be the same or different. The third refractive index is, e.g., in a range of from approximately 1.50 to approximately 1.75 and the first and second refractive indices are, e.g., in a range of from approximately 1.40 to approximately 1.65. In this example, material having a relatively high refractive index is surrounded by material having a relatively low refractive index. Alternatively, the third refractive index is, e.g., in a range of from approximately 1.40 to approximately 1.65 and the first and second refractive indices are, e.g., in a range of from approximately 1.50 to approximately 1.75. In this example, material having a relatively low refractive index is surrounded by material having a relatively high refractive index. Such an arrangement typically generates thinner and flatter finished lenses as compared with the opposite configuration (for lenses having the same optical power).

The first layer 152 and the second layer 153 of FIG. 28B may be manufactured using pre-forms with surface relief diffractive structures, as described in reference to FIG. 28A. The third layer 154 may take the form of an optical quality adhesive used to adhere the first substrate layer 152 to the second substrate layer 153. The optical quality adhesive has optical properties, e.g., to enable the height of the surface relief diffractive structures 110 to satisfy equation (4) (i.e., to have high diffraction efficiency). The thickness of the third layer 154 (including the diffractive structures) is, e.g., in a range of from approximately 0.05 mm to approximately 1.00 mm, and is preferably in a range of from approximately 0.1 mm to approximately 0.5 mm.

Alternatively, the third layer 154 may be manufactured as a surface relief diffractive pre-form (e.g., insert). The first layer 152 and the second layer 153 may subsequently be joined to the pre-form using an embedding casting process similar to that used to manufacture polarized sun lenses; which is well known in the art.

As described above, the refractive index of the third layer 154 is different from the refractive indices of one or both of the first layer 152 and the second layer 153. In one example, one or both of the first layer 152 and the second layer 153 are composed of MR-20 while the third layer 154 is composed of Trivex. In another example, one or both of the first layer 152 and the second layer 153 are composed of CR39 while the third layer 154 is composed of TS216. In yet another example, one or both of the first layer 152 and the second layer 153 are composed of MR-10 while the third layer 154 is composed of Trivex. Alternatively other materials, e.g., listed in Table 1 may be used.

Figure 28C:
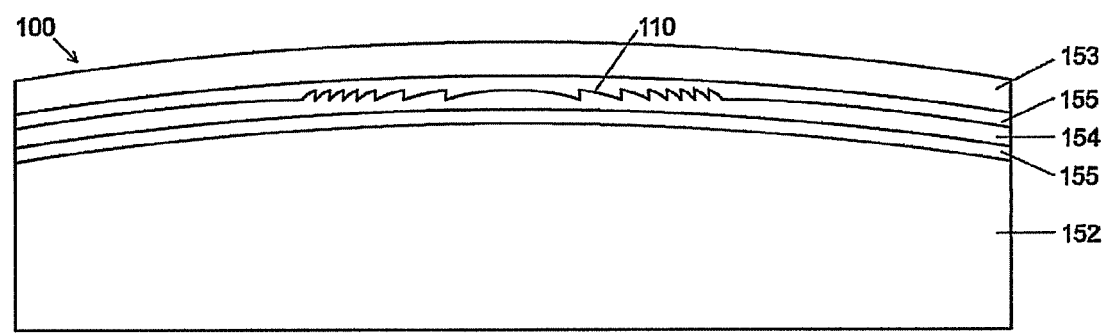

FIG. 28C shows the lens 100 of FIG. 28B having optical quality adhesive layers 155 disposed on either side of the third substrate layer 154 for joining with the first layer 152 and the second layer 153. The first, second, and third layers 152, 153, and 154, may be formed as a pre-form and then joined by optical quality adhesive layers 155. The thickness of the optical quality adhesive layers 155 is, e.g., in a range of from approximately 0.05 mm to approximately 1.00 mm and is preferably in a range of from approximately 0.1 mm to approximately 0.5 mm.

Figure 28D:
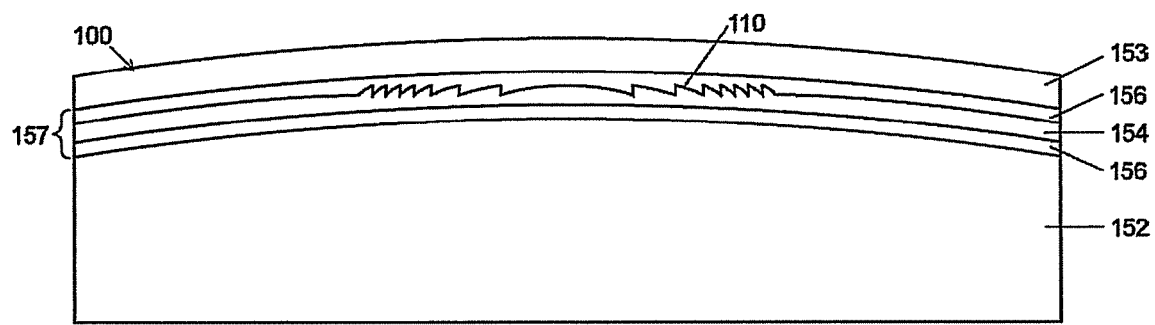

FIG. 28D shows the lens 100 of FIG. 28B having the third layer 154 encapsulated within a material 156 to form a material insensitive insert 157. The material insensitive insert 157 is disposed between the first layer 152 and the second layer 153. The material insensitive insert 157 may be joined to the first layer 152 and the second layer 153 using an optical quality adhesive. Alternatively, the material insensitive insert 157 may be embedded between the first layer 152 and the second layer 153, e.g., using a casting process similar to that used to manufacture polarized sun lenses, which is well known in the art. The material insensitive insert 157 fully contains the diffractive structures 110. Thus, according to equation (4), the diffraction efficiency of the lens 100 depends on the refractive index difference between the third layer 154 and the material 156 and is independent of (i.e., insensitive to) the refractive indices of the layers 152 and 153. Accordingly, the first layer 152 and the second layer 153 may be composed of any variety of optical materials and the material insensitive insert 157 will generate optical power with the same diffraction efficiency. By offering a variety of material(s) for the first substrate layer 152 and the second substrate layer 153 and generally the same materials for the material insensitive insert 157, a variety designs of lens 100 may be achieved with a reduced number of manufacturing SKUs and production tooling, as compared to the aforementioned approaches of FIGS. 28A-28C.

In another embodiment of the invention (not shown), a layer of a photo-sensitive material with uniform thickness (i.e., no surface relief diffractive structures) is placed between two pre-formed optical components. The refractive index of the photo-sensitive material permanently and irreversibly changes to a predetermined value when exposed to optical radiation. The photo-sensitive material may be exposed to radiation in a pattern predetermined to form the diffractive optical power region. For example, the diffractive phase profile may be "written" on the photo-sensitive material by means of exposure through an optical mask or a scanning laser source. The optical radiation is, e.g., within the ultra-violet or visible wavelength bands, although other wavelengths can be used.

Although the lenses 100 shown in FIGS. 28A-28D are semi-finished blanks (SFB), other lenses and finishes may be used, such as, finished lenses, finished lens blanks, or unfinished lens blanks. Although the first substrate layer 152 is shown in FIG. 28A-28D to be unfinished, the back surface of the first substrate layer 152 is typically ground and polished or free-formed to generate a patient's distance vision prescription using methods known in the art. It is understood that the lenses 100 shown in FIGS. 28A-28D can be edged to fit in a spectacle lens frame as well as drilled to be mounted to a rimless spectacle lens frame.

In another embodiment of the invention (not shown), the lens can further include static tints or dynamic tints (by adding a photochromic), anti-reflection coatings, anti-soiling coatings, scratch resistance hard coatings, ultra-violet absorbing coatings, and coatings for selective filtering of high energy light.

It may be appreciated that the diffractive structures described in accordance with the present invention do not change the total amount of light traversing the lens, i.e., they do not block light, such as by polarization or tinting. Instead, the diffractive structures affect the portion of the total amount of light focused to a focal point of the diffractive optical power region. When the diffractive optical power region is used in combination with a refractive host lens, the remaining portion that is not focused to the focal point of the combination of the diffractive optical power region and the refractive host lens is focused to the focal point of the refractive host lens.

What is claimed is:

1. A lens system comprising:
a diffractive optical power region comprising a plurality of concentric surface relief diffractive structures having a series of crests and adjacent troughs forming a sawtooth pattern, wherein each concentric surface relief diffractive structure extends from a trough to an adjacent crest of the sawtooth pattern, wherein the distance between a first crest and a first adjacent trough near the center point is greater than the distance between a second crest and a second adjacent trough spaced from the center point, wherein:
the diffractive optical power region includes a first region comprising a plurality of the concentric surface relief diffractive structures for focusing light of a specific wavelength $\lambda$ to a focal length f, wherein the radius of the $n^{th}$ concentric surface relief diffractive structure of the first region from the center point is greater than $\sqrt{2n\lambda f}$.

2. The lens system of claim 1, wherein the diffractive optical power region provides a progression of decreasing optical power.

3. The lens system of claim 1, wherein the diffractive optical power region further includes a second region comprising a plurality of the concentric surface relief diffractive structures, wherein the radius of the $n^{th}$ concentric surface relief diffractive structure of the second region from the center point thereof is approximately equal to $\sqrt{2n\lambda f}$.

4. The lens system of claim 3, wherein the second region provides a constant optical power.

5. The lens system of claim 1, wherein the second region is positioned radially interior to the first region.

6. The lens system of claim 1, wherein the radial widths of at least some of the surface relief diffractive structures of the first region are equal to one another.

7. A lens system comprising:

a diffractive optical power region comprising plurality of concentric surface relief diffractive structures having a series of crests and adjacent troughs forming a sawtooth pattern, wherein each concentric surface relief diffractive structure extends from a trough to an adjacent crest of the sawtooth pattern, wherein the distance between a first crest and a first adjacent trough near the center point is greater than the distance between a second crest and a second adjacent trough spaced from the center point-.point, wherein:

the diffractive optical power region includes a first region comprising a plurality of the concentric surface relief diffractive structures for focusing light of a specific wavelength $\lambda$ to a focal length f, wherein the radius of the $n^{th}$ concentric surface relief diffractive structure of the first region from the center point is less than $\sqrt{2n\lambda f}$.

8. The lens system of claim 7, wherein the diffractive optical power region provides a progression of increasing optical power.

9. The lens system of claim 7, wherein the diffractive optical power region further includes a second region comprising a plurality of the concentric surface relief diffractive structures, wherein the radius of the $n^{th}$ concentric surface relief diffractive structure of the second region from the center point thereof is approximately equal to $\sqrt{2n\lambda f}$.

10. The lens system of claim 9, wherein the second region provides a constant optical power.

11. The lens system of claim 7, wherein the second region is positioned radially interior to the first region.

12. The lens system of claim 7, wherein the radial widths of at least some of the surface relief diffractive structures of the first region are equal to one another.

13. The lens system of claim 1 wherein the lens system is dynamic.

14. The lens system of claim 13, wherein the lens system is electro-active.

15. The lens system of claim 7, wherein the lens system is dynamic.

16. The lens system of claim 15, wherein the lens system is electro-active.

* * * * *